United States Patent
Wirth et al.

(10) Patent No.: US 9,635,863 B2
(45) Date of Patent: May 2, 2017

(54) SYSTEM FOR INVERTED CASTING MOLD FOR PRODUCING A COMESTIBLE BAKED PRODUCT IN COMPLEX SHAPES

(71) Applicants: Todd Lindsay Wirth, Atlanta, GA (US); Fatimah Wirth, Atlanta, GA (US)

(72) Inventors: Todd Lindsay Wirth, Atlanta, GA (US); Fatimah Wirth, Atlanta, GA (US)

( * ) Notice: Subject to any disclaimer, the term of this patent is extended or adjusted under 35 U.S.C. 154(b) by 148 days.

(21) Appl. No.: 14/621,778

(22) Filed: Feb. 13, 2015

(65) Prior Publication Data

US 2015/0157028 A1 Jun. 11, 2015

Related U.S. Application Data

(63) Continuation of application No. 14/069,572, filed on Nov. 1, 2013, now Pat. No. 9,241,494.

(60) Provisional application No. 61/721,033, filed on Nov. 1, 2012, provisional application No. 61/727,925, filed on Nov. 19, 2012.

(51) Int. Cl.
*A21B 3/13* (2006.01)
*A21D 13/47* (2017.01)

(52) U.S. Cl.
CPC ............... *A21B 3/135* (2013.01); *A21B 3/13* (2013.01); *A21B 3/131* (2013.01); *A21B 3/138* (2013.01); *A21D 13/47* (2017.01); *A21B 3/132* (2013.01)

(58) Field of Classification Search
CPC ............ A21B 3/13; A21B 3/131; A21B 3/132; A21B 3/135; A21B 3/137; A23P 30/10; A47J 43/20
See application file for complete search history.

(56) References Cited

U.S. PATENT DOCUMENTS

| | | | | |
|---|---|---|---|---|
| 1,831,147 A | * | 11/1931 | Smith | A21B 3/132 99/439 |
| 3,141,400 A | * | 7/1964 | Powers | A21B 3/13 220/8 |
| 3,161,156 A | * | 12/1964 | Batista | A23G 3/0273 220/23.4 |
| 3,290,154 A | * | 12/1966 | Turner | A21B 3/13 220/DIG. 30 |
| 3,590,728 A | * | 7/1971 | Stanley | A47J 43/20 99/439 |
| 4,313,964 A | * | 2/1982 | Dembecki | A21B 3/13 426/138 |

(Continued)

*Primary Examiner* — James Mackey
(74) *Attorney, Agent, or Firm* — Smith Tempel Blaha LLC; Gregory Scott Smith

(57) ABSTRACT

A system and method for producing a comestible baked product in complex shapes using cast molding. Embodiments generally include a first part and a second part, the first part being made up of at least two or more component pieces, then, the first part is detachably coupled to the second part creating an outer surface and an inner surface which create a contiguous internal hollow space that extends from the first piece to the second piece in the form of a three dimensional shape, and a means for supporting the unitary mold in a special and beneficial baking orientation. Other embodiments may include a single piece that is attachable to the rim of a cup of a multi-cup baking cup pan or a to a single, stand-alone cup pan. The interior of the mold can receive a baking cup liner.

18 Claims, 70 Drawing Sheets

(56) References Cited

U.S. PATENT DOCUMENTS

| | | | | |
|---|---|---|---|---|
| 4,371,327 A * | 2/1983 | Fievez | ............... | A21C 11/006 249/119 |
| 4,656,928 A * | 4/1987 | Mack | ............... | A47J 29/00 426/302 |
| 4,790,740 A * | 12/1988 | Pearlman | ............... | A47J 29/00 249/156 |
| 4,941,585 A * | 7/1990 | Hare | ............... | A47J 43/20 220/23.2 |
| 5,191,830 A * | 3/1993 | Jacobson | ............... | A21B 3/132 249/120 |
| 5,400,698 A * | 3/1995 | Savage | ............... | A21B 3/13 249/144 |
| 7,047,873 B2 * | 5/2006 | Morgan | ............... | A21C 11/00 249/DIG. 1 |
| 7,150,221 B2 * | 12/2006 | Morgan | ............... | A21B 3/132 99/428 |

* cited by examiner

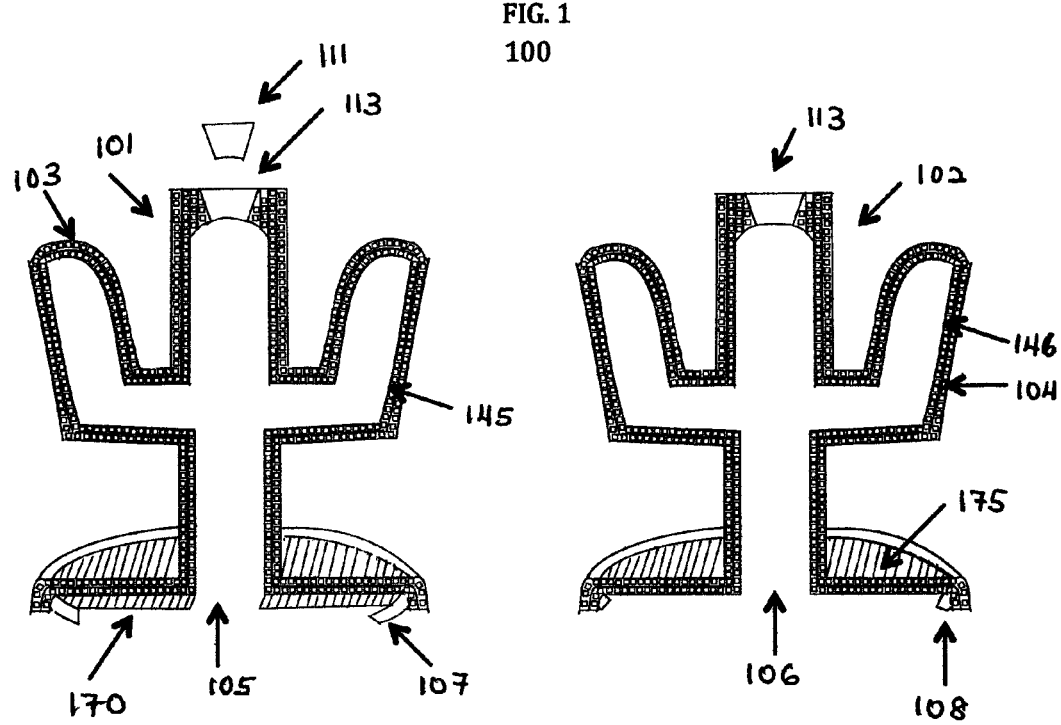
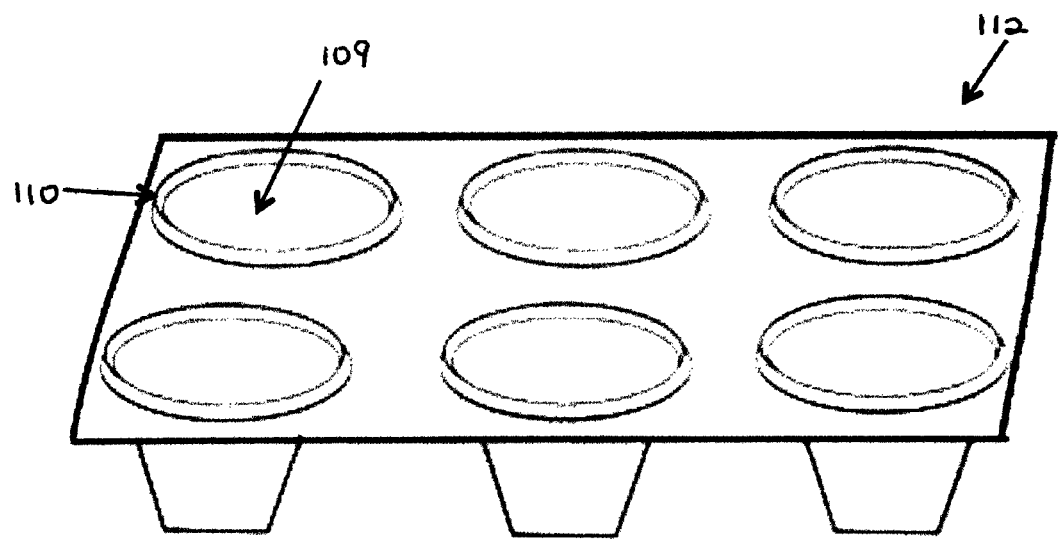

FIG. 5
100
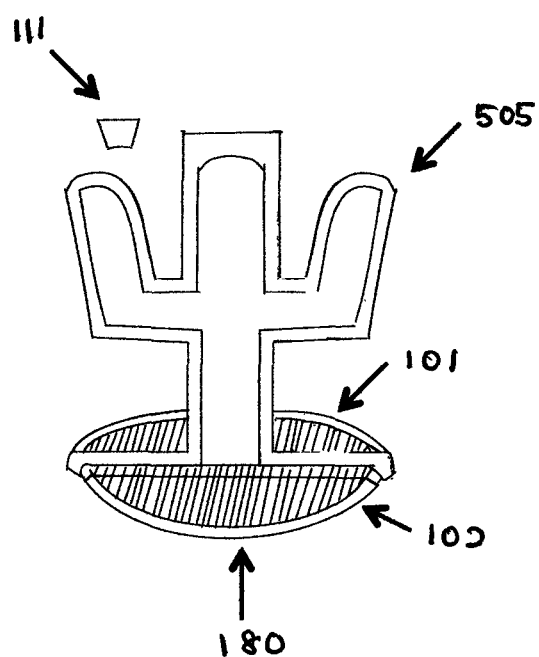
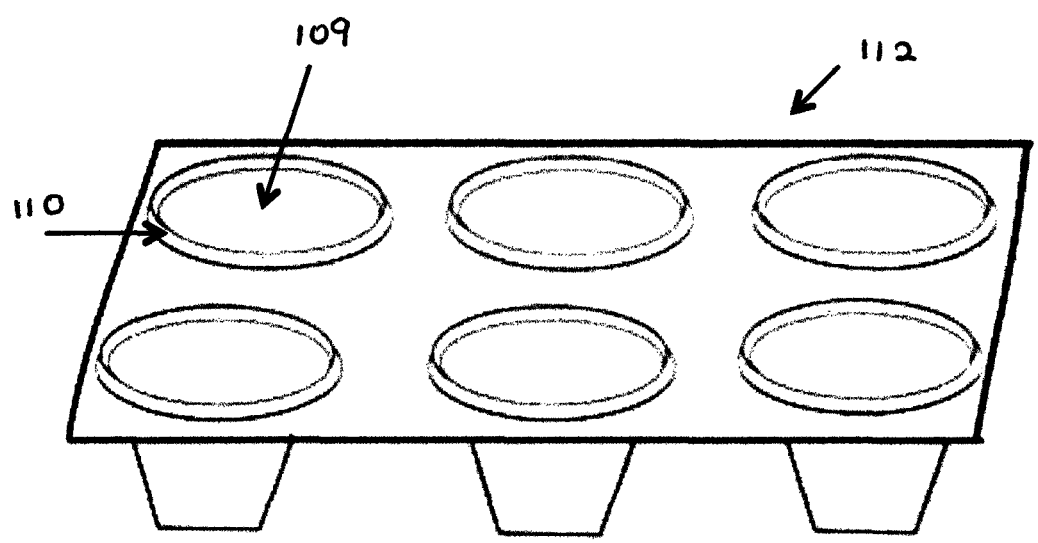

100

FIG. 21
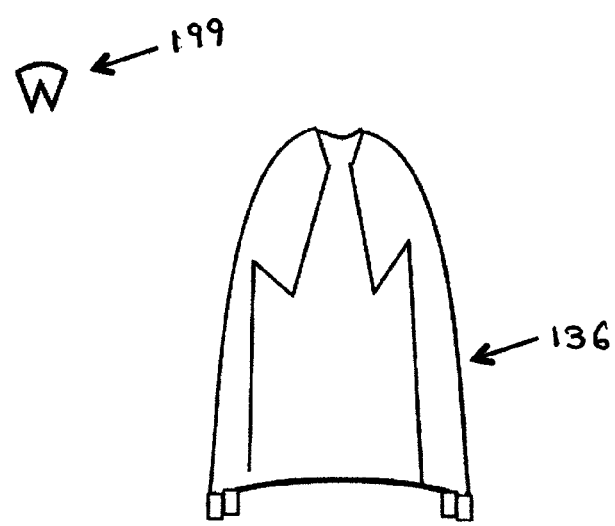
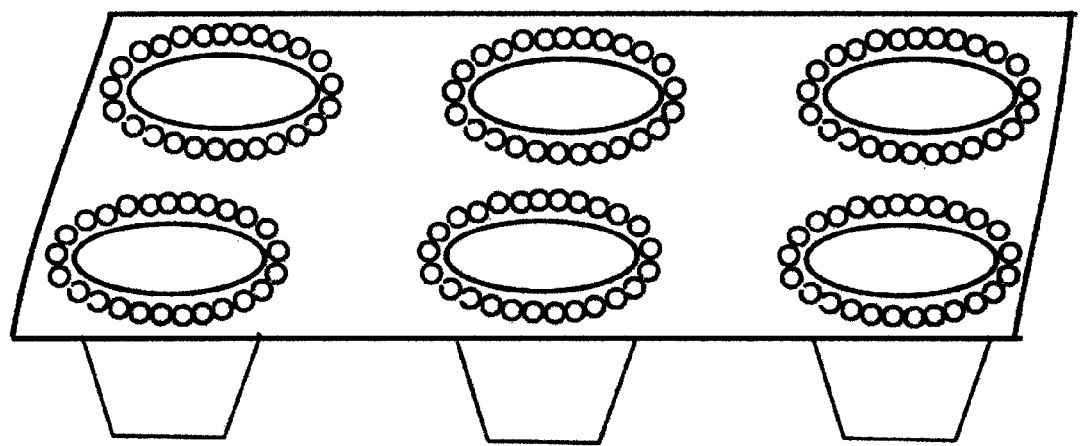

FIG. 35
1000
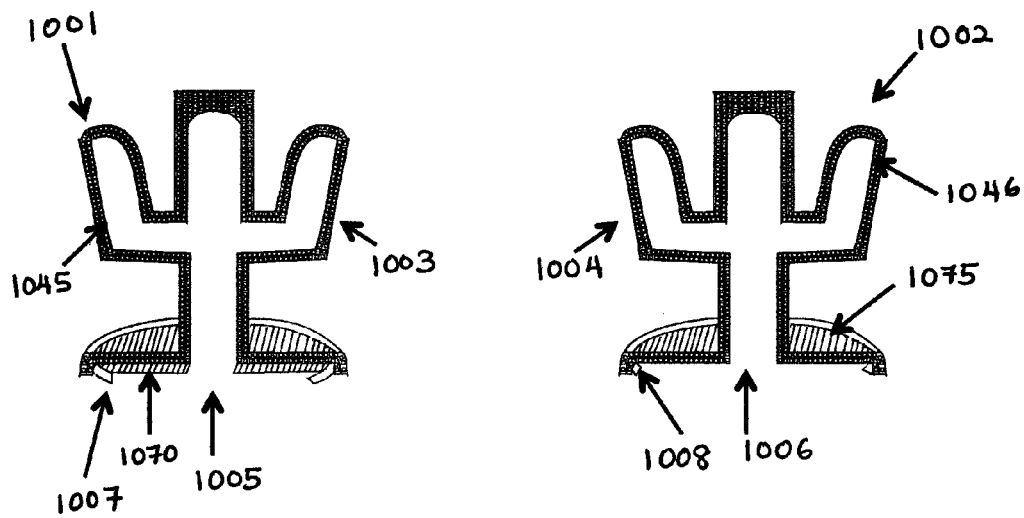
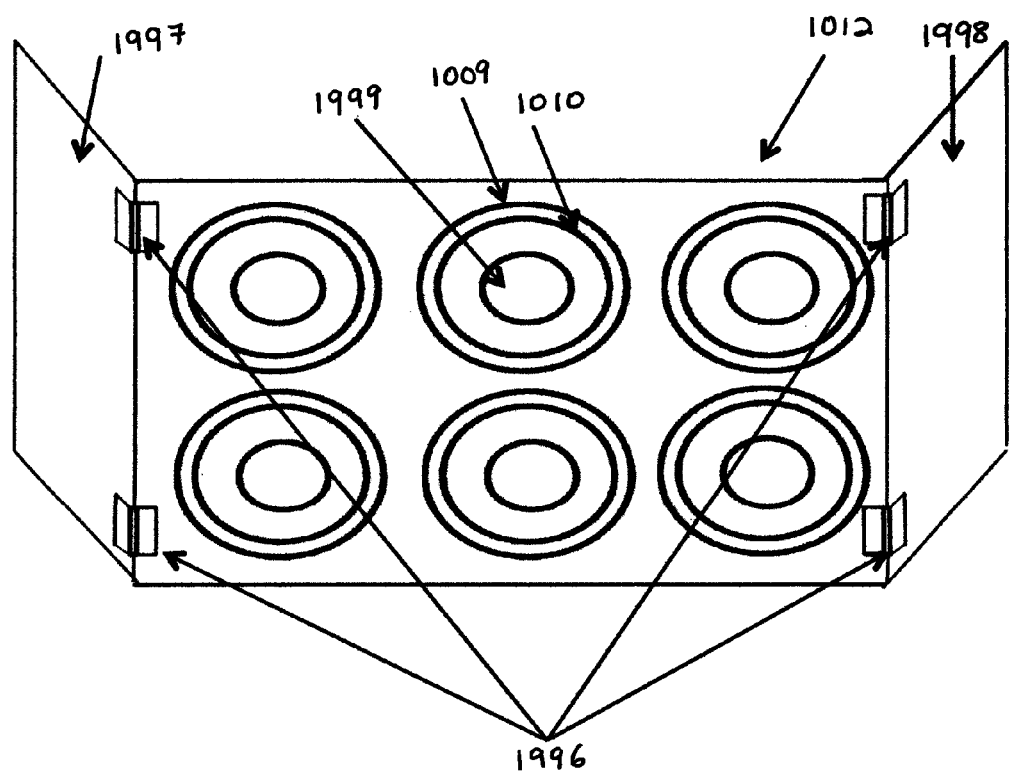

1000

1000

FIG. 44
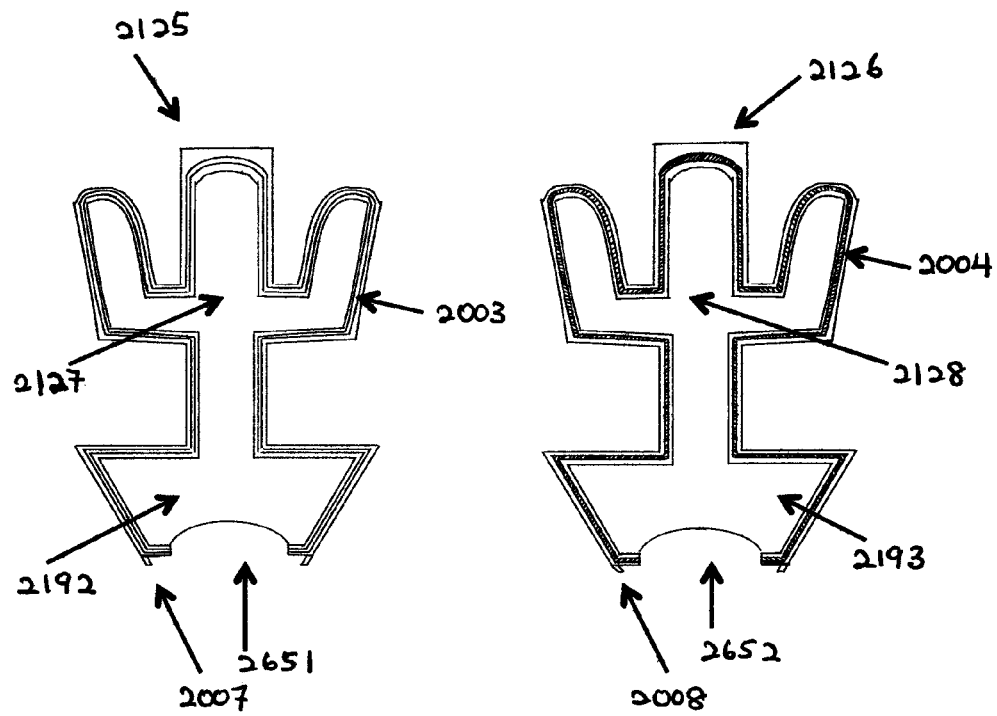
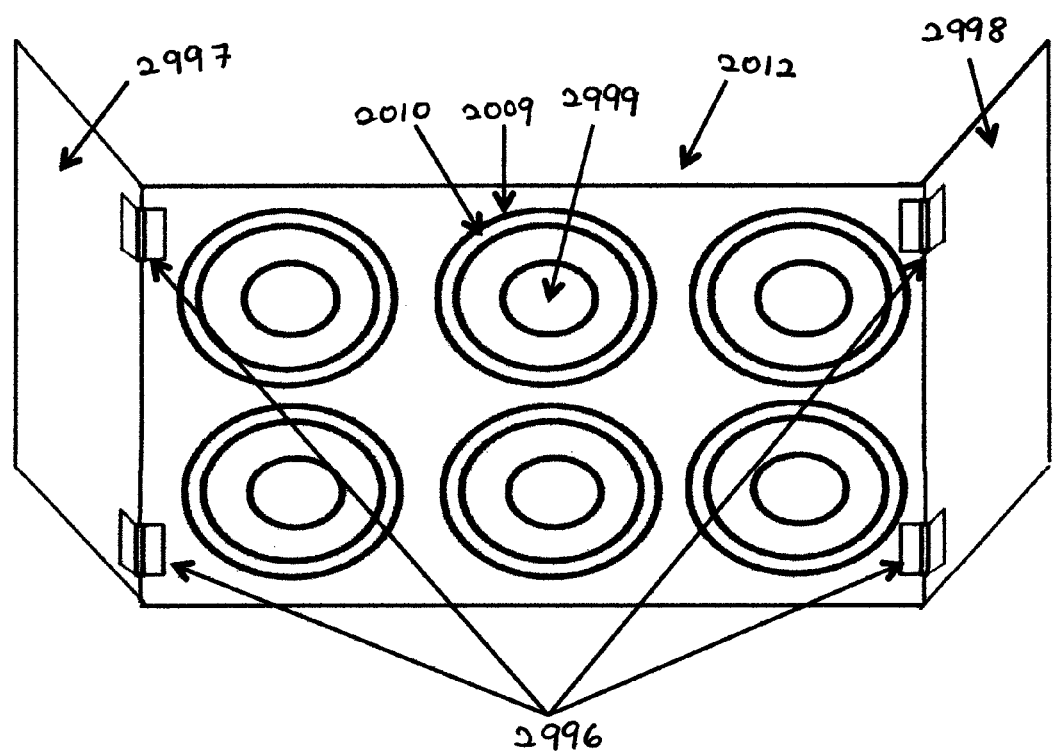

FIG. 59
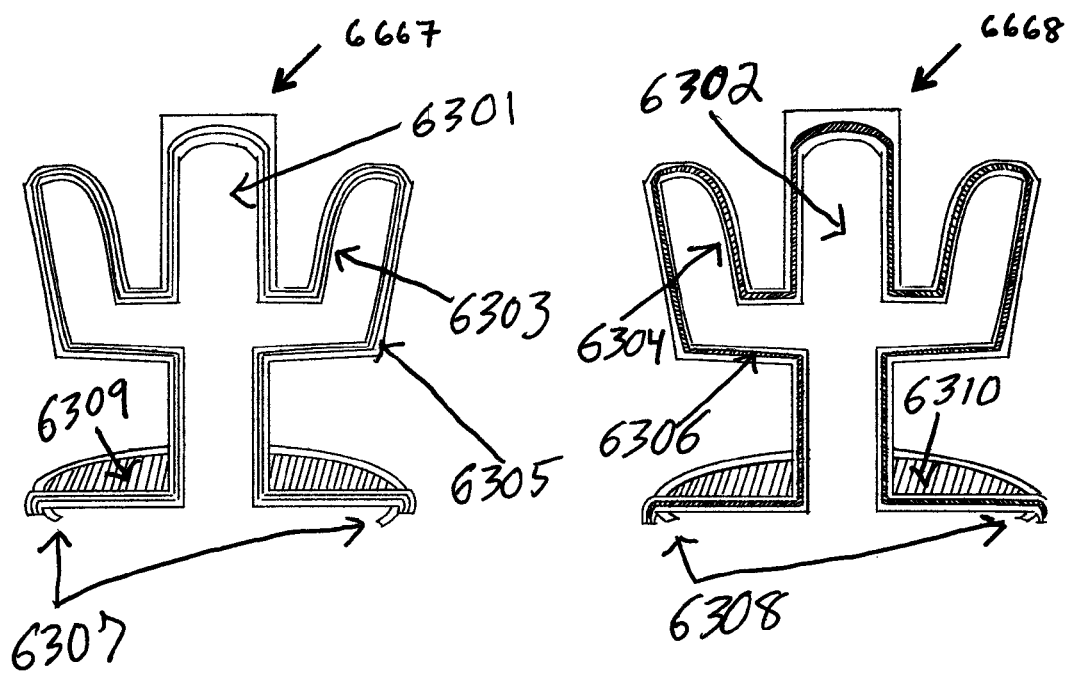
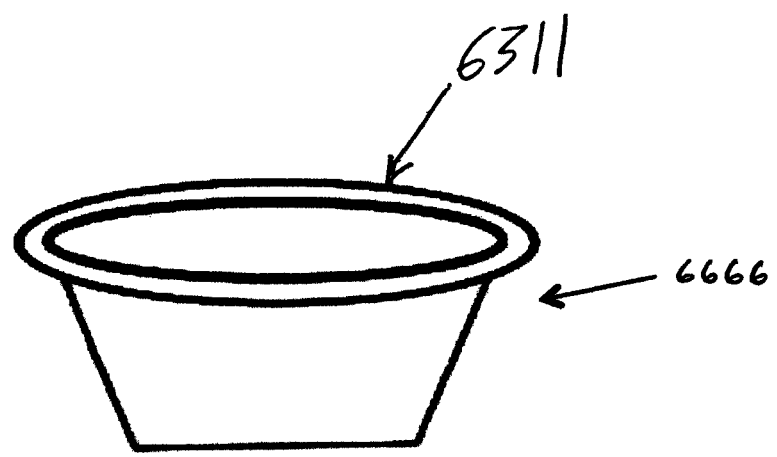

6669

FIG. 61
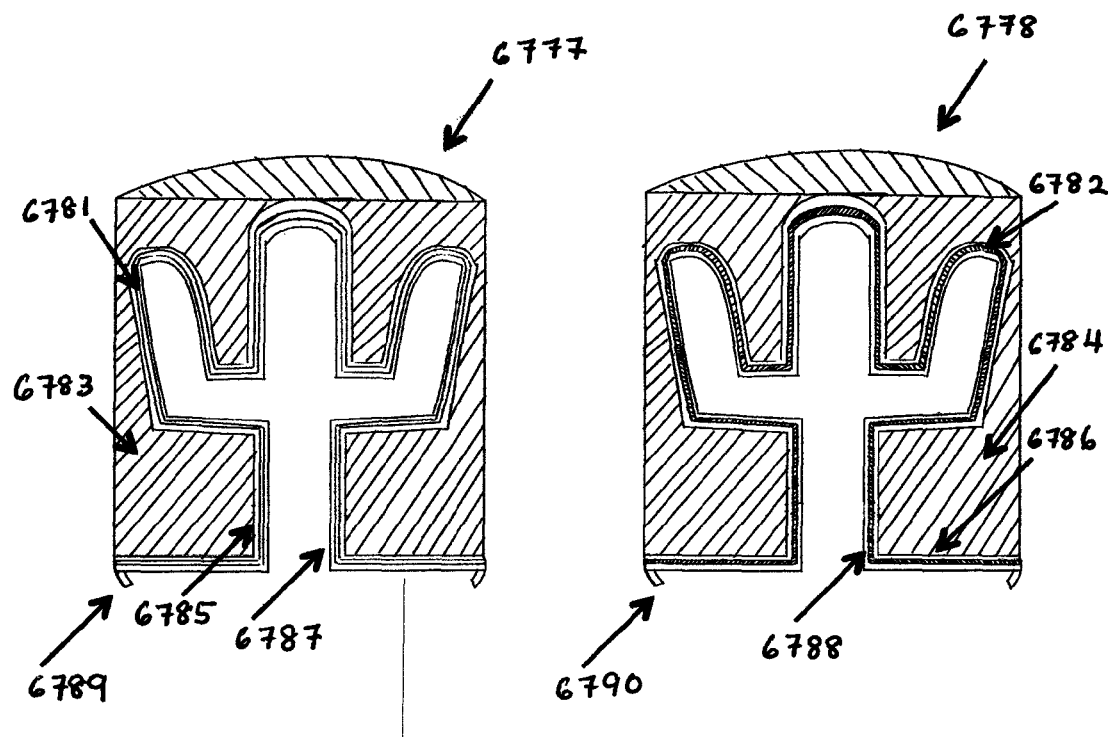
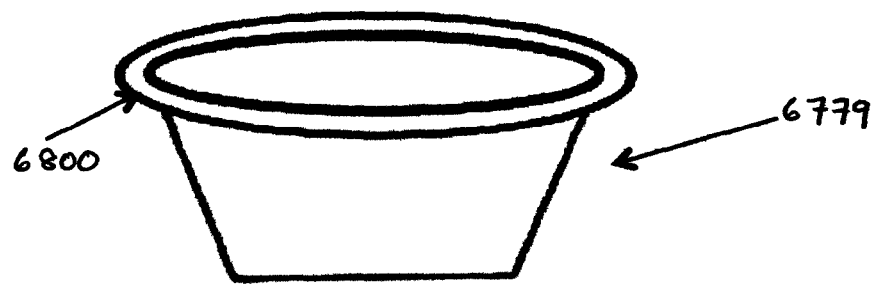

FIG. 64
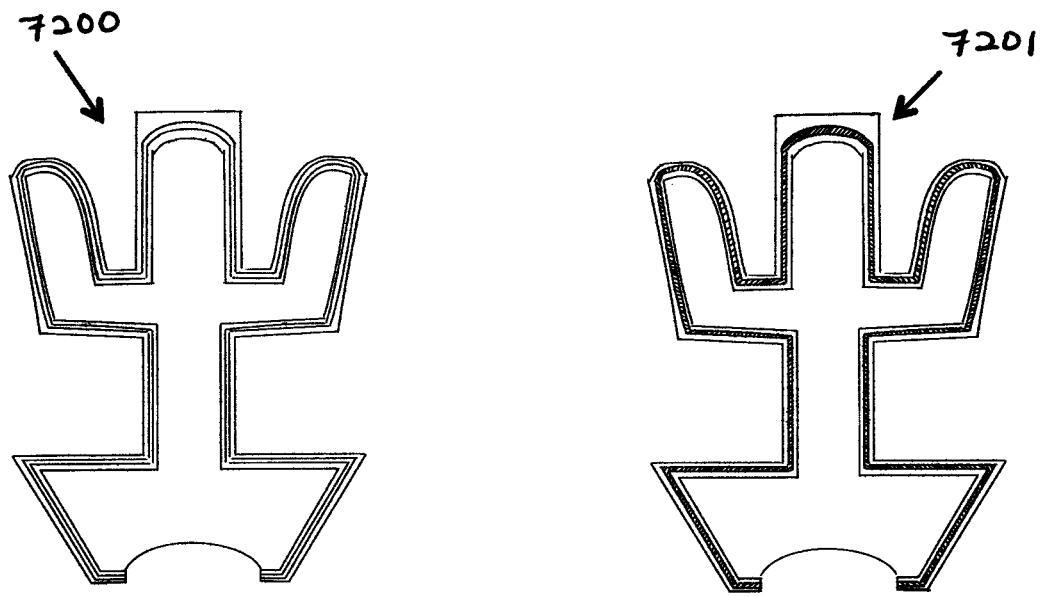
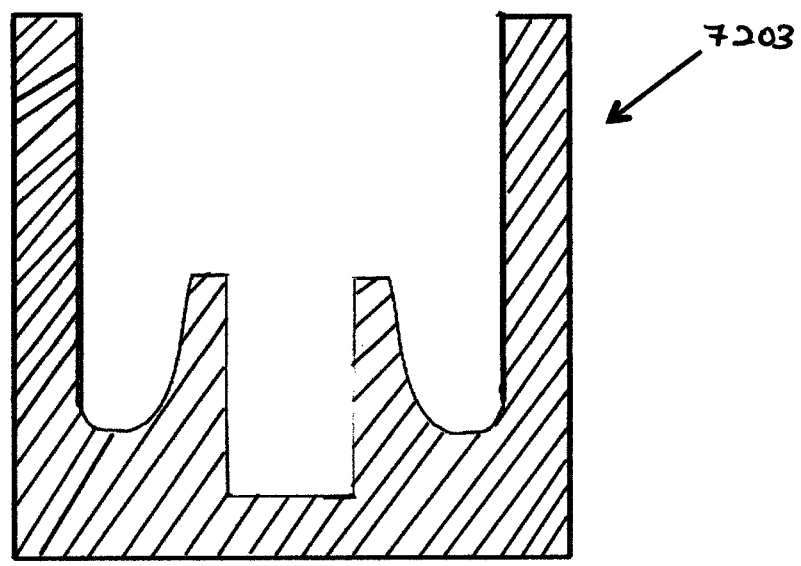

SYSTEM FOR INVERTED CASTING MOLD FOR PRODUCING A COMESTIBLE BAKED PRODUCT IN COMPLEX SHAPES

CROSS-REFERENCE TO RELATED APPLICATIONS

This is a utility patent application being filed in the United States as a non-provisional application for patent under Title 35 U.S.C. §100 et seq. and 37 C.F.R. §1.53(b) as a continuation of the United States patent application filed on Nov. 1, 2013, assigned Ser. No. 14/069,572 and bearing the title of SYSTEM AND METHOD FOR PRODUCING A COMESTIBLE BAKED PRODUCT IN COMPLEX SHAPES USING CAST MOLDING, which application claims the benefit of the prior filing date under Title 35, U.S.C. §119(e) of the United States provisional application for patent that was filed on Nov. 1, 2012 and assigned Ser. No. 61/721,033 and, of the United States provisional application for patent that was filed on Nov. 19, 2012 and assigned Ser. No. 61/727,925, each of the above-listed applications are incorporated herein by reference in their entirety.

BACKGROUND

The art and skill of baking remains a fundamental part of the human experience. Nearly every known culture has developed baking techniques at one point in its history; the hypothesized reason being that baking is an efficient and effective from of nutrition, as baked goods, especially breads, are a common and economic food.

Baking is a food cooking method that uses prolonged dry heat by convection, rather than by thermal radiation, normally in an oven, but also in hot ashes, or on hot stones. The most commonly baked item is bread but many other types of foods are baked. Baking generally involves heat being gradually transferred from the surface of a baking medium to its interior. As heat travels through the baking medium, it transforms the baking medium, e.g., batter and dough, into comestible baked product. Typically, baked goods have a firm dry crust and a softer center.

Beyond its nutritional value, baking has become an art form in more modern times. Today, baked goods are sometimes judged by their aesthetics rather than their nutritional value, e.g., wedding cakes, shaped cookies and designer cupcakes. Creating aesthetically pleasing baked goods often times involves sculpting a baked good from a starting block. This process can be quite difficult because fully cooked baking goods are not readily able to retain fine details. This may be the result of the baked good crumbling or having too many pockets of air. On the other hand, if the baked good is readily able to retain the fine detail from sculpting then the baked good may not be worth eating.

Because of the above-described dilemma, there have been many different prior art inventions that have attempted to provide a shape to a baked good during the baking process. These prior art inventions generally involve the use of molds or casts; the molds and casts are shaped in a certain way such that the final baked good retains the shape of the mold or cast.

Unfortunately, a thorough analysis of the prior art reveals that previously invented systems and methods for producing shaped comestible baked products suffer from a variety of limitations. First, most of these prior art inventions are intended for relatively simple shapes, e.g., hearts, stars, horse shoes, clovers, half moons, rainbows, balloons. Second, in most instances the shape is limited to one half of the baked good, e.g. bundt cake molds and casts. Third, for those prior art inventions that attempt to give a shape to the second half, the system and method attempts to leverage the inherent property of baking medium rising during the baking process; however, if too little baking medium is employed than there is insufficient force from the rising baking medium to drive the baking medium into the shaped grooves and recesses of the second half of the shaped mold or cast, if too much baking medium is employed than there is too much force from the rising baking medium and this may cause egression of the baking medium out of the seams of the two sided baking mold. As a result, prior art systems and methods for producing shaped comestible baked products rarely result in a final product that takes full advantage of the detail in the mold or cast. For those rare instances that do work, the shaped comestible baked product is incapable of being a complex shape, e.g., a figurine, an abstract caricature, a representative life-like object.

As such, what is needed in the art is a system and method for producing a comestible baked product in complex shapes using cast molding that does not suffer, or at least takes advantage, of the issues described above.

BRIEF SUMMARY

Various embodiments, configurations, features and aspects of the various embodiments are described in more detail in the detailed description with reference to the attached drawings.

The present disclosure presents various embodiments, as well as features and aspects thereof, of a system and method for producing a comestible baked product in complex shapes using cast molding. More specifically, one embodiment includes a first part and a second part, the first part being made up of at least two or more component pieces with a seam and junction existing where the component pieces are detachably coupled to form a unitary first piece using a means for detachably coupling the at least two or more component pieces. Then, the first part is detachably coupled to the second part at a seam and junction, the junction including a means for detachably coupling the first part and the second part to form a unitary mold.

The unitary mold also includes an outer surface and an inner surface, the outer surface and the inner surface being separated by a substantially self-supporting bakeware material forming a substantially contiguous shell. The substantially self-supporting bakeware material of the first end can be substantially flexible in addition to being substantially self-supporting. This substantially contiguous shell has at least one opening substantially on the second piece and this substantially contiguous shell creates a contiguous internal hollow space that extends from the first piece to the second piece. This contiguous internal hollow space creates a three dimensional shape wherein the portion of the three dimensional shape in the first piece is substantially more complex than the portion of the three dimensional shape in the second piece.

The unitary mold also includes a means for supporting the unitary mold in a baking orientation such that any baking medium poured into the unitary mold through the at least one opening fills the portion of the contiguous internal hollow space in the first piece before the portion of the contiguous internal hollow space in the second piece. Because the various embodiments employ this baking orientation, the means for detachably coupling all of the pieces of unitary mold must also function as means for preventing egression of the baking medium from the contiguous internal hollow space, and they must sufficiently resilient to support the weight of the first piece when it is loaded with the baking medium and in the baking orientation.

In certain embodiments, the means for detachably coupling all the pieces of first piece may involve a male member on at least one or more component pieces and a female receptor on at least one or more component pieces of the first piece. In other embodiments the means for detachably coupling all of the pieces of the unitary mold may involve snaps, silicone zippers, tongue and groove connection systems, mechanical fasteners, thread on thread connection systems, button systems, press fitting connection systems, etc.

In certain embodiments, the unitary mold may additionally include a stopper configured to fill at least a portion of the at least one opening. The stopper may additionally include a one way valve functioning as a means for releasing any pressure within the contiguous internal hollow space before, during or after the baking process.

In certain embodiments, the junction between pieces making up the first piece may include a flap connected to the outer surface of one of the two component pieces making up a junction. The flap may be made of the substantially self supporting yet flexible bakeware material of the unitary mold or something different. The flap may then extend over onto the adjacent component piece when the two component pieces are detachably coupled. The flap may function as a means for covering the seam or junction between the two component pieces.

In certain embodiment, the means for supporting the unitary mold in a baking orientation may be connected to the second piece. In other embodiments, the means for supporting the unitary mold in a baking orientation may be connected to the first piece. In still other embodiments, the means for supporting the unitary mold in a baking orientation may be an entirely separate object not attached to the unitary mold. In this embodiment the means for supporting the unitary mold in a baking orientation may be configured to function as cradle for the unitary mold.

In certain embodiments, the at least one opening into the hollow space of the unitary mold may be positioned on the first piece and not the second piece.

In certain embodiments, the substantially self-supporting bakeware material of the unitary mold is edible.

In certain embodiments, the unitary mold may additionally include a unitary mold liner constructed of edible material that is separate from the substantially contiguous shell of the unitary mold. The unitary edible mold liner may be capable of becoming a part of the baked comestible product. The unitary mold liner may be shaped to lie substantially flush along at least a portion of the inner surface of the substantially contiguous shell of the unitary mold.

In certain embodiments, the unitary mold may additionally include a unitary mold liner that is separate from the second end of the substantially contiguous shell. The unitary mold liner may be shaped to lie substantially flush along the inner surface of the second end of the substantially contiguous shell. The unitary mold liner may have at least one opening at the same position as the at least one opening of the second end of the substantially contiguous shell. The unitary mold liner may have at least one tab that is positioned adjacent to the at least one opening of the liner. This tab may be sufficiently long so as to extend from the contiguous internal hollow space of the substantially contiguous shell through the at least one opening substantially on the second end of the substantially contiguous shell. This tab may also be sufficiently long so as to fold on to at least a portion of the outer surface of the second end of the substantially contiguous shell such that the folded tab secures the unitary mold liner in to position along the inner surface of the second end of the substantially contiguous shell when the unitary mold is in the baking orientation Also disclosed in the present disclosure is a method of using a unitary mold for casting a baked comestible product. In one embodiment, the method involves the actions of detachably coupling at least two or more component pieces of a first piece of a unitary mold, wherein the coupling action forms at least one or more secondary seams or junctions which include a means for detachably coupling the at least two or more component pieces such that the first end is unitary. Then the method involves detachably coupling the first piece of a unitary mold to a second piece of a unitary mold, wherein the coupling action forms a seam or junction between the first piece and the second piece that includes a means for detachably coupling the first end and the second end such that the detachably coupled first piece and second piece forms the unitary mold. The creation of the unitary mold also results in the unitary mold having an outer surface and an inner surface, the unitary mold defining a contiguous internal hollow space that extends from the first piece to the second piece, the contiguous internal hollow space creates a three dimensional shape wherein the portion of the three dimensional shape in the first piece is substantially more complex than the portion of the three dimensional shape in the second piece. This embodiment of the method also involves orienting the position of the unitary mold such that any baking medium poured into the unitary mold fills at least a portion of the contiguous internal hollow space in the first piece before filling at least a portion of the contiguous internal hollow space in the second piece, pouring a baking medium into the contiguous internal hollow space of the unitary mold, and at least beginning to bake the baking medium in the unitary mold by having the unitary mold in the orienting position previously described.

BRIEF DESCRIPTION OF THE SEVERAL VIEWS OF THE DRAWING

FIG. 1 is a perspective and cross section diagram illustrating the various components and details of an embodiment of a system for producing a comestible baked product in complex shapes using cast molding.

FIG. 5 is a perspective diagram illustrating the various components and details of an embodiment of a system for producing a comestible baked product in complex shapes using cast molding.

FIG. 21 is a perspective and cross section diagram illustrating the various components and details of an embodiment of a system for producing a comestible baked product in complex shapes using cast molding.

FIG. 35 is a perspective and cross section diagram illustrating the various components and details of an embodiment of a system for producing a comestible baked product in complex shapes using cast molding.

FIG. 44 is a perspective and cross section diagram illustrating the various components and details of an embodiment of a system for producing a comestible baked product in complex shapes using cast molding.

FIG. 59 is a perspective and cross section diagram illustrating the various components and details of an embodiment of a system for producing a comestible baked product in complex shapes using cast molding.

FIG. 61 is a perspective and cross section diagram illustrating the various components and details of an embodiment of a system for producing a comestible baked product in complex shapes using cast molding.

FIG. 64 is a cross section diagram illustrating the various components and details of an embodiment of a system for producing a comestible baked product in complex shapes using cast molding.

DETAILED DESCRIPTION OF EMBODIMENTS

Figure 2:
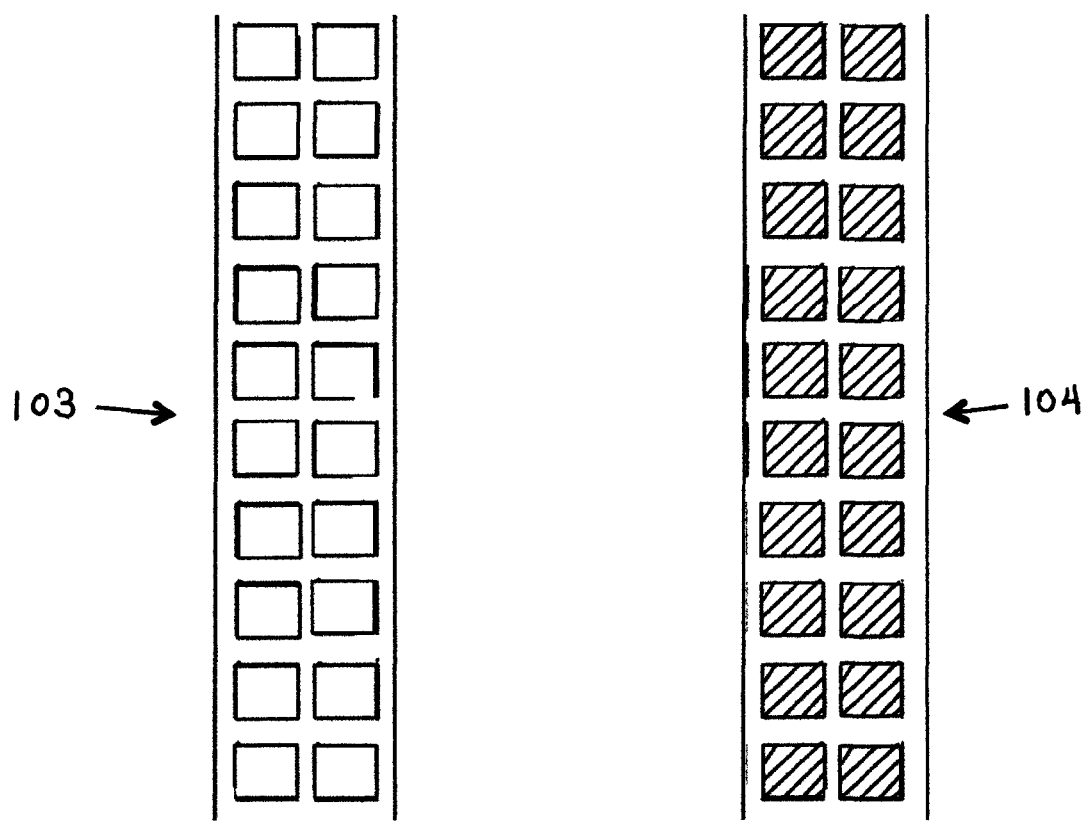
FIG. 2 is a partial perspective diagram illustrating the various components and details of an embodiment of a means for detachably coupling the various components of system for producing a comestible baked product in complex shapes using cast molding.

The following written description explains various embodiments of a cast baking mold for creating, among other things, complexly shaped cupcakes. This written description refers to the appended drawings to supplement the written explanation and as such, the written words should not be construed as limitations. Numerous specific details are explained in the written description and depicted in the drawings to provide an enabling understanding of the various embodiments to one of ordinary skill in the art; however, some details need not be expressly explained because they are readily apparent and understood by one of ordinary skill in the art, e.g., for certain described embodiments, explanation of some specific details are omitted so as to not unnecessarily obscure the written description. Additionally, one of ordinary skill in the art will understand that the various embodiments may be practiced without some, or all, of these specific details.

Although throughout the detailed description, the various embodiments are largely described as a system and method for producing a comestible baked product in complex shapes using cast molding, it should be understood that the focus of such description is only provided to ensure clarity in the configuration and operation of the various embodiments and, the description should not be used to limit the usefulness of the various embodiments in other manners or for other uses.

The present disclosure, as well as the described features and aspects of various embodiments, is directed towards a system and method for producing a comestible baked product in complex shapes using cast molding.

Figure 3:
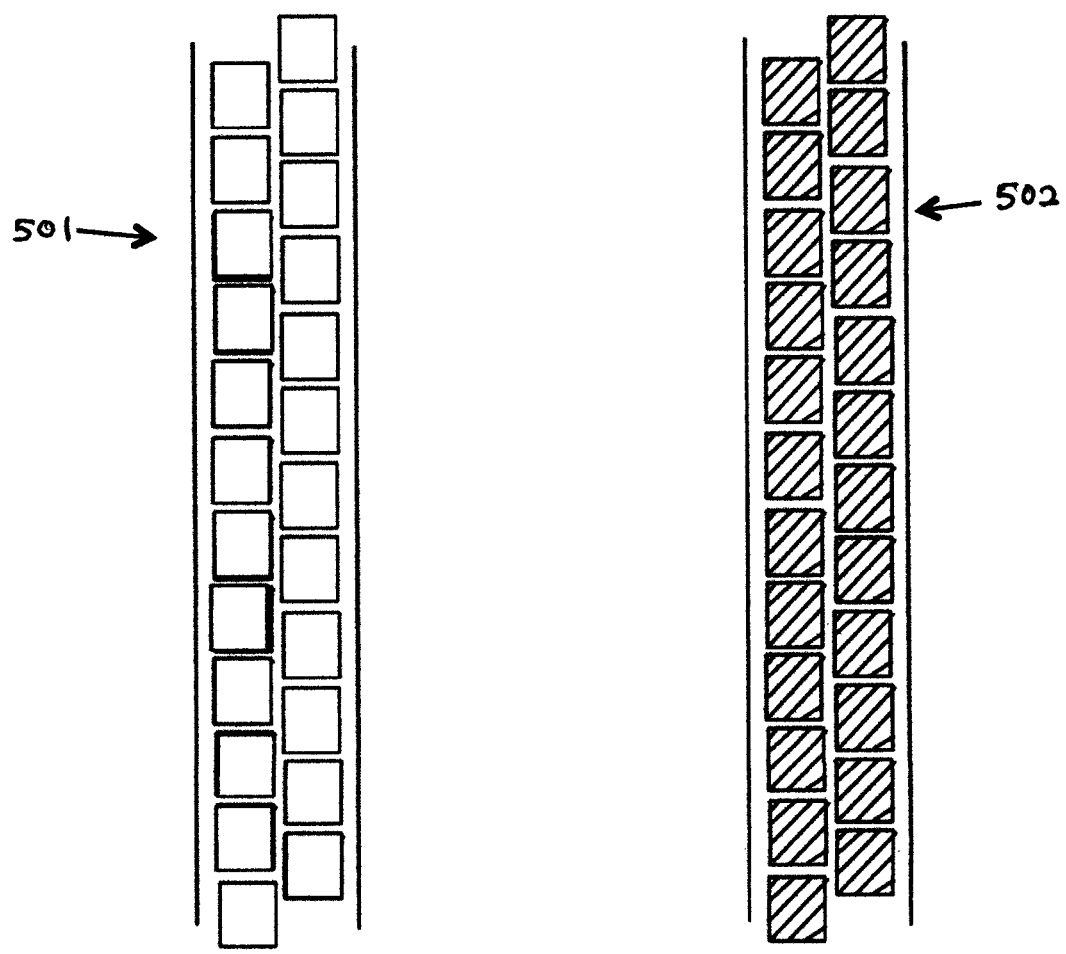
FIG. 3 is a partial perspective diagram illustrating the various components and details of another embodiment of a means for detachably coupling the various components of system for producing a comestible baked product in complex shapes using cast molding.

The system and method have many different possible embodiments. One embodiment is comprised of a baking cup as part of a baking cup pan and a multi-piece statue mold that allows the elements (the baking cup as part of the baking cup pan and the multi-piece statue mold) to seal together to create one unified device that does not permit liquid (e.g., batter ingredient, baking mixture, etc.) egression from the inside out when upright. The embodiment also employs a stopper seal that seals the fill opening that is created on top of the statue mold when the statue mold pieces come together. FIG. 1 illustrates the components that make up an embodiment generally at 100. In this embodiment there is a one piece of the statue mold at 101. (As one can see, we are illustrating an example of a representative statue and can hence see the first piece as a mold for half a saguaro cactus. Recall, the statute can be representative or non-representative. For all intents and purposes, we could have been illustrating this with a non-representative statue mold.). At 102 you have the second piece of the statue mold. At 103 and 104 you will see the seal that will be used to connect mold piece 101 and mold piece 102 together. It is important to note that 145 and 146 represent the exterior walls of the mold pieces in this embodiment. The specific seal illustrated at 103 and 104, generally, is representative of one possible embodiment of the seal. (the seal can also take on many different types of forms to prevent baking ingredient egression.) The seal for 103 and 104 prevents liquid egression from the system. This embodiment of the seal can be seen in an enhanced view separately in FIG. 2. Note in FIG. 2, you have the seal 103 and 104 depicted up close. At 103 a seal pattern best described as a waffle iron pattern is depicted as the receiver (female component) and 104 is the waffle iron pattern with protruding sections (the male component). The 103 female receptors come together with the 104 male protruding sections to make a leak proof seal. In the embodiment in FIG. 2, the male components 104 when they come together with the female components 103 will be encased by the female receptors 103 in this specific embodiment of the seal. (This means that 103 is not a hole that 104 goes through, but that embodiment could also be used here as well if desired.) The embodiment shown is silicone for illustrative purposes, but can be any material used for bakeware. Although 103/104 is depicted as a waffle iron pattern, there are many embodiments that can be used including, but not limited to: circles, octagons, a random pattern such as that of a honeycomb, etc. The pattern for the seals can be just one single column or you could have multiple columns next to each other to create a tighter seal. To see what an alternative embodiment of the seals at 103 and 104 might look like, we turn to FIG. 3. In FIG. 3, we can see that the same type of waffle iron pattern seal is used with a female receptor on one mold piece and a male protruding section on the other mold piece, but this time the two columns create rows that are not aligned as seen at 501 and 502. The columns and rows that are created could be aligned like they are in FIG. 2. However, as seen in FIG. 3 at 501 and 502, they are offset. For this example of 501/502 in FIG. 3, two columns with offset rows are used. This embodiment of the seal will work best when constructed of malleable bakeware materials of the likes of silicone or similar.

Figure 4:
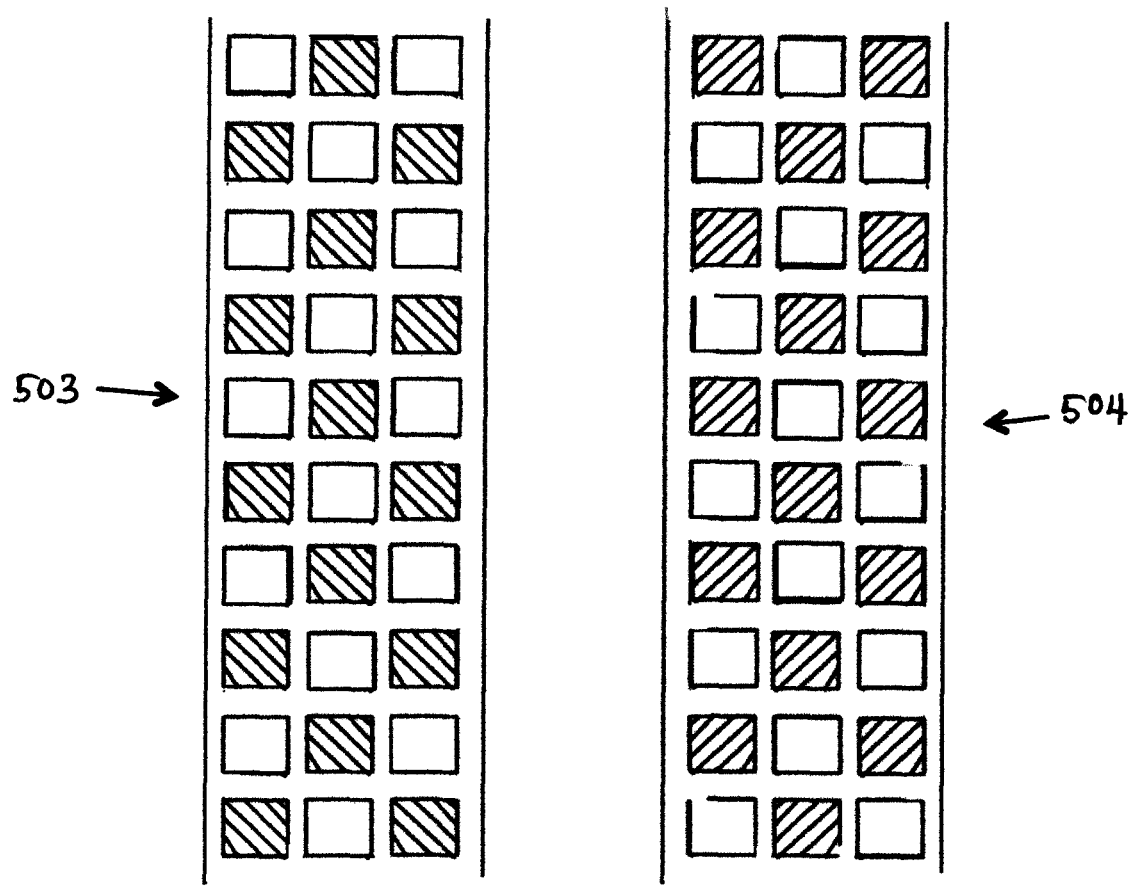
FIG. 4 is a partial perspective diagram illustrating the various components and details of an embodiment of a means for detachably coupling the various components of system for producing a comestible baked product in complex shapes using cast molding.

It also works well because the seals along the side of the embodiment depicted in FIG. 1 will be running vertically on both sides of the statue mold and will need to be tight to prevent egression. FIG. 4 also shows yet another embodiment of the waffle iron pattern seal up close at 503 and 504 where the female receptors and male protruding sections are on the same mold pieces. The opposite, alternating pattern appears on the second mold piece so that the two can seal together.

Please note, in FIG. 1, the seal at 103 and 104 can take on many different embodiments. Some examples of the types of seals include, but are not limited to the following: a seal using multiple snaps, a seal using a silicone zipper, a seal comprised of a tongue on one piece and a groove on the connecting piece, a seal designed in the way a plastic lid connects to a plastic container, a seal that functions like a zipping plastic sandwich bag, and a seal designed like nubs on one portion protruding through holes on the other portion to connect. Furthermore, some embodiments might mix and match many different types of seals. The two pieces identified in FIG. 1 at 101 and 102 will seal together to create a statue mold. Note, the material used in 101 and 102 can be sealed together for baking purposes and it can also be unsealed so as to provide access to the baked comestible without destroying it. FIG. 5 shows the two statue pieces combined at 505 prior to being attached to one of the baking cups which is part of the baking cup pan at 112.

Figure 6:
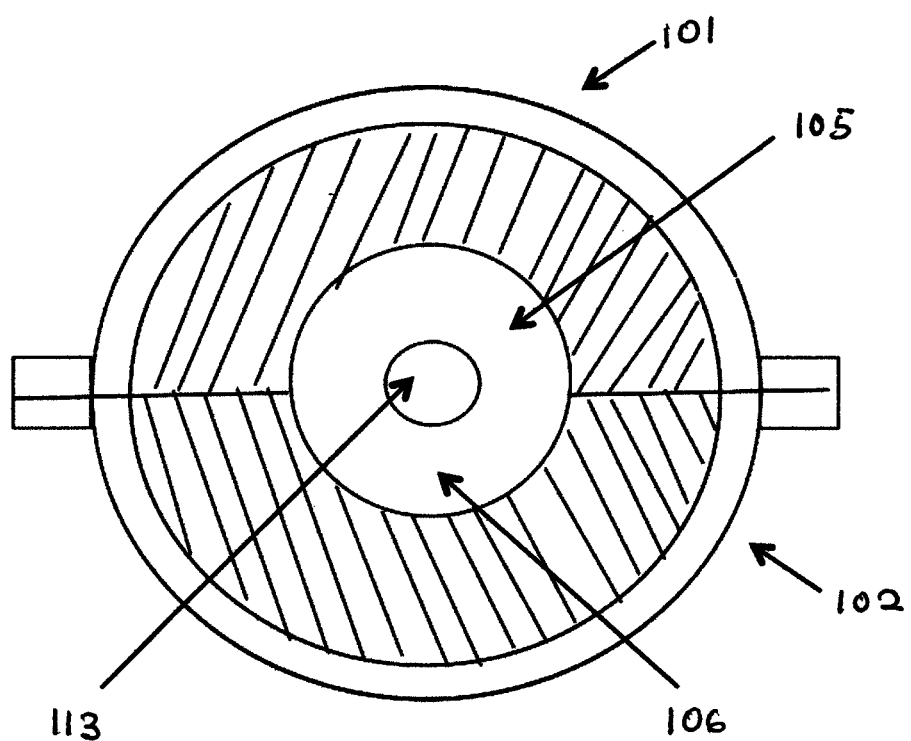
FIG. 6 is a partial perspective diagram illustrating the details of an embodiment of a component of a system for producing a comestible baked product in complex shapes using cast molding.

FIG. 1 illustrates at 105 and 106, an opening in the bottom so as to allow the baking mixture to transition from the baking cup to the statue so as to enable the comestible to be one single piece. To see what this bottom opening might look like when 101 and 102 of FIG. 5 are connected together, please refer to FIG. 6. FIG. 6 is the bottom view of 101 and 102 sealed together. It illustrates the opening that is created when 105 and 106 come together. This is the means by which the sculpture connects to the baking cup and will vary in size and shape depending on the statue design. Also, keep in mind, depending on design, there could be two or more separate such connections. For example, maybe you show an army man walking as your statue design. You could have a separate connection for each leg of the statute as a means to connect to the baking cup. Also, please note in FIG. 6 that the inner circle 113 is the opening at the top of the statue mold that is created when the two statue pieces seal together. This is where one would pour the ingredients in to the mold from above. As to be discussed later, this opening may or may not be sealed shut with a stopper seal depending on the embodiment and user preference. It can remain open as an overflow port or as a place for heat release or both.

In FIG. 1, at 107 and 108, you have a means by which to connect the statue mold comprised of 101 and 102 to a baking cup 109 as part of the baking cup pan generally at 112. In FIG. 1, 112 represents an embodiment of the baking cup pan design. Each baking cup (109) in the baking cup pan (112) in FIG. 1 has a raised rim 110. (Depending on the specific embodiment of 112, this rim 110 can be various sizes in circumference, height, diameter, shape, and thickness, etc. It can also have a lip on the rim.) 107 and 108 (as seen in FIG. 1) will come together to form a lid as seen in FIG. 5 at 180 generally. Please note, when talking about 101 in FIG. 1, the means by which to connect the statue mold 107 to the rim 110 is a bit longer than its counterpart 108 in order to create an overlap when 101 and 102 come together. Furthermore, in FIG. 1, the top portion of the lid on 101 at 170 generally is also a little bit longer than its counterpart at 175 so as to create an overlap when 101 and 102 come together. Please note, in this embodiment, the overlap takes place without the overlapping part 170 sealing to its counterpart 175. However, in alternate embodiments, it could seal using such things as, but not limited to a snap(s), zipper, etc. Furthermore, in yet other embodiments of this system, the two pieces coming together can form a lid seal without the need for overlap at 170 and 175 altogether. Simply stated, 107 and 108 and 170 and 175 could meet up flush. When they meet up flush they could have a seal connecting them in that location or they could just sit flush without the use of a seal. Furthermore, you may even have an embodiment where 170 and 175 are flush, but the overlap at 107 and 108 remains.

Figure 7:
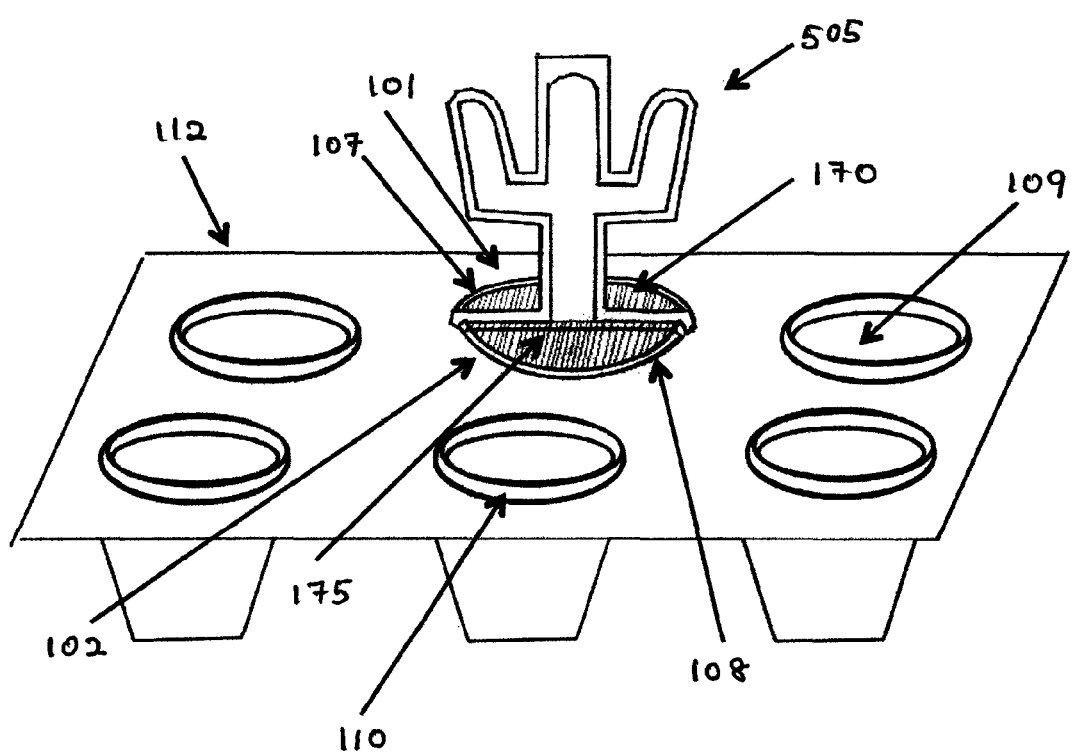
FIG. 7 is a perspective diagram illustrating the various components and details of an embodiment of a system for producing a comestible baked product in complex shapes using cast molding.

There are different means by which to attach the statue mold portion (101 and 102 sealed together) to the baking cup rim 110 of the baking cup pan 112. As seen in FIG. 7, the statue mold uses 107 and 108 to snap on or seal on to 110 like a lid. In addition to snapping on like a lid in FIG. 7, other means by which to connect 101 and 102 to the rim 110 include, but are not limited to: connecting it with snaps, sealing it with a seal that uses a waffle iron pattern type of seal described earlier, locks, snaps and locks, tongue and groove, buttons, nubs that protrude from the rim to insert into a female receptor on the mold or female receptors around the top rim that receive male protruding sections from the mold, zippers, plastic sandwich bag seals, etc.) In some embodiments, the baking cup pan does not necessarily have a rim to which a lid can attach. Such embodiments are presented as having a different technique for connecting the statue to the baking cup in the baking cup pan. The other techniques of sealing the statue mold to a baking cup, which is part of a baking cup pan mentioned above, could be employed with other baking cup pan designs. In FIG. 7, the 107 and 108 portions, which form the lid, seal on to the rim 110 of the baking cup 109 that is part of the baking cup pan 112.

Figure 26:
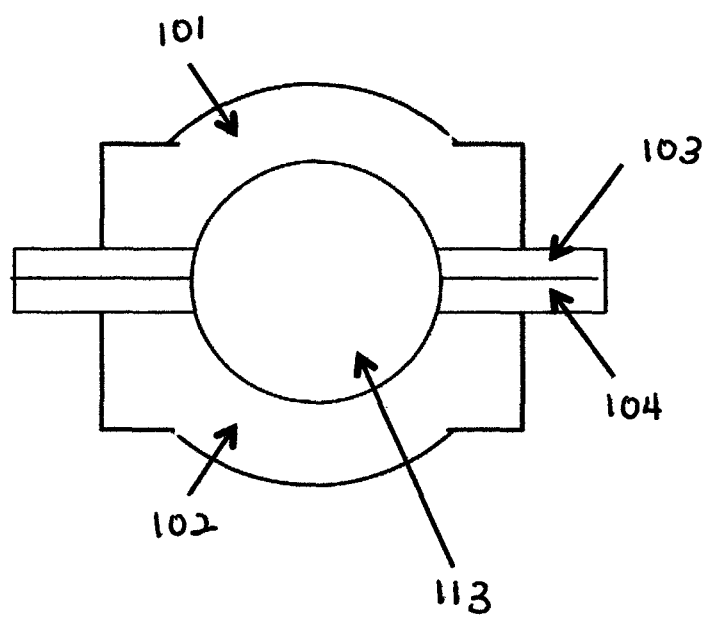
FIG. 26 is a partial perspective and cross section diagram illustrating the details of an embodiment of a component of a system for producing a comestible baked product in complex shapes using cast molding.

Furthermore, as one can see in FIG. 1, there is a stopper seal 111 that may or may not be employed. In one embodiment, the stopper seal will be inserted into the opening top portion that is created when the two mold pieces seal together to form the statue mold as seen at 113 in FIG. 26. Again, the opening 113, by which to pour ingredients into the statue mold, is illustrated in FIG. 26 when 101 and 102 seal together at 103 and 104. (FIG. 26 is an enlarged view of just the middle, top portion of the statute mold where the 113 statue opening is located. In this view, you do not see the saguaro arms, just the top mold portion of the main barrel of the cactus.) Please note, in all embodiments discussed, the seal stopper may or may not play a role in molding the statue design as it bakes. Simply stated, in FIG. 1, the bottom portion of the stopper seal 111 when inserted forms the top portion of the saguaro cactus into its round shape. So the bottom portion of a stopper seal may have different shapes to form different statue designs. For another example, FIG. 21 features a stopper seal where the bottom portion of the stopper is shaped like the peak of the mountain design. The stopper seal may not be used if one wishes to leave 113 open for overflow or for the rise of the baking ingredient or for heat release. However, if the baking ingredients are allowed to overflow into the opening, then the top portion of the comestible may need to be manually shaped or trimmed by hand after it has baked. This also may be the case if one uses a stopper seal that does not have a shape on the bottom of the stopper seal that contributes to the top portion of the mold design.

Figure 8:
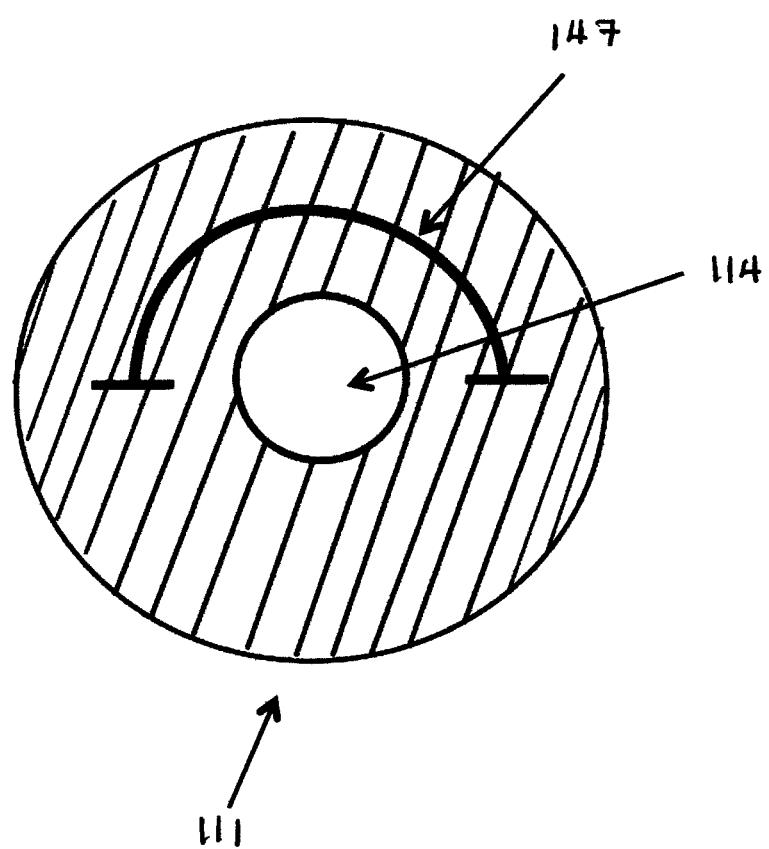
FIG. 8 is a partial perspective diagram illustrating the details of an embodiment of a stopper of a system for producing a comestible baked product in complex shapes using cast molding.

Furthermore, it is possible to potentially have vents or openings on other parts of the mold to allow for heat release or baking ingredient rising/overflow. This depends on the design of the mold. Also, a special stopper seal design may be employed that has an opening in the middle of the stopper seal to act as an overflow port to allow for ingredient overflow or heat release. See FIG. 8 to see a top view of this alternate embodiment of the stopper seal 111 with an overflow port/heat release vent 114 in the middle of it. Also, in this stopper seal embodiment, a pull handle is seen at 147 for easily removing the stopper seal once it is inserted into the statue mold. No matter what the design, the seal stopper can be attached via a tether on one of the mold pieces to ensure it is not lost or it can be a stand alone piece.

Another thing that should be mentioned here is that the system may come with a funnel to place in the opening that is created when the mold pieces are sealed together. (See 113 in FIG. 26). The funnel (which can be seen at 416 in FIG. 29) would be placed into that opening to make it easier to pour the baking ingredients into the system components comprised of the statue mold and baking cup.

In FIGS. 7, 101 and 102 are sealed together at 505. (If you were looking at FIG. 1, this would be 103 and 104 coming together.) The sealed portions at 107 and 108 connect to a baking cup rim in FIG. 7. Because the statue mold is connected to the baking cup, one can't see that particular rim in FIG. 7, but one can look at another cup in the same baking cup pan in FIG. 7 to see what the rim looks like at 110. When 107 and 108 meet up and when 170 and 175 meet up, a tight seal that prevents leakage is created. (Recall, another embodiment not shown could use a different seal at 170 and 175 to connect them together. Furthermore, 170 and 175 could be flush. In addition to meeting flush, they could also use a seal that connects them together of the likes of the seals mentioned earlier.) Simply put, the tight seals would prevent baking ingredients from overflowing the rim of the baking cup and would prevent baking material from leaking out of the sides of the statue mold.

As one skilled in the art will note, depending on how 107/108 is crafted, you can create many ways by which to connect the statue mold to the baking cup rim as previously noted. In one embodiment, in FIG. 1, 109 is a baking cup that is part of a baking cup pan 112 with a raised rim 110. When 107, 108, 170 and 175 come together in one embodiment, one has the equivalent of a lid. When 107 and when 108 are placed on the rim of the baking cup it seals to prevent fluid egression outside of the baking cup. But recall, it still maintains that opening illustrated in FIG. 6 at 105 and 106, so as to produce one solid comestible piece in which the sculpture and the baking cup are connected. (Again, depending on the statue design, there may be more than one such connection.)

It is important to note that because the baking cup rim 110 and the piece of the mold at 107 and 108 that connect to the pan can be standardized, you could technically have many different statues that are representative or not representative baking in the same pan 112. For example, you might have a pan that is making statues of different zoo animals on top of each baking cup. The baking cup pans can come in many sizes and permutations. Simply put, you could have baking cup pans of different sizes that have baking cups of different sizes. The number of baking cups per baking cup pan could also vary.

In FIG. 1, you will find a stopper seal at 111 to plug the opening at the top of the statue mold created when 101 and 102 are eventually sealed together. When 101 and 102 are sealed together, an opening 113 for filling the comestible is created. To see what this opening 113 may look like, please see FIG. 26, an enlarged view of the top portion of the statue mold where the opening occurs when 102 and 103 are sealed together. An opening at the top is needed to pour the batter ingredients into the sealed mold and baking cup below. You can bake the ingredients without adding the steal stopper if you so desire. As seen in FIG. 1 and FIG. 26, this opening 113 can function as a fill opening and may be left open as an overflow port. Others may want to seal it up tight with a stopper seal 111. The steal stopper can be solid, or as seen in the top view of the stopper 111 in FIG. 8, it can come with a stopper seal opening 114 in the middle of the stopper to act as an overflow port to allow for ingredient overflow or heat release. This seal stopper can be attached via a tether on one of the mold pieces to ensure it is not lost or it can be a stand-alone piece.

The method is straight forward, but like the system itself, it can have different permutations. Referring to FIG. 1 to help identify the pieces being referenced, let's examine one embodiment of the method. First, one must decide if they wish to use a baking cup liner or not. If they do, a baking cup liner will be placed in the baking cup 109 which is part of the baking cup pan 112. Next, the mold pieces 101 and 102 seal together by using the seals at 103 and 104. Furthermore, one can join the 107 overlapping portion with 108, as well as the overlapping portion at 170 with 175. (Again, in other embodiments 107 and 170 don't have to necessary overlap with their counterparts. It may be just flush without any seal connecting them. When 107 and 170 connect with their counterparts, it may be flush, but still employ a seal to keep them connected. Seals used here can be any of the aforementioned seals previously noted or not noted.) One would then seal the connected statue mold (as seen connected in FIG. 5) on to the baking cup rim 110. (One can see the statue mold connected to the baking cup rim of the baking cup which is part of the baking cup pan in FIG. 7) (An alternate way of attaching the statue mold to the baking cup rim, for example, can start by attaching 102 at 108 to the baking cup rim 110, followed by attaching 101 at 107 at the baking cup rim 110. After you adhere those two components to the rim, you can seal it up using 103 and 104. Whether you connect 101 with 102 by sealing 103 and 104 prior to attaching it to the rim with 107 and 108 or whether you attach 101 and 102 to the rim with 107 and 108 and then seal 101 and 102 by using 103 and 104, either way is feasible.) Once the statue mold is sealed together and once the statue mold is sealed to the baking cup, one will pour the baking ingredients into the system. The seal stopper at 111 in FIG. 1 will be inserted into the opening top portion 113 of the statue mold illustrated in FIG. 26 when 101 and 102 seal together at 103 and 104. (FIG. 26 is an enlarged view of just the middle, top portion of the statute mold where the 113 statue opening is located. In this view, you do not see the saguaro arms, just the top portion of the main barrel of the cactus.) Then the system (with its ingredients inside) is placed in the oven upright to bake. After baking, it is cooled and the pieces are unsealed to reveal the comestible inside. In one embodiment of the method, one would first remove the stopper seal 111. Next, one would unseal 103 from 104. Then, one would unseal 107 and 108 from the rim 110. Finally, the comestible is removed from the baking cup 109. (Of course, the last steps might vary a bit depending on preference. One, after removing the stopper seal 111, may unseal 107 and 108 from the rim 110, followed by unsealing 103 and 104. Theoretically, you don't have to remove the stopper seal first when unsealing the comestible, but it is advised if the comestible is delicate. However, removing the stopper seal first before unsealing anything else is possible in one embodiment of the method.)

Figure 9:
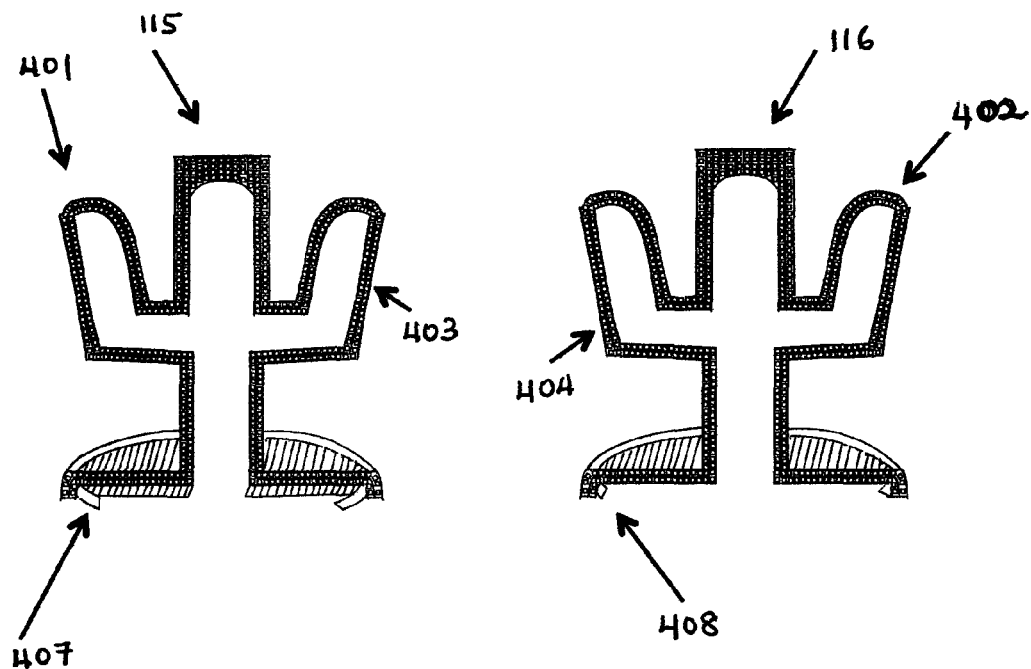
FIG. 9 is a perspective and cross section diagram illustrating the various components and details of an embodiment of a system for producing a comestible baked product in complex shapes using cast molding.

In another embodiment of the system seen in FIG. 9, the mold pieces 401 and 402 can have the seals run continuously across the top portion of the statue mold pieces as seen at 115 and 116. In this embodiment, the sides of the statue mold would be sealed together and then mounted to the baking cup rim 410 of the baking cup 409 which is part of the baking cup pan 412. The seal portion across the top section (115 and 116) would remain open to allow one to pour the baking ingredients through this unsealed opening. After adding the ingredients, the filling opening that was created by not sealing 115 and 116 can be sealed. One would want to seal the top portion to ensure the mold for the top of the statue was properly shaped. Alternatively, 115 and 116 can remain open after filling the statue mold and baking cup to function as an overflow port to allow for ingredient overflow and heat release if the user prefers. While this embodiment in FIG. 9 shows the seals going continuously across the top portion of the statue mold, it is important to point out that another embodiment of this top section of the mold could provide for open spaces between the seals to allow for overflow or heat venting. (To elaborate, the seal at the top of the statue mold could have a snap, followed by an open space, followed by a snap. That way, it would be partially sealed, but could still permit overflow or heat release at the top of the mold.) Also, it is important to note, if one wanted to seal up the system completely, it is plausible, based on the statue design, to put heat or overflow holes on the top portion or top side portions of the mold to allow for overflow or heat release that are independent of the seals altogether.

Figure 29:
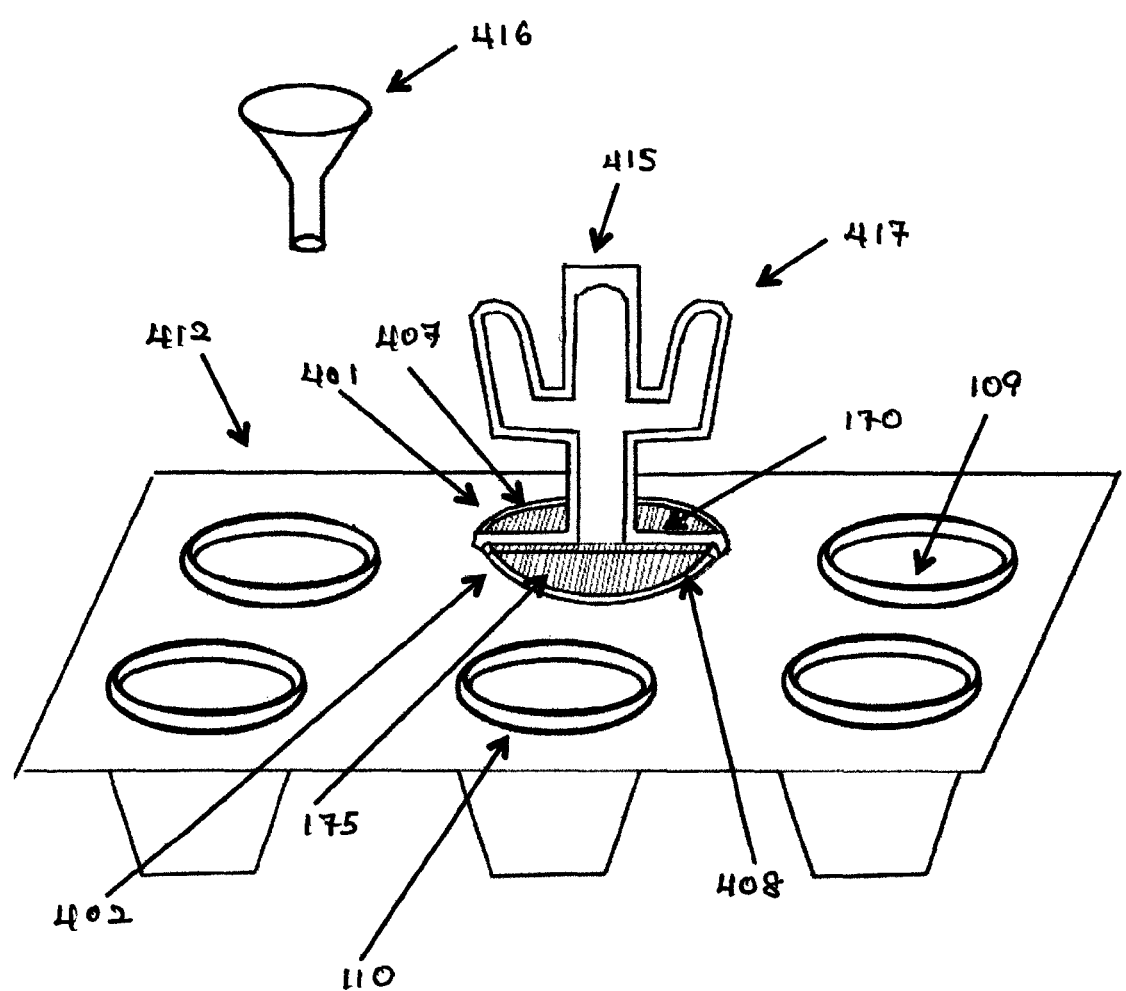
FIG. 29 is a perspective diagram illustrating the various components and details of an embodiment of a system for producing a comestible baked product in complex shapes using cast molding.

Furthermore, when filling the ingredients via the unsealed top generally at 115 and 116, one may wish to use a funnel like the one shown at in FIG. 29 at 416.)

The method for using this system is very easy and actually has many possible permutations as dictated by preferences. The embodiment of the method in this case would be to add a baking cup liner to the baking cup 409 in FIG. 9 which is part of the baking cup pan 412. If you don't want a baking cup liner, skip this step. Then, connect 408 onto the baking cup rim 410 of the baking cup 409 and then connect 407 onto the baking cup rim 410 as well (or vice versa). Next, connect seals 403 to 404 working your way to the top. (If one prefers, they could have connected 401 and 402 by using the seals 403 and 404 first. Then, with 401 and 402 sealed, the statue mold should be attached to the baking cup rim of the baking cup which is part of the baking cup pan by using seals 407 and 408. FIG. 29 shows the statue mold pieces 401 and 402 sealed together at 417 and the statue mold sealed to the baking cup rim of the baking cup which is part of a baking cup pan at 407 and 408 generally.) Then, pour the ingredients in via the opening 415 that is created by not sealing 115 and 116 together. For ease of pouring the baking ingredients into the system components comprised of the statue mold and the baking cup which is part of the baking cup pan, a funnel 416 may be used. You can leave the opening, which is created by not sealing 115 and 116 together which is shown in FIG. 9, open to allow for rising, overflow, and/or heat release. Or, alternately you can seal it shut by sealing 115 and 116. Next, place the system filled with ingredients into the oven to bake. After baking, remove from the oven and let it cool. Finally, using FIG. 9 as a reference, remove the comestible by unsealing 407 and 408 from 410 and by unsealing 403 and 404. (You could also reverse this order if desired by unsealing 403 and 404 and then unsealing 407 and 408.) Then remove the comestible from the baking cup 409.

In another embodiment, a standard multi-cup baking pan can be modified to receive one or more of the cast molds. For instance, a silicone cover can be placed over the pan. The silicone cover may include a sealable interface to the statue portion of the mold and an opening coinciding with the cups. The cover may further include a sleeve that exists around the perimeter of the hole and that is elastically held against the wall of the cups. Thus, in such an embodiment the statue portion of the mold can then be sealed against the top portion of the cover and the cup serves as the bottom portion of the mold. Similarly, the silicone cover may include a rim to which the statue portion of the mold is connected. Further, rather than a silicone cover, a cover of another material, such as metal, etc., may be laid across the cup pan and held in place with clips, silicone bands, etc. In such embodiments, the cover still includes holes to coincide with the cups of the pan and sleeves, or other means that create a seal between the cover and the cups. The upper surface of such covers will then include an interface to seal with the statue portion of the mold.

It will also be appreciated that in some embodiments, multiple mold pieces may be interchangeable. For instance, a set of 5 mold pieces may be configured such that any two of the pieces could be connected to create different shapes and figures. As an example, molds for forming the numbers 0-9 may be included in a kit and, the statue portion of the mold may accept any one of these additional molds.

Figure 10:
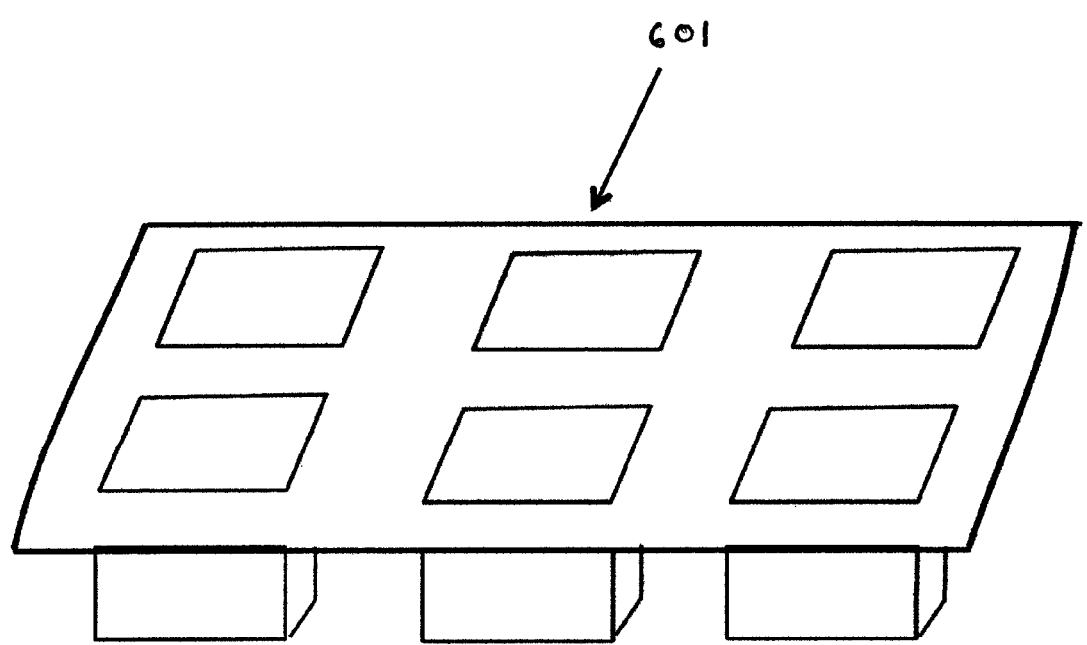
FIG. 10 is a perspective diagram illustrating the details of an embodiment of a component of a system for producing a comestible baked product in complex shapes using cast molding.

There are different embodiments of the baking cup pan for this system being discussed that one of ordinary skill in the art would surely acknowledge. For example, one will note that the baking cup pan could vary the number of available baking cups it contains and the way they are arranged in the pan. For instance, you could have them directly across from each other or staggered. You can have one row of baking cups, or multiple rows. Furthermore, the baking cup which is a part of the baking cup pan may take on any shape, circumference, size, height, volume, or depth. As mentioned, in addition to being different sizes, the baking cup could be the traditional cup or it could be a non-traditional shape including, but not limited to: the shape of a square, rectangular, octagon, triangle, etc. See FIG. 10 to see non-traditional baking cups in the form of squares which are part of a baking cup pan at 601 generally. They too could have a raised rim or raised rim and lid as well. Furthermore, the baking cup could be made from any bakeware materials including, but not limited to silicone and metals. In fact, it could even be a combination of any bakeware materials. For example, the baking cup pan could be metal and the baking cups in the baking cup pan could be silicone.

There are also different embodiments for the way in which the statue mold pieces attach to the baking cup pan which is part of the baking cup. For example, different seals can be used to attach the mold to the raised rim of the baking cup. Or, the baking cup which is part of a baking cup pan may not have a raised rim but rather another means by which to seal the statue mold to the baking cup that requires a different type of seal. For example, the baking cup pan may be a traditional baking cup pan but with female receptors encircling the circumference of the baking cup that a statue mold with male protrusions could fit into to create a seal. The opposite could be true, the baking cup could have male protrusions around the baking cup and the statue mold could have female receptors that allow the two parts to seal together. Another possible type of seal could be a tongue and groove system where the baking cup has a groove around it and the statue mold has a tongue portion that fits into it. (The tongue and groove could be reversed so that the groove is on the mold instead, and the tongue is around the baking cup.) These types of seals could also be used on a raised rim if one desired to use them instead of the lid seal seen in FIG. 7.

Figure 11:
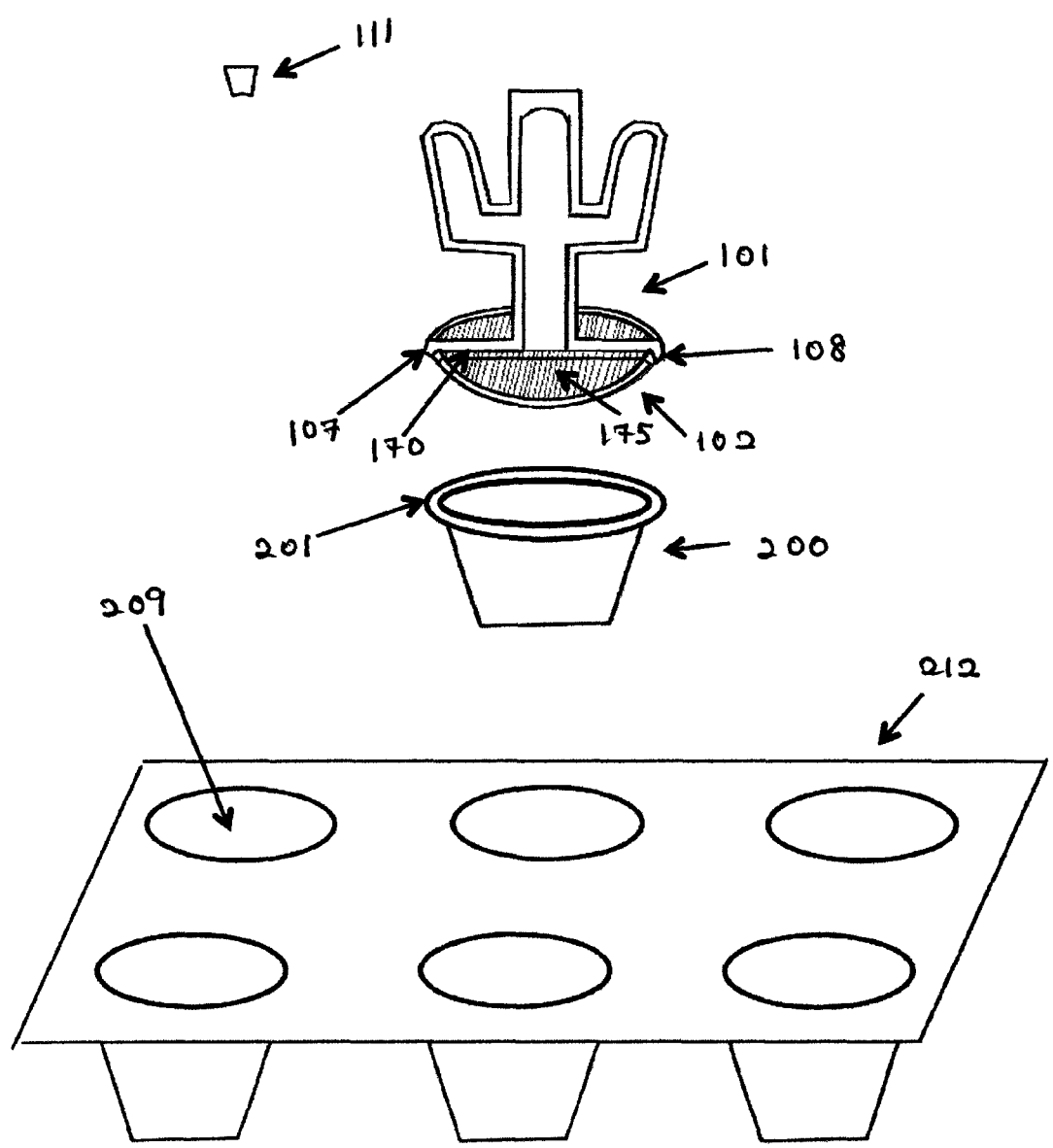
FIG. 11 is a perspective diagram illustrating the various components and details of an embodiment of a system for producing a comestible baked product in complex shapes using cast molding.

An alternate embodiment for the system can be viewed in FIG. 11. Here the statue mold pieces 101 and 102 are sealed together in the same way they are sealed in FIG. 5. However, instead of 101 and 102 eventually being sealed to the baking cup 109 which is part of the baking cup pan 112 as seen in FIG. 5, it is illustrated in FIG. 11 that the statue mold pieces (101 and 102) are sealed together and are attached to its own individual baking cup illustrated at 200. The individual baking cup 200 in this embodiment has a lip 201. In FIG. 11, the statue mold pieces 101 and 102 at 107 and 108 seal to the individual baking cup lip 201. In FIGS. 11, 107, 108, 170, and 175 all come together to form a lid that fits on the lip 201 of the individual baking cup. While the illustrated embodiment shows the statue mold (101 and 102 sealed together) which will be sealed to the individual baking cup 200 via the lid approach to a lip 201 on a baking cup, one skilled in the art would acknowledge that many different techniques by which to attach the statue mold (101 and 102) to the individual baking cup could be employed. For example, many of the different sealing techniques disclosed throughout this entire description could function as a possible means by which to seal the statue to the baking cup. As a non-limiting example, the snap approach depicted in FIG. 14 can be used to attach the individual cup 200 to the sealed mold pieces 101 and 102 with or without a raised rim or with or without a lip. In FIG. 11, a tongue and groove 200 type seal can be used to connect 101 and 102 to 200. There are many possibilities, but all embodiments by which to seal the statue mold to the baking cup are not listed here. In FIG. 11, once the sealed statue mold 101 and 102 are sealed to the individual baking cup 200, the entity is placed in to a baking cup 209 which is part of a baking cup pan 212. The baking cup pan 212 looks like a traditional baking cup pan. However, although it looks like a traditional baking cup pan, the baking cup pan 212 used with this system's embodiment will usually have baking cups that are a little bigger (e.g. wider diameter and/or circumference and/or perhaps deeper) than traditional baking cups in traditional baking cup pans because one needs to allow some extra room for the space the individual baking cup 200 occupies when sitting in the baking cup 209 of the baking cup pan 212. When the individual baking cup 200 is placed into the baking cup 209 of the baking cup pan 212, it should fit securely enough so as not to tip over when moving to the oven or removing from the oven. Also, the individual baking cups 200 can be standardized along with the pans, so that you could bake a number of different statue designs in the same baking cup pan 212 at once. At 111 in FIG. 11, there is a stopper seal. After the ingredients are poured into the connected mold pieces that sealed to the individual baking cup, the stopper seal 111 is inserted into the opening at the top of the mold that is created when 101 and 102 are sealed together. Please recall, the stopper seal can help shape the comestible as it bakes if the bottom portion of the stopper seal completes the shape of the statue mold. FIG. 11 could have used the embodiment for the top portion of the mold pieces seen in FIG. 9, but FIG. 11 uses the stopper seal approach. Had it used top portion of the mold pieces illustrated in FIG. 9, this would be yet another embodiment. The materials from which any of these embodiments are constructed can be any acceptable material used in bakeware including, but not limited to silicone, metal, etc.

The method for this embodiment would begin by deciding if one wanted to add a baking cup liner to the individual baking cup 200. Then, one would seal 101 and 102 together. Next, with 101 and 102 sealed together to form the statue mold, it would be sealed to the individual baking cup 200 at its lip 201 via 107 and 108 generally. (The process could be reversed. 101 and 102 could be sealed to the lip 201 of the baking cup 200 via 107 and 108 generally and then 101 and 102 could be sealed together as well.) Then, the mold pieces (101 and 102) that are sealed to the individual baking cup 200 would be placed into the baking cup 209 which is part of the baking cup pan 212. Next, the baking ingredients would be added via the top opening of the system which is created when 101 and 102 are sealed together. Next, the stopper seal 111 would be inserted into the top opening if preferred. Then, the system is placed into the oven for baking After it has baked, the system could be removed from the oven. Next, the individual baking cup 200 which is attached to the mold pieces 101 and 102 with the stopper seal attached (if used) is removed altogether from the baking cup 209 which is part of the baking cup pan 212. Next, the stopper seal 111, if used, would be removed from the system. Then, the statue mold pieces 101 and 102 could be unsealed from each other. Next, 101 and 102, generally at 107 and 108, could be unsealed from the lip 201 of the individual baking cup 200. Finally, the comestible could be removed from the individual baking cup 200. (Again, this unsealing process could be reversed as well, starting by unsealing the mold pieces 101 and 102 from individual baking cup 200 first. Then, 101 and 102 can be unsealed.) Some of the steps in this process can be varied and achieve the same result with this system. For example, the system could have been filled with baking ingredients prior to putting it in the baking cup pan. Furthermore, one could have removed the stopper seal while the connected mold and individual baking cup was still sitting in the baking cup pan.

Figure 12:
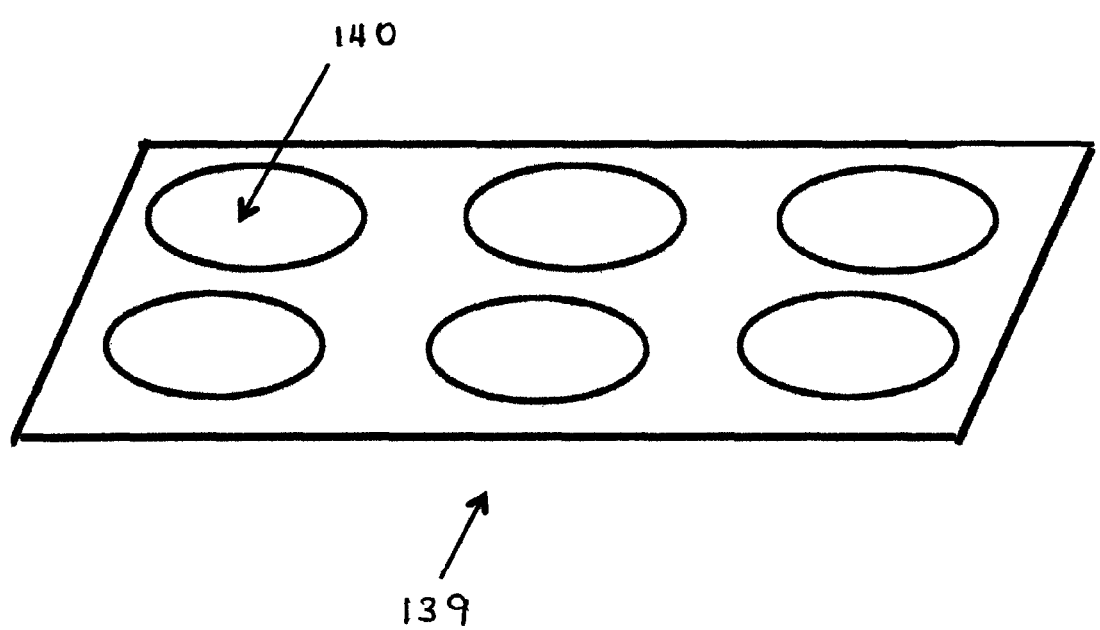
FIG. 12 is a perspective diagram illustrating the details of an embodiment of a component of a system for producing a comestible baked product in complex shapes using cast molding.

It is also important to note that the baking cup pan 212 illustrated in FIG. 11 could take on a more dramatically different embodiment than just merely altering baking cup size, width, volume, depth, circumference, shape, etc. For example, the baking cup pan could take on the embodiment illustrated in FIG. 12 at 139. As seen, 139 is a baking cup pan without any cups at all. Simply stated, 139 could be a baking cup pan with just baking cup openings. Then, when 101 is sealed with 102 and connected to the baking cup 200 via 201, the individual baking cup could just slide through the baking cup opening 140 on this embodiment of the baking cup pan until it could not slide any more. Because the sides of the baking cup are tapered, the cup would go through the circular cut out until it can't go any more and then would stop. Of course, the baking cup openings 140 in this embodiment couldn't be larger then the individual baking cup 200 because the individual baking cups would go right through the baking cup openings.

Figure 30:
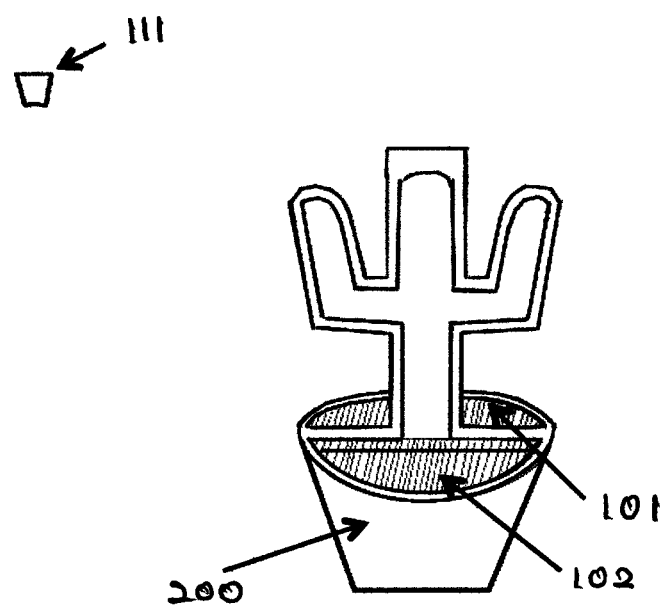
FIG. 30 is a perspective diagram illustrating the various components and details of an embodiment of a system for producing a comestible baked product in complex shapes using cast molding.

A person of ordinary skill in the art would also acknowledge that one could use the statue mold (101 and 102 sealed together) and the individual baking cup 200 described previously in FIG. 11 as a separate system as seen in FIG. 30. The difference between the embodiment in FIG. 11 and FIG. 30 is that FIG. 30 does not sit in a baking cup pan. Technically, this could be a three part system embodiment as seen in FIG. 30 comprised of the two statue mold pieces (101 and 102) and the individual baking cup 200. Or, it could be a four part system if the stopper seal 111 is used. The materials from which any of these embodiments are constructed can be any acceptable material used in bakeware including, but not limited to silicone, metal, etc.

Simply put, a method one might use would be to first decide if they wanted to add a baking cup liner to the individual baking cup 200. Then, one would seal 101 and 102 together. Next, with 101 and 102 sealed together to form the statue mold, the statue mold would be sealed to the individual baking cup 200. (Please note, the last two steps in the process could be reversed. In other words, 101 and 102 could be sealed to the baking cup 200 first and then 101 and 102 could be sealed to each other next.) Then, baking ingredients would be added via the top opening of the system which is created when 101 and 102 are sealed together. Next, the stopper seal 111 would be inserted into the top opening if preferred. Then, it is placed into the oven for baking After it has baked, the system could be removed from the oven. Next, the stopper seal 111, if used, would be removed from the system. Then, the statue mold pieces 101 and 102 could be unsealed from each other. Next, 101 and 102 could be unsealed from the individual baking cup 200. Finally, the comestible can be removed from the individual baking cup 200. (Again, like above, this unsealing process could be reversed as well, starting by unsealing the mold pieces 101 and 102 from individual baking cup 200 first. Then, 101 and 102 could be unsealed from each other.) Furthermore, it should be noted that one who uses this embodiment of the system might choose to place the system on a baking sheet before placing it in the oven. However, to place the systems on a cookie sheet and not use the baking cup pan embodiment, one runs the risk of tipping over the connected molds which are sealed to the individual baking cups as they are transported to and from the oven.

Figure 13:
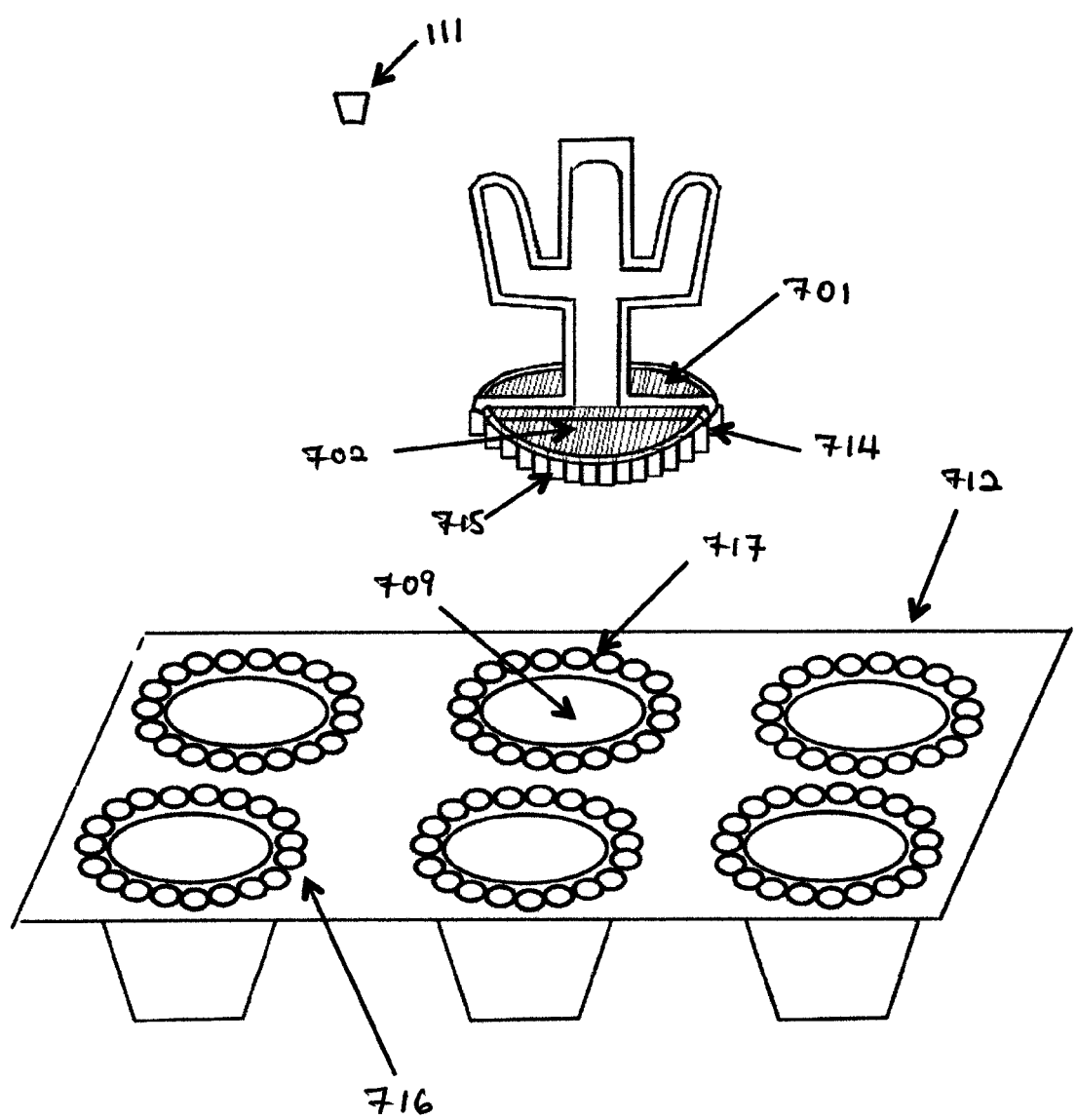
FIG. 13 is a perspective diagram illustrating the various components and details of an embodiment of a system for producing a comestible baked product in complex shapes using cast molding.

Another embodiment of the system as viewed in FIG. 13, presents a different means by which to seal the statue mold to the baking cup which is part of a baking cup pan. In FIG. 13, we see that, at 714 and 715, a new means by which to seal the statue mold to the baking cup pan generally at 712 is showcased. Here in FIG. 13, the protruding nubs shown at 714 and 715 snap into female receptacles at 717. This embodiment has a baking cup pan 712 that does not feature a raised rim or a raised rim with a lip or a lip. Instead, at 716 generally, it does have receptacles 717 all around the edge of the individual baking cups 709 which are part of a baking cup pan 712 to which 714 and 715 can fit into. Furthermore, a person of ordinary skill in the art will appreciate that in another embodiment, 717 could be the protruding male nubs and 714 and 715 could be where female receptacles are located. (The raised rim could have also been employed here and the receptacles/protruding nubs could have been placed in/on a raised rim surrounding the baking cup as well.) Again, a stopper seal 111 can be used to shape the top portion of the statue mold which would otherwise be open.

Figure 14:
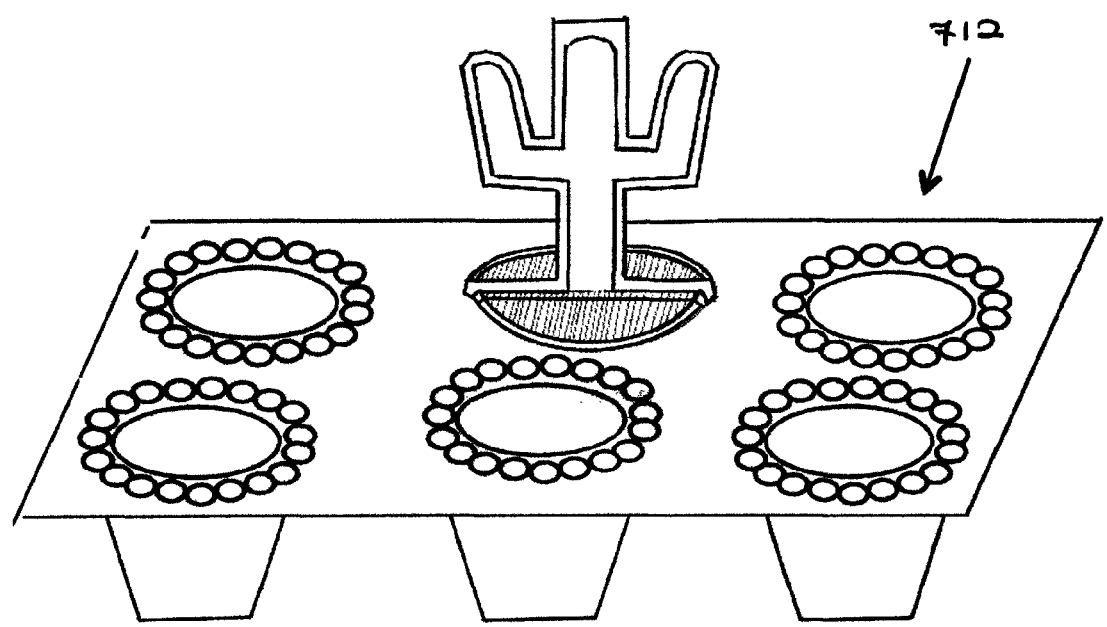
FIG. 14 is a perspective diagram illustrating the various components and details of an embodiment of a system for producing a comestible baked product in complex shapes using cast molding.

See FIG. 14 to see what it looks like when the statue mold in FIG. 13 at 714 and 715 generally seals to 717 on the baking cup pan 712.

The method for this embodiment would begin by deciding if one wanted to add a baking cup liner to the baking cup 709 which is part of the baking cup pan 712 seen in FIG. 13. Then, one would seal 701 and 702 together (701 and 702 refer to the two mold pieces that comprise the statue mold). Next, with 701 and 702 sealed together to form the statue mold, it would be sealed to the baking cup 709 at 717 which is part of the baking cup pan 712. (The process could be reversed. 701 and 702 could be sealed to the baking cup 709 at 717 which is part of the baking cup pan 712 and then 701 and 702 could be sealed together as well.) Next, the baking ingredients would be poured into the top opening of the system which is created when 701 and 702 are sealed together. Next, the stopper seal 111 would be inserted into the top opening if preferred. Then, the system is placed into the oven for baking After it has baked, the system could be removed from the oven. Next, the stopper seal 111, if used, would be removed from the system. Then, the statue mold pieces 701 and 702 could be unsealed from each other. Finally, 701 and 702 could be unsealed from the baking cup 709 at 717. (Again, this unsealing process could be reversed as well, starting by unsealing the mold pieces 701 and 702 from baking cup 709 first at 717. Then, 701 and 702 can be unsealed. Also, the stopper seal could technically be removed at different stages in the unsealing process too.)

Figure 27:
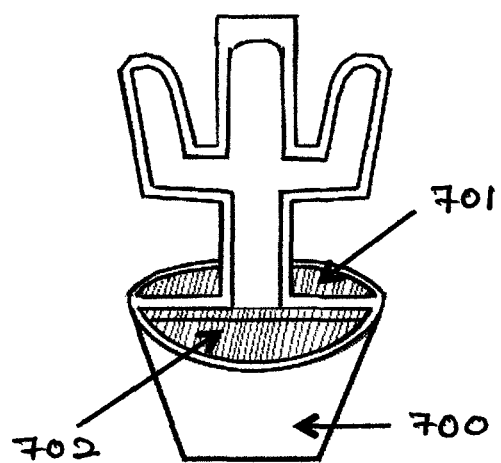
FIG. 27 is a perspective diagram illustrating the various components and details of an embodiment of a system for producing a comestible baked product in complex shapes using cast molding.

It is also important to note that the embodiment represented in FIG. 13 and FIG. 14 could also be implemented with a single baking cup instead of with a baking cup which is part of a baking cup pan. FIG. 27 shows what this embodiment would look like if the statue mold, when sealed together, was sealed to an individual baking cup 700, instead of sealed to an individual baking cup as part of a baking cup pan. (The way the statue mold seals to the baking cup in both instances is the same.)

Simply put, a method one might use for the above embodiment would be to first decide if they wanted to add a baking cup liner to the individual baking cup 700. If they so desired, one would add a baking cup liner to 700. Then, one would seal 701 and 702 together. Next, with 701 and 702 sealed together to form the statue mold, the statue mold would be sealed to the individual baking cup 700. (Please note, the last two steps in the process could be reversed. In other words, 701 and 702 could be sealed to the baking cup 700 first and then 701 and 702 could be sealed to each other next.) Then, baking ingredients would be added via the top opening of the system which is created when 701 and 702 are sealed together. Next, the stopper seal 111 would be inserted into the top opening if preferred. Then, the system is placed into the oven for baking After it has baked, the system would be removed from the oven. Next, the stopper seal 111, if used, would be removed from the system. Then, the statue mold pieces 701 and 702 could be unsealed from each other. Finally, 701 and 702 could be unsealed from the individual baking cup 700. (Again, like above, this unsealing process could be reversed as well, starting by unsealing the mold pieces 701 and 702 from the individual baking cup 700 first. Then, 701 and 702 could be unsealed from each other.) Furthermore, it should be noted that one who uses this embodiment of the system might choose to place the system on a baking sheet before placing it in the oven. Or, the individual baking cup embodiment featured in FIG. 27 could also be placed in a traditional baking cup pan prior to baking.

Figure 15:
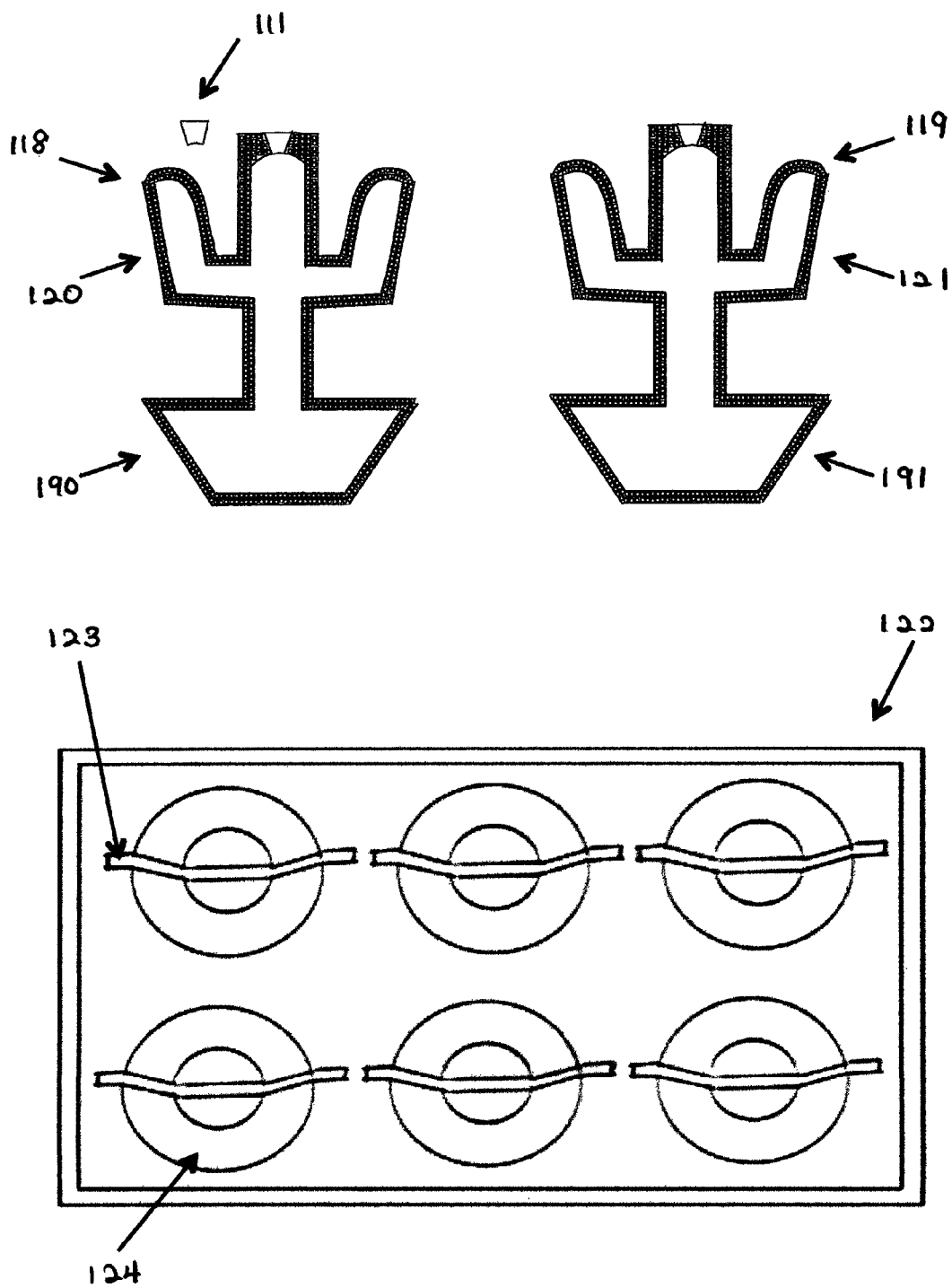
FIG. 15 is a plan and cross section diagram illustrating the various components and details of an embodiment of a system for producing a comestible baked product in complex shapes using cast molding.
Figure 16:
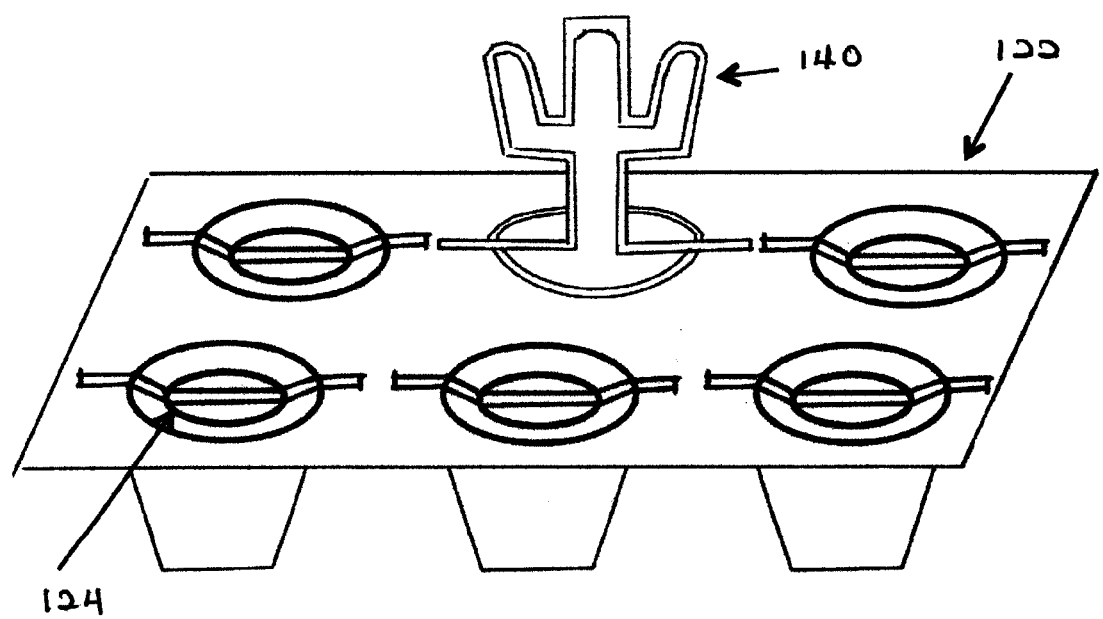
FIG. 16 is a perspective diagram illustrating the various components and details of an embodiment of a system for producing a comestible baked product in complex shapes using cast molding.

Another embodiment of the system and method for baking a comestible sculpture that is representative or abstract on top of a baking cup so as to produce one solid comestible piece in which the sculpture and the baking cup are connected is illustrated in FIG. 15. At 118 and 119 in FIG. 15, one will note a few differences from the previous embodiments. First, the two connecting pieces 118 and 119 create the individual baking cup when sealed together and they also creates the statute mold that is connected to the baking cup. The seal employed at 120 and 121 runs all around the perimeter of each piece, starting at the top and working its way all around the piece and back to the top. (Again, for this embodiment, numerous seal types can be used). This alternate embodiment when sealed will sit upright in the specially designed pan represented at 122 in FIG. 15. As one will note, in FIG. 15, the seal goes all around the edges of the statue mold and the baking cup pieces. Thus for the pan generally at 122 to accommodate this seal, it must have a trough 123 that bisects the top of the pan before the baking cup begins, then the trough goes down the baking cup wall, next the trough goes across the bottom of the baking cup, then the trough goes up the other baking cup wall, and finally the trough goes out of the baking cup back on top of the other side of the baking cup pan completing its bisection. This trough is illustrated at 123 in FIG. 15 and provides a means for 120 and 121 when sealed together to sit in a baking cup 124 which is part of a baking cup pan 122 and to stand upright in the baking cup pan as seen in FIG. 16. There is also a stopper seal illustrated in FIG. 15 at 111. Again, a stopper seal 111 can be used to shape the top portion of the statue mold which would otherwise be open. As previously stated, this system can be made out of any bakeware materials or combination thereof. For example, the two connecting pieces can be silicone or some other material; the pan could be silicone or some other baking material or combination there of Like the standardization mentioned earlier, in FIG. 15 the seals at 120 and 121 that come together and ultimately sit in trough 123 could be standardized on the pieces 118 and 119. Thus, you could have a cactus sculpture on top of a baking cup cooking next to a coyote sculpture on top of a baking cup in the same baking cup pan. It is important to note that this embodiment, along with the other embodiments, can also incorporate a baking cup liner if desired. Finally, the embodiment demonstrated shows the top portion of 118 and 119 as the same as the top portion in 101 and 102 of FIG. 1. In other words, they both can accommodate a stopper seal. An alternate embodiment of the design in FIG. 15 may instead completely seal the top portion of 118 and 119 as seen in FIG. 9 at 115 and 116. A funnel could be used to pour the ingredients in prior to sealing it shut in this case. It is also feasible that one may not seal that top portion shut as well.

Thus, the method of use for this embodiment is simple. One will decide if they wish to use a baking cup liner or not. If they wish to have one, they will add it into either half the baking cup at 190 or into the other half of the baking cup at 191 in FIG. 15 before sealing 118 to 119. (Recall, when 118 and 119 connect together, a baking cup is created at 190 and 191.) The seals used to connect these pieces are at 120 and 121 generally. When they seal together they form once piece 140 which is seen in FIG. 16. Next, as seen in FIG. 16, one would place the sealed connected pieces 140 into a baking cup 124 which is part of the baking cup pan at 122. The trough 123 accommodates the combined seals that are formed when seals 120 and 121 come together. Then, once the two connecting pieces are connected and placed in the baking cup which is part of the baking cup pan, one would fill the sealed connecting pieces with baking ingredients from the top via the fillable opening that is created when 118 and 119 are sealed together. (The top can have many different embodiments. It can have a seal like that featured in FIG. 9. Simply put, you leave that top portion open while you are filling and then seal it shut after you have filled the system with baking ingredients. Or, you could leave it open or partially sealed too. Furthermore, you can use the stopper seal featured in FIG. 1 to seal the top opening. In fact, this is the same stopper seal 111 seen in FIG. 15. This stopper seal can completely seal the system closed, or it can have a hole in it to allow for overflow or heat exchange. One might even elect not to use a stopper seal on an embodiment designed to employ the stopper seal.) Next, for this particular embodiment, one inserts the seal stopper 111 (seen in FIG. 15) into the opening that is created when 118 and 119 are sealed together. Then the comestible is baked. Next, the system is removed from the oven and cooled. Then, the comestible is removed from the system by first removing the stopper seal 111. Then, the sealed connecting pieces 120 and 121 as denoted at 140 in FIG. 16 is removed from the baking cup generally at 124 which is part of the baking cup pan 122. Then the comestible is revealed by unsealing the seal 120 and 121 as seen in FIG. 15. Finally, the comestible is removed.

Please note, the shape of the baking cups in the above embodiment can also be different sizes too. As someone with ordinary skill in the art would appreciate, the baking cup pan and the connecting pieces can come in many sizes, designs, heights, volumes, and shapes. Furthermore, another embodiment can utilize an individual baking cup instead of using the baking cup 124 in the baking cup pan 122 seen in FIG. 16. This is ideal if you just want to cook one cupcake for example. The design of the individual baking cup for this embodiment would be the same as the baking cup pan for this embodiment, but it would just be one individual baking cup that it would sit in. See FIG. 28 to see what this embodiment would look like in an individual baking cup with no pan. 118 and 119 from FIG. 15 are the two connecting pieces that come together to form 140 in FIG. 28. 140 can be seen in FIG. 28. 140 are inserted into the trough 142 of the individual baking cup 141. As you will note, although this is a stand-alone individual baking cup, it still has the trough at 142. The cup in essence has to be wider than your normal baking cup, so as to provide a perimeter 143 for which the trough 142 can be sunk into. To see what the individual baking cup 141 looks like, please see FIG. 31. Furthermore, it is possible to take this embodiment represented in FIG. 28 and put it into a baking cup pan before placing it in the oven. Please note this baking cup pan would be deeper and wider than the traditional baking cup pan in order to accommodate the wider diameter.

Figure 28:
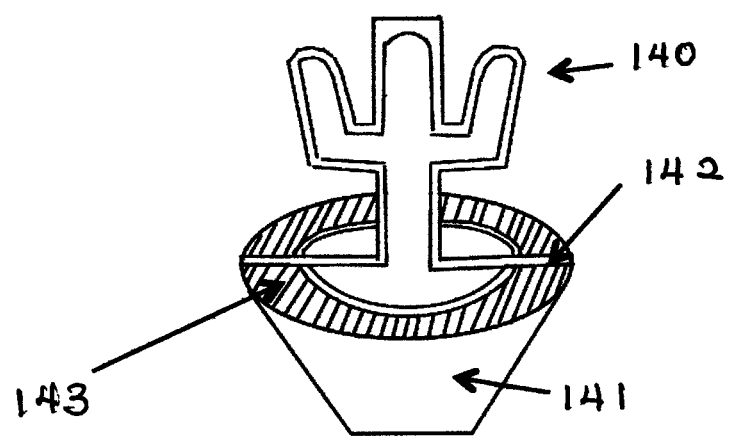
FIG. 28 is a perspective diagram illustrating the various components and details of an embodiment of a system for producing a comestible baked product in complex shapes using cast molding.
Figure 31:
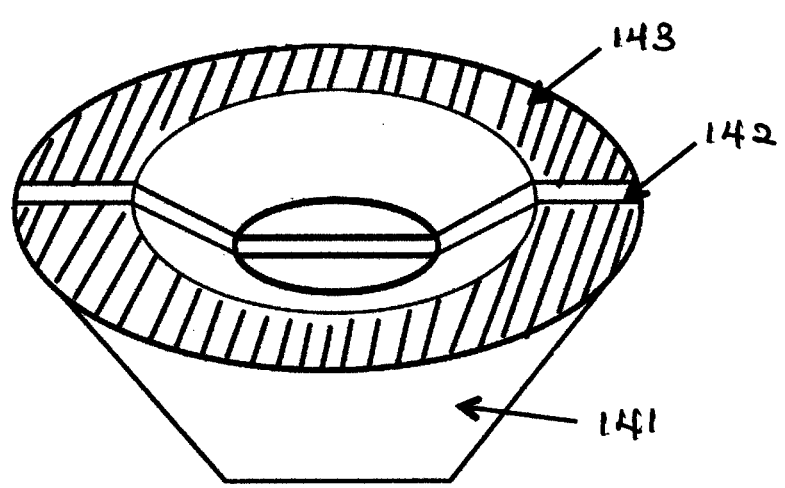
FIG. 31 is a perspective and cross section diagram illustrating the details of an embodiment of a component of a system for producing a comestible baked product in complex shapes using cast molding.

Thus, the method of use for this embodiment is simple. One will decide if they wish to use a baking cup liner or not. If they wish to use one, they will it add it into the baking cup portion at 190 or 191 as seen in FIG. 15 before sealing 118 to 119. Next, one would place the sealed connected pieces into the individual baking cup 141 as seen in FIG. 31. The trough 142 in FIG. 31 accommodates the combined seals that are formed when seals 120 and 121 shown in FIG. 15 come together. Then, as seen in FIG. 28, once the connecting pieces are connected and placed in the individual baking cup 141 which has trough 142, one would fill the sealed connecting pieces with baking ingredients from the top via the fillable opening. The fillable opening is created when 118 and 119 are sealed together. 118 and 119 can be seen in FIG. 15. (The top can have many different embodiments. It can have a seal like that featured in FIG. 9. Simply put, you leave that top portion open while you are filling and then seal it shut after you have filled the system with baking ingredients. Or, you could leave it open or partially sealed too. Furthermore, you can use the stopper seal featured in FIG. 15 to seal the top opening. This stopper seal 111 can completely seal the system closed, or it can have a hole in it to allow for overflow or heat exchange.) Next, for this particular embodiment, one decides whether they wish to insert the stopper seal 111 (seen in FIG. 15) into the opening that is created when 118 and 119 are sealed together. Then, the comestible is placed in an oven to bake. Next, the system is removed from the oven. Finally, the comestible is removed from the system by first removing the stopper seal 111 if inserted. Then, the connected pieces 120 and 121 as denoted at 140 in FIG. 28 is removed from the individual baking cup 141. Then, the comestible is revealed by unsealing the combined seals at 140. Finally, remove the comestible. (Furthermore, it is possible to modify this method of using the system represented in FIG. 28 by putting it into a baking cup pan before placing it in the oven. Please note this baking cup pan would be deeper and wider than the traditional baking cup pan in order to accommodate the wider diameter.)

Figure 17:
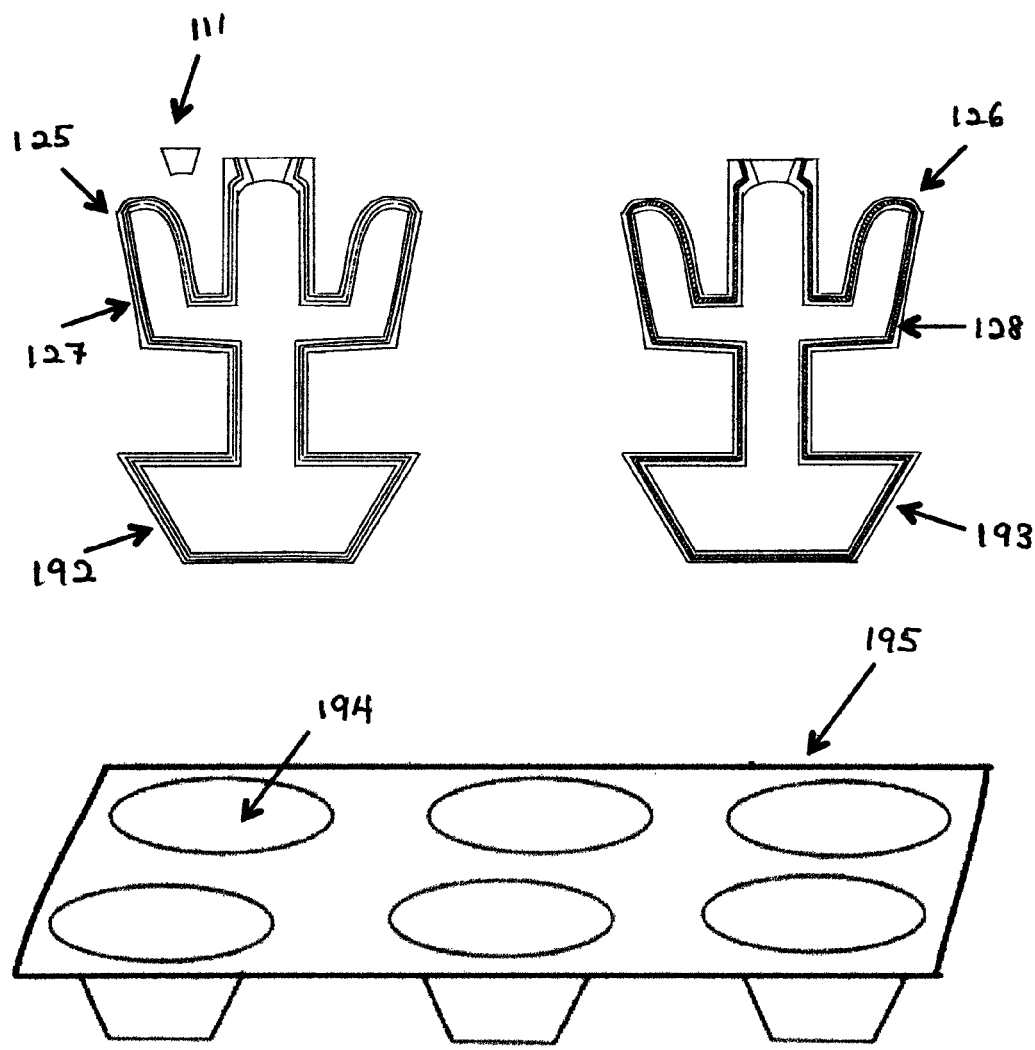
FIG. 17 is a plan and cross section diagram illustrating the various components and details of an embodiment of a system for producing a comestible baked product in complex shapes using cast molding.

Another embodiment of the system and method for baking a comestible sculpture that is representative or abstract on top of a baking cup so as to produce one solid comestible piece in which the sculpture and the baking cup are connected is illustrated in FIG. 17. FIG. 17 is comprised of: two connecting pieces 125 and 126, a baking cup pan 195, and a stopper seal 111. The two connecting pieces create the individual baking cup when sealed together and they also create the statute mold that is connected to the baking cup. The two connecting pieces in FIG. 17, comprised of 125 and 126, has a seal that goes around the perimeter of each piece for the statute and baking cup. However, FIG. 17 is different from FIG. 15, because FIG. 17 features seals on 125 and 126 at 127 and 128 that do not create an edge or overhanging seam. The reason the two pieces come together without having any overhang is because seals on both 125 and 126 at 127 and 128 are housed inside the connecting pieces 125 and 126 themselves. To see an up-close view of 126 at 128 see FIG. 32. In others words, looking at the one connecting piece 126 up close in FIG. 32, one will see half the interior statue mold generally at 801 and half the baking cup at 808. Then, one will see the internal wall 802 that forms the statue mold design and separates the statue mold from the chamber 803 housing the seal. Next, one will see at 804 the outside wall of the mold piece 126. The chamber 803 created between the internal wall 802 and the outside wall 804 houses the seal 128. In the chamber 803, any type of seal can be used.

Figure 32:
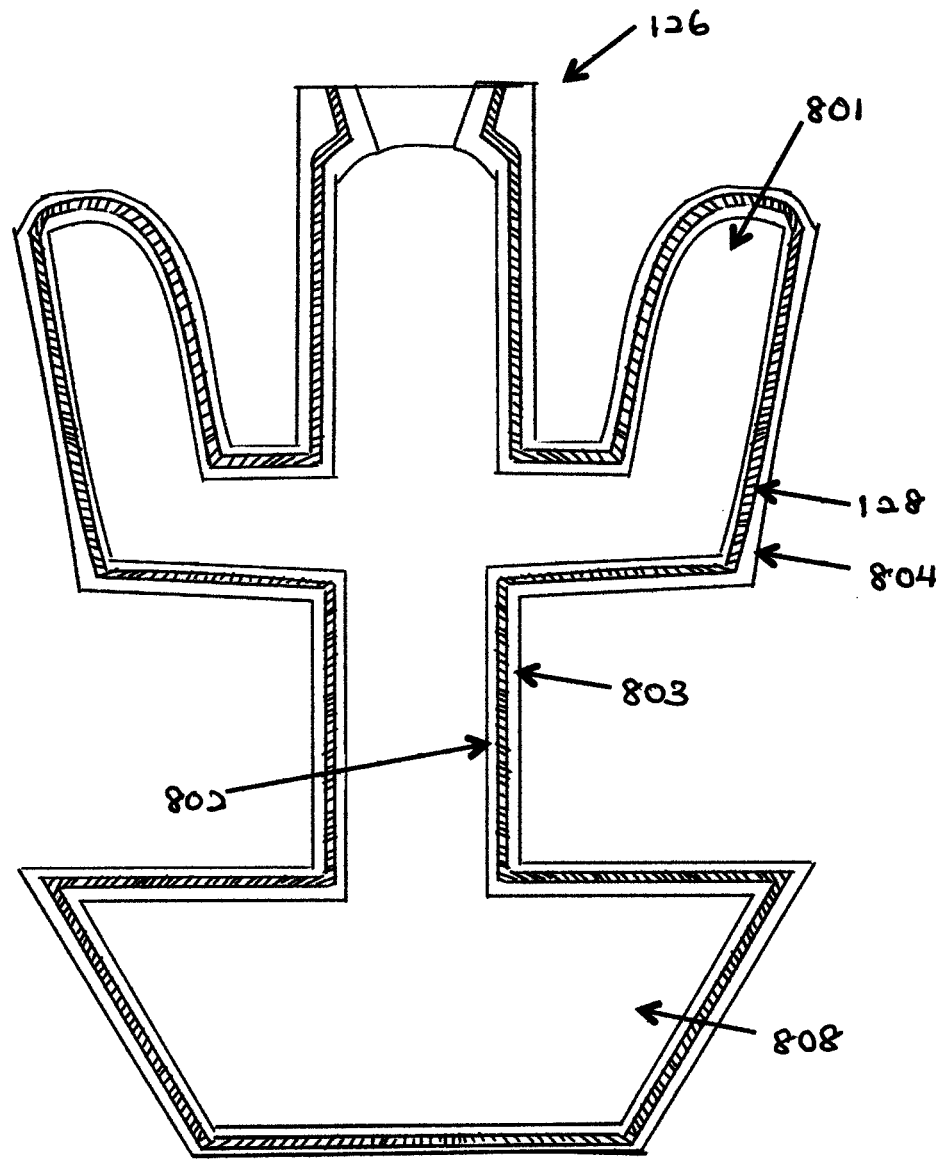
FIG. 32 is a perspective and cross section diagram illustrating the details of an embodiment of a component of a system for producing a comestible baked product in complex shapes using cast molding.
Figure 33:
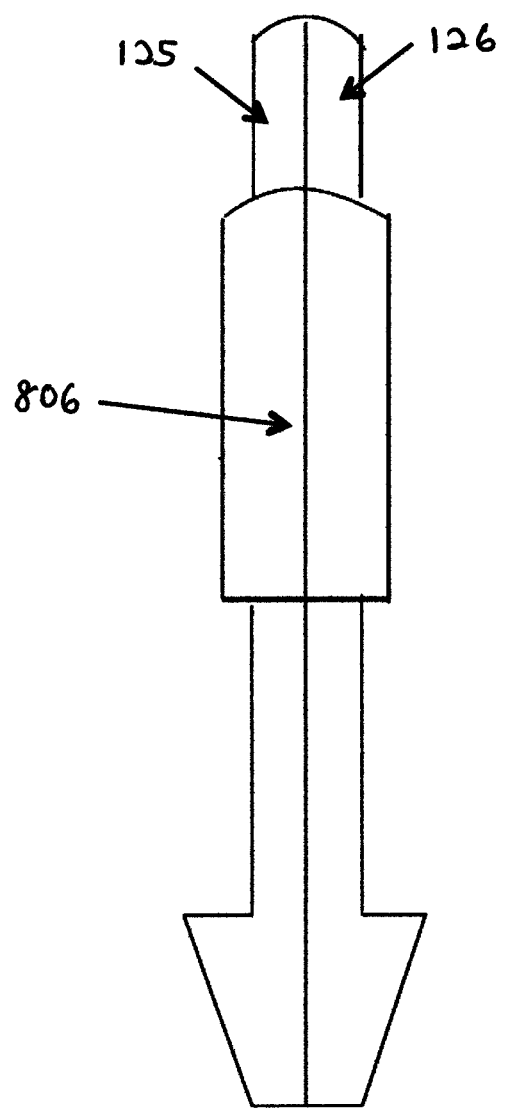
FIG. 33 is a perspective diagram illustrating the details of an embodiment of a component of a system for producing a comestible baked product in complex shapes using cast molding.
Figure 34:
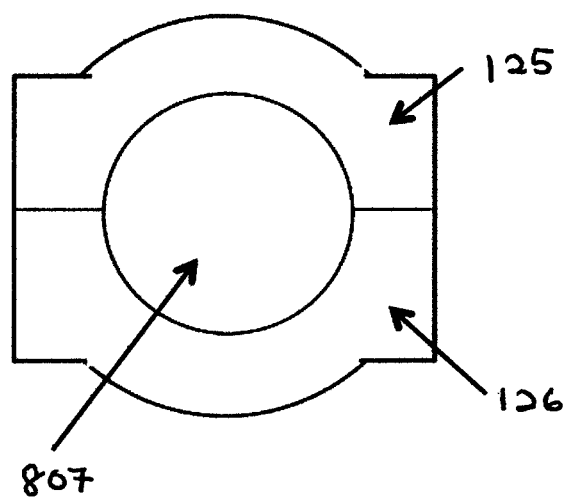
FIG. 34 is a partial perspective and cross section diagram illustrating the details of an embodiment of a component of a system for producing a comestible baked product in complex shapes using cast molding.

Element 128 in FIG. 32 features a tongue seal that will connect into the groove seal on the opposite connecting piece 125 seen in FIG. 17. In FIG. 33, one can see a side view of 125 and 126 coming together at 806 flush. FIG. 34 shows the up-close, top view of 125 and 126 coming together to form the top portion of the main barrel of the cactus in this embodiment without any overhang or without seam edges sticking out (the arms of the cactus are not visible in this view). This FIG. 34 can be contrasted with the embodiment represented in FIG. 26. Both embodiments use a stopper seal to seal the opening that is created when both connecting pieces come together. The opening in FIG. 34 is found at 807. Keep in mind, for this embodiment, 127 and 128 have been made with a tongue and groove seal. (Other types of seals can be used and placed in the chamber 803 as seen in FIG. 32 including, but not limited to: snaps, male protrusions on one side/female receptors on another side, etc.) In addition to the two connecting pieces, one will also see in FIG. 17 the other components of the system which include the baking cup pan at 195 and the stopper seal at 111. The baking cup pan can be a traditional baking cup pan, but the baking cups may need to be a little larger to accommodate the two connecting pieces once it is fully assembled and inserted into the baking cup 194 which is part of the baking cup pan 195. As a result when we go from the exploded view in FIG. 17 to what it looks like all assembled in FIG. 18, one can see that combined connecting pieces at 129 fit in a baking cup generally at 194 which is part of the baking cup pan generally at 195. Again, after this embodiment is sealed together, we can see how the device fits nicely in the baking cup 194 of the baking cup pan at 195. It should be further noted that the connecting pieces when sealed together produce a flat bottom underneath the baking cup so that when it sits up right, it sits flat. The bottom is stable and does not allow the device to lean or list. If other embodiments use connecting pieces like 125 and 126, that when sealed together produce a bottom underneath the baking cup that is not flat, devices including, but not limited to: pads, legs, feet could be attached to ensure it is level when standing up right after being sealed. These same devices could also be used to ensure it is stationary. The baking cup pan 195 used with this embodiment may have baking cups that are a little bigger (e.g. wider diameter and/or circumference and/or perhaps deeper) than traditional baking cups in traditional baking cup pans because one needs to allow some extra room for the space the device occupies when connected and placed in the baking cup. As one skilled in the art will acknowledge, the baking cups in the baking cup pan can also vary in number of cups per pan, can vary in size, depth, shape, circumference, and volume, and can vary in arrangement in the pan. When the sealed connecting pieces are placed into the baking cup which is part of the baking cup pan, it should fit securely so as not to tip over when moving to the oven or removing from the oven. Again, the connecting pieces when sealed together can be standardized along with the pans, so that you could bake a number of different statue designs in the same baking cup pan. Tongue and groove is the type of seal showcased here, but the concept of not having protruding edges at the seam can also be accomplished with many different types of seals as previously mentioned. In other words, the two connecting pieces depicted in FIG. 17 at 125 and 126 could conceivably interlock with snaps or via male and female connectors at 127 and 128.

Figure 18:
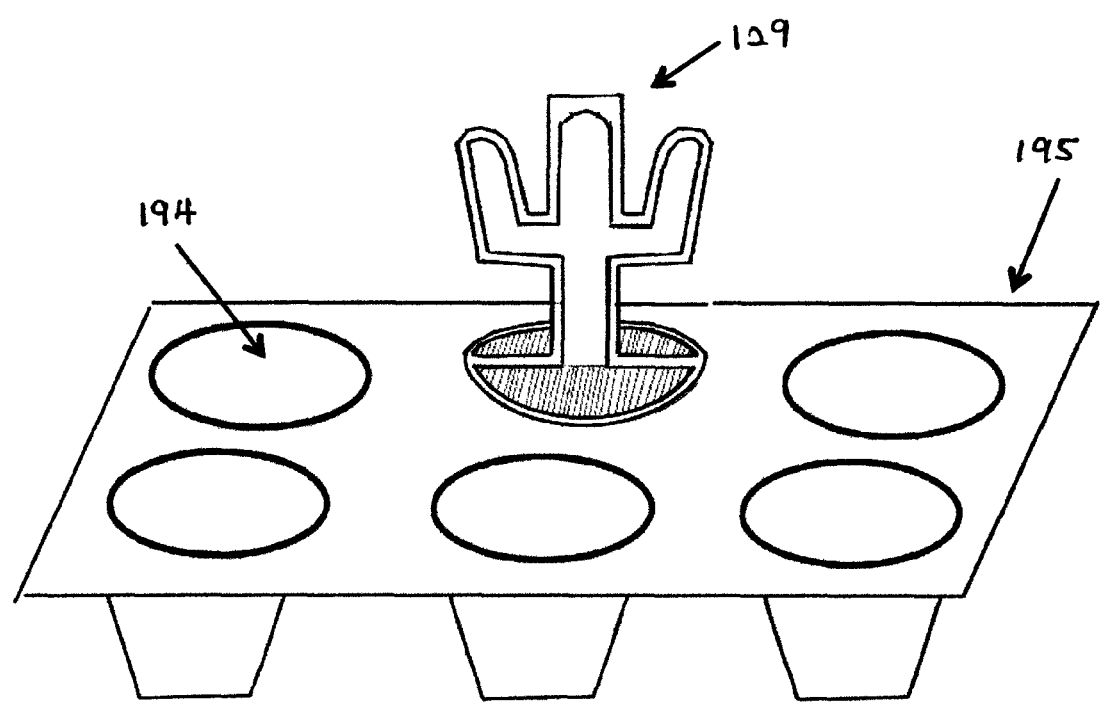
FIG. 18 is a perspective diagram illustrating the various components and details of an embodiment of a system for producing a comestible baked product in complex shapes using cast molding.

The method for this embodiment is straight forward, just like the previously mentioned method for the other embodiment. Simply stated, one will decide if they wish to use a baking cup liner or not. If they wish to have one, they will add it into the baking cup portion at 192 or 193 in FIG. 17 before sealing 125 to 126 by using seals 127 and 128. Next, looking at FIG. 17, one would place the sealed, connected pieces (125 and 126 joined) into the baking cup 194 which is part of the baking cup pan at 195. Then, once the connecting pieces are sealed and placed in the baking cup 194 which is part of the baking cup pan 195, one would fill the system with baking ingredients from the top via the opening seen in FIG. 34. (It is important to note that the vertical running seals seen in FIG. 17 at 127 and 128 come together to create a leak proof seal that prevents the ingredients from egressing outside when upright). Next, for this particular method for this embodiment, the seal stopper 111 (seen in FIG. 17) is inserted into the top opening of the device that was created when the two connecting pieces 125 and 126 sealed together. (A user may opt not to use the stopper seal.) Then, the system is placed into the oven and the comestible is baked. After baking, the system is removed from the oven. Next, the sealed, connecting pieces (as seen in FIG. 18 at 129) is removed from the pan with the stopper still inserted. Then, the stopper seal 111 featured in FIG. 17 is removed and connecting pieces 125 and 126 are unsealed at 127 and 128 to reveal the comestible. Finally, the comestible is removed. (Of course, there can be different variations on this method including, but not limited to: someone removing the stopper seal while 129 is still in the baking cup pan 195, etc.)

Figure 19:
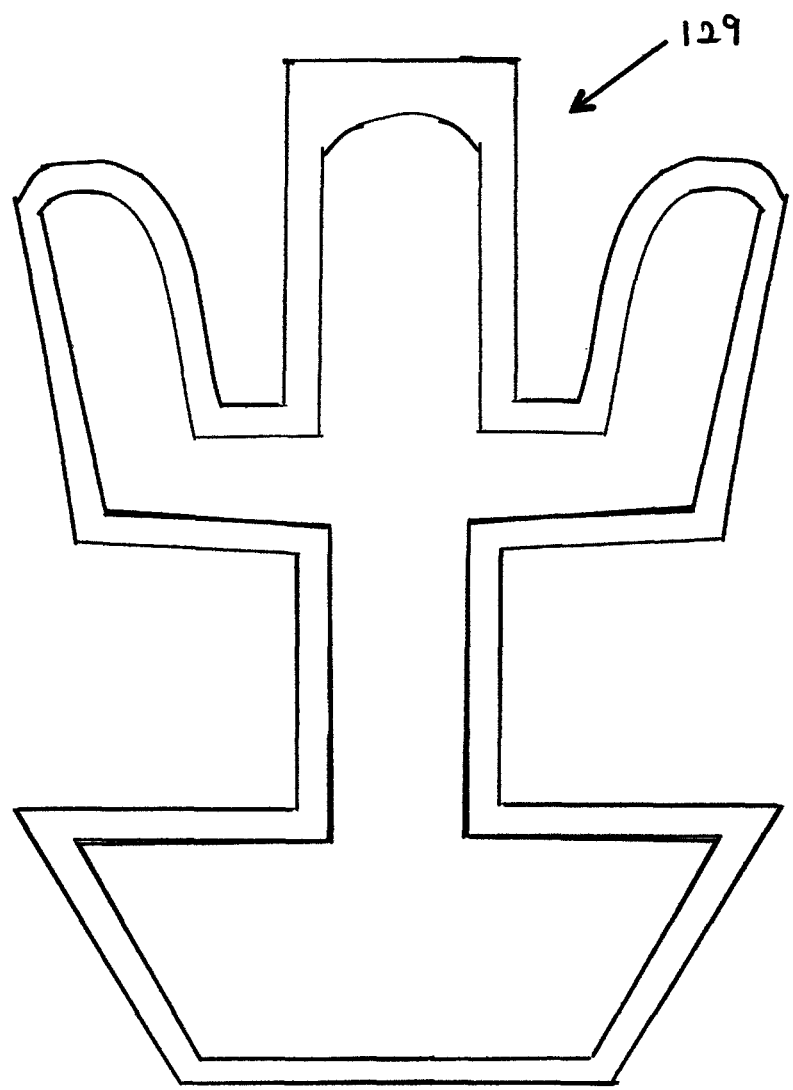
FIG. 19 is a plan diagram illustrating the various components and details of an embodiment of a system for producing a comestible baked product in complex shapes using cast molding.

A person of ordinary skill in the art would also acknowledge that one could use the two connecting pieces (125 and 126) featured in FIG. 17 with or without the stopper seal 111 as a separate system if they desired to not incorporate usage of the baking cup pan. Simply put, FIG. 19 shows what this embodiment of the system would look like. As one can see, the two connecting pieces 125 and 126 featured in FIG. 17 are shown in FIG. 19 as sealed together 129. The two connecting pieces when sealed together create a baking cup on the bottom and a statue mold that is connected to the baking cup. (To recall what this looks like on the inside, see 125 and 126 of FIG. 17). As previously seen in FIG. 17, the two connecting pieces create a baking cup on the bottom of the device that can accommodate a baking cup liner. Specifically, this cup is formed when sections 192 and 193 in FIG. 17 join together. Furthermore, when the two connecting pieces are sealed and the device is sitting upright (upright is when the baking cup base created when 192 and 193 are joined together sits flat on a level surface), one can fill the device with baking ingredients via the top opening that was created when the two connecting pieces were sealed together. (To recall what this opening looks like, please see FIG. 34.) When filled, the seals on the sides of the device that run vertically when the two connecting pieces are sealed together prevent baking ingredient egression from the inside out when the device sits upright. (To recall what this vertical running seal looks like on the side of these two adjoined, connecting pieces, see FIG. 33.) The optional seal stopper 111 can be inserted once the ingredients are added, or it can be left out and the opening can be used for heat exchange or ingredient overflow/ingredients rising. The stopper seal should be especially used if the bottom portion of the stopper seal helps form or shape the top portion of the statue mold. (To recall this, please see 111 in FIG. 1, or 199 in FIG. 21. 111 in FIG. 1 helps form the top portion of a cactus statue when inserted. 199 helps shape the top portion of a mountain peak statue when inserted.) Although the embodiment in FIG. 19 uses only two connecting pieces to construct the device (i.e., the two connecting pieces when sealed together creates a baking cup on the bottom and a statue mold that is connected to the baking cup above), other embodiments may choose to use three or more connecting pieces to create this same device described above. Furthermore, the upright baking cup (which can accommodate a baking cup liner) that is created when the pieces are sealed together can be of various sizes, shapes, dimensions, and volumes.

One embodiment of the method for the system embodiment of FIG. 19 is as follows. Determine if one wishes to use a baking cup liner or not. If so, insert the baking cup liner upright into 125 or 126 at the baking cup 192 or 193. (125, 126, 192, and 193 can all be seen in FIG. 17). Then, seal 125 to 126. When the two connecting pieces are sealed forming 129 in FIG. 19, one will add baking ingredients via the opening that is created when the two pieces were sealed together. This opening 807 can be seen in FIG. 34. Next, the seal stopper 111 (as seen in FIG. 17) is inserted in the opening. Then, the system is placed in the oven upright for baking. The comestible bakes in the system and the system is removed from the oven. Next, after it cools, the stopper seal 111 is removed. Then, the two connecting pieces 125 and 126 (as seen in FIG. 17) which are currently still sealed together is unsealed, revealing the comestible within. Finally, the comestible is removed. (As a special note, some may elect to place the system on a baking sheet like a cookie sheet and transport it to and from the oven that way).

Figure 20:
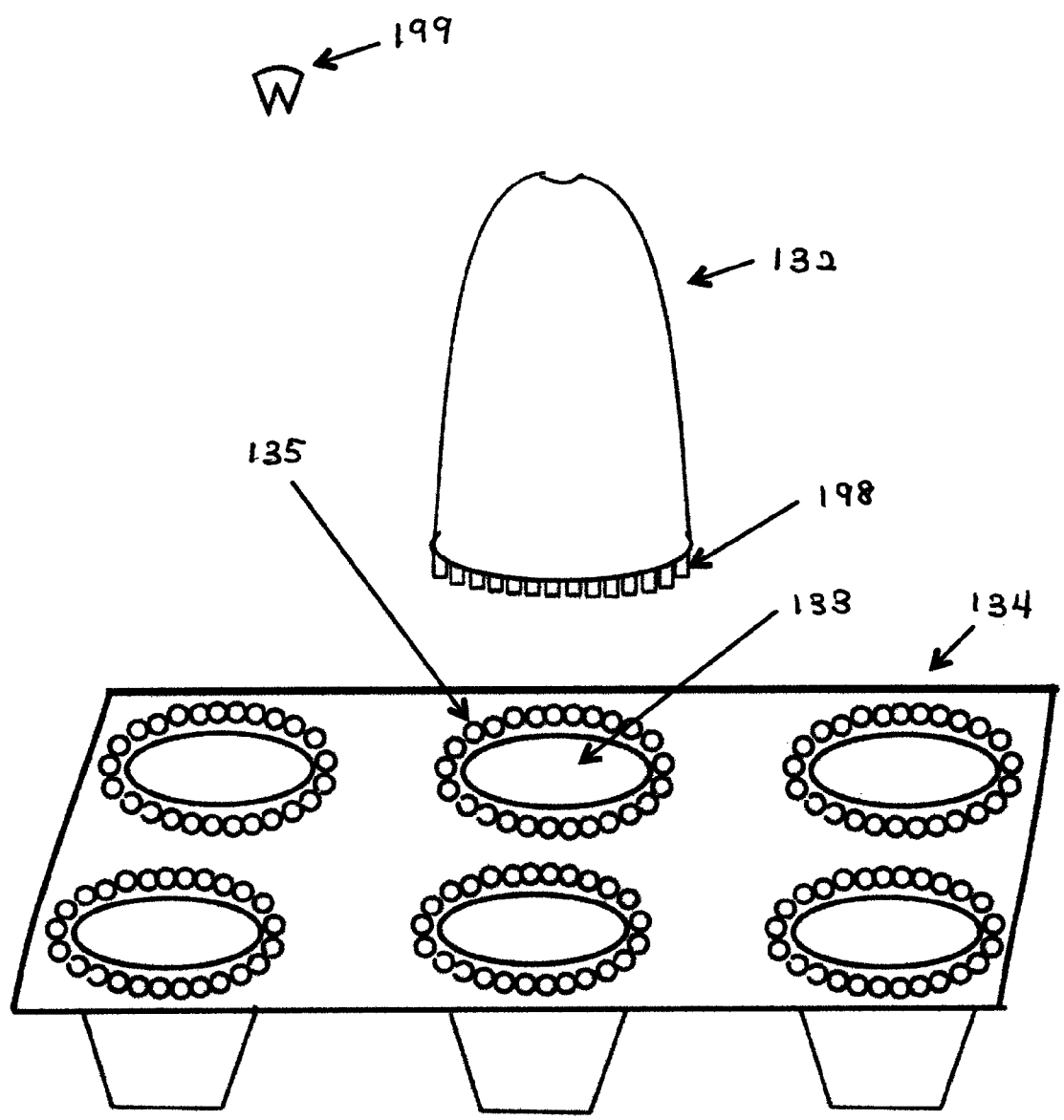
FIG. 20 is a perspective diagram illustrating the various components and details of an embodiment of a system for producing a comestible baked product in complex shapes using cast molding.
Figure 22:
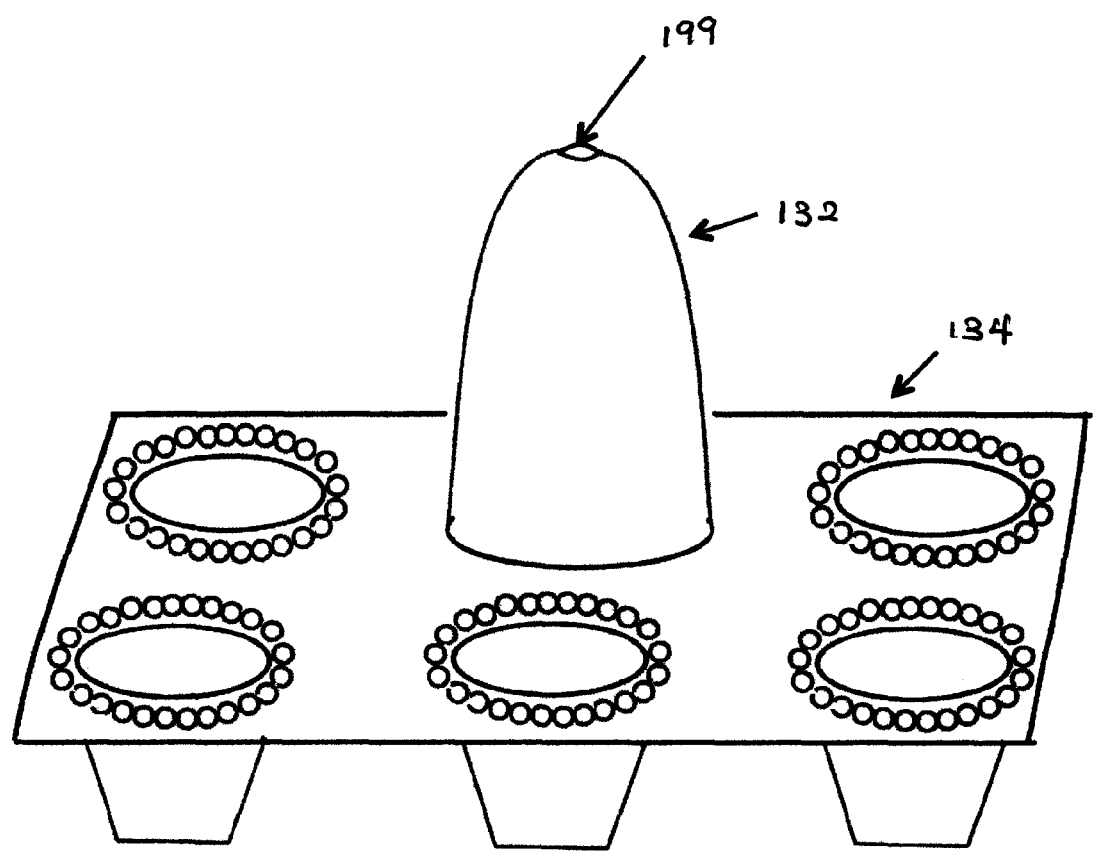
FIG. 22 is a perspective diagram illustrating the various components and details of an embodiment of a system for producing a comestible baked product in complex shapes using cast molding.

Another embodiment of the system and the method is illustrated in FIGS. 20, 21, and 22. As seen in FIG. 20, the system is comprised of a one piece mold 132 that connects to the baking cup 133 which is part of the baking cup pan 134. If there is a simple statue design (representative or non-representative), a one piece mold 132 can be utilized in this system and method. In FIG. 20, 132 is the one piece mold that attaches to the baking cup at 135 which is a part of the baking cup pan 134. A baking cup liner may or may not be inserted into the baking cup 133 as dictated by user preference. In this embodiment, 135 represents female receptors that encircle the rim of the baking cup and seal to the male protrusions 198 on the bottom of the one piece mold. This sealing approach featured in FIG. 20 for connecting the statue mold 132 to the baking cup 133 which is part of the baking cup pan 134 has also been previously seen in FIG. 13 and FIG. 14. The single mold can also use many of the aforementioned connection methods including, but not limited to: the method of having a snap on lid approach detailed in FIG. 1 (that may require the baking cup to have a rim or a lip or a rim with a lip), the method in which the baking cup has male protrusions all around the baking cup which is part of the baking cup pan and the one piece mold has recessed female receptors that receive the male protrusions, the method of the tongue and groove approach, etc. Finally, 199 in FIG. 20 is a stopper steal. The stopper seal is inserted in the opening top portion of the mold after the mold has been attached to the baking cup which is part of the baking cup pan and after the ingredients have been added into the mold. The stopper seal not only prevents egression of materials out of the opening, it can also help mold the statue into its proper design shape on top. FIG. 21 shows what the inside of a single piece mold might look like if it were to be sliced in half vertically 136 and if this single mold piece were a representative statue of a mountain peak. Please note, when the seal stopper 199 is inserted after the baking ingredients have been added to the mold, the seal stopper's design (an arch on the bottom of the seal stopper) will help achieve the mold's design as it bakes. Simply stated, in the case of this mountain design, the seal stopper will function as part of the mold to help form the mountain's peak as it bakes. (Please note, in all embodiments discussed, the seal stopper may or may not play a roll in molding the statue design as it bakes.) FIG. 22 shows what the one piece statue mold 132 looks like when it is sealed to the baking cup which is part of the baking cup pan at 134 and the stopper seal 199 has been inserted. Again, the stopper seal or the top portion of the mold may have openings in them to function as vents, thus allowing for heat exchange or ingredient overflow/rising. After the comestible is baked in the system, the system is removed from the oven and allowed to cool. Then, the steal stopper 199 and then the one-piece mold 132 is removed from the baking cup that is part of the baking cup pan to reveal the comestible. The comestible would then be removed from the baking cup 133. (Of course, one might remove the stopper seal and the once piece mold at the same time.)

Figure 23:
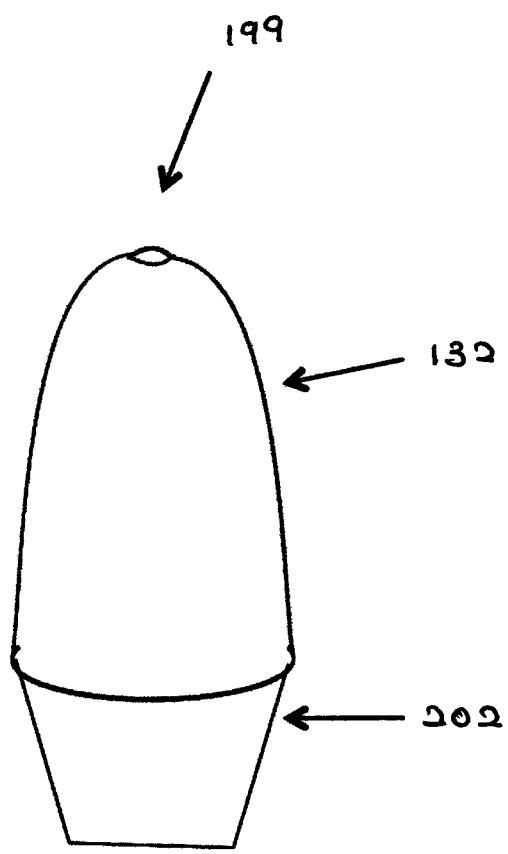
FIG. 23 is a perspective diagram illustrating the various components and details of an embodiment of a system for producing a comestible baked product in complex shapes using cast molding.

It is important to note that one could attach the single mold piece discussed in FIG. 20, FIG. 21, and FIG. 22 to a single baking cup 202 as seen in FIG. 23. The exact approach illustrated in FIGS. 20, 21, and 22 is used to connect the mold to the single baking cup as was used to connect the mold to the baking cup which was part of the baking cup pan. The seal stopper remains the same as well. Just like FIG. 20, the baking cup could have a liner added, or not, based on preference. Then when sealed, the baking cup would be filled from the opening in the top. The optional stopper seal could be added or not. Then, with the single mold piece 132 attached to the single baking cup 202, the baking ingredients are added into the mold. Then, the stopper seal 199 is inserted into the opening in the one piece mold 132 and the system would be placed in the oven. After baking, the system is removed from the oven and cooled. Next, the one piece mold 132 is removed from the single baking cup 202 to reveal the sculpture. (If one follows this process, the stopper seal would be removed in tandem with the one piece mold. Nevertheless, one might also remove the stopper seal 199 first and then remove the one piece mold 132 from the baking cup.) Then, the comestible sitting in the single baking cup 202 can be removed. Next, one can decorate it and then eat it or consume it immediately. (If one desired, one could place this system on a baking sheet and put it in the oven.)

Figure 24:
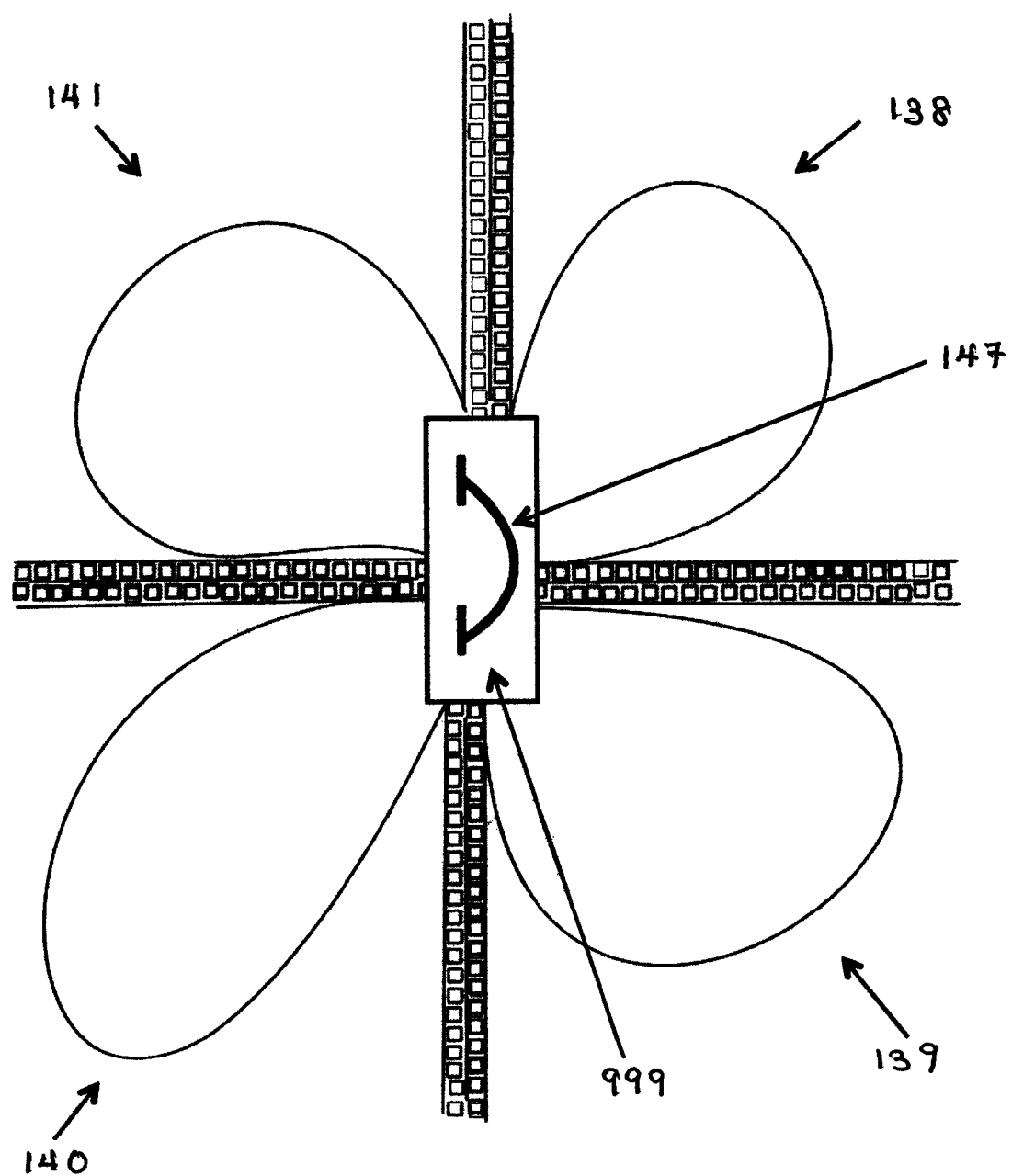
FIG. 24 is a perspective and cross section diagram illustrating the various components and details of an embodiment of a system for producing a comestible baked product in complex shapes using cast molding.

While the one part mold can be used for very simple representative and non-representative designs, it is important to point out that the opposite is true. While most of the embodiments like the one shown in FIG. 1 feature two mold pieces (not counting stopper seal which may or may not be optional) and one baking cup pan (or single baking cup depending on embodiment), it should be noted that more intricate designs might be created using more mold pieces. For instance you could use three or more mold pieces and seal them all together before attaching them to a baking cup which is part of a baking cup pan or sealing them all together before attaching them to a single, individual baking cup. Multiple mold pieces may be used to create more ornate or detailed sculptures. See FIG. 24 which is a top view of a four piece statue that seals together to form a four leaf clover sculpture. The first statue mold piece in this embodiment at 138 seals to the second statue mold piece at 139 which seals to the third statue mold piece at 140 which seals to fourth statue mold piece at 141 which seals back to the first statue mold piece at 138. Finally, 999 is the stopper seal for this embodiment and, as one can see, takes on a different, shape and size from the top view. The stopper seal also has a handle embodiment at 147 to help remove the stopper seal after it has been inserted.

Figure 25:
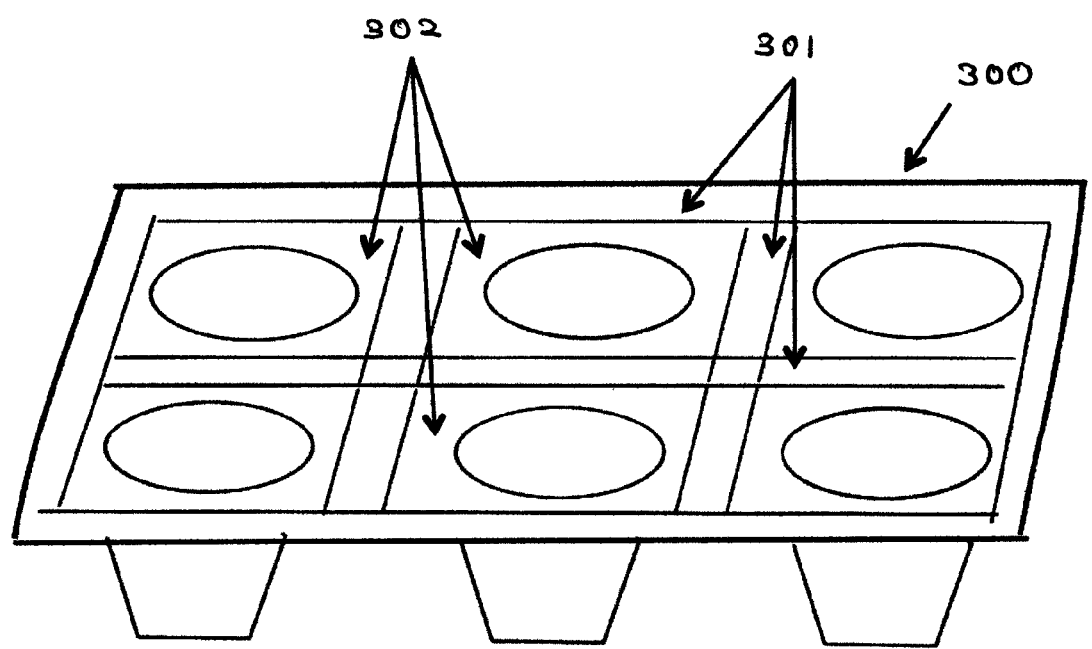
FIG. 25 is a perspective and cross section diagram illustrating the details of an embodiment of a component of a system for producing a comestible baked product in complex shapes using cast molding.

Finally, FIG. 25 depicts a baking cup pan that might be utilized interchangeably with the different embodiments discussed. Simply put, the skeleton frame 301 of the baking cup pan generally at 300 is made of a metal component allowing the interior sections 302 to be made of different materials or combinations thereof. In FIG. 25 the skeleton frame 301 is comprised of metal and the inside sections 302, where the baking cups reside, are made out of silicone. In addition, a silicone covering could be put over the metal parts on top of the skeleton frame and underneath the metal skeleton frame to ensure nobody gets burned when touching it right out of the oven. (In other words, the metal skeleton can be encased in silicone or other similar bakeware materials.) This metal skeleton frame can provide more stability in transporting the baking goods to and from the oven.

Other embodiments of the system and method for baking a comestible sculpture that is representative or abstract on top of a baking cup so as to produce one solid comestible piece in which the sculpture and the baking cup are connected needs to be fully described. Primarily, these embodiments of the system address filling the devices from the bottom of the baking cup and baking upside down.

The embodiment pictured in FIG. 35 is comprised of a baking cup as part of a baking cup pan and a multi-piece statue mold that allows the components (the baking cup as part of the baking cup pan and the multi-piece statue mold) to seal together to create one unified device that does not permit liquid (e.g., batter ingredient, baking mixture, etc.) egression from the inside out when upside down. In FIG. 35, one can see the components that make up this system's in an embodiment generally described at 1000. In this embodiment you have one piece of the statue mold at 1001. (As one can see, we are illustrating an example of a representative statue and can hence see the first piece as a mold for half a saguaro cactus. Recall, the statute can be representative or non-representative. For all intents and purposes, we could have been illustrating this with a non-representative statue mold.). At 1002 you have the second piece of the statue mold. At 1003 and 1004 you will see the seal that will be used to connect mold piece 1001 and mold piece 1002 together. It is important to note that 1045 and 1046 represent the exterior walls of the mold pieces in this embodiment. The specific seal illustrated at 1003 and 1004, generally, is representative of an embodiment of the seal. (Keep in mind, the seal can also take on many different types of forms to prevent baking ingredient egression.) The seal for 1003 and 1004 prevents liquid egression from the system. [Please recall, this seal has been seen before in FIG. 9 and has been illustrated up close in FIG. 2. Note in FIG. 2 at 103, a seal pattern best described as a waffle iron pattern is depicted as the receiver (female component) and 104 is the waffle iron pattern with protruding sections (the male component). The 103 female receptors come together with the 104 male protruding sections to make a leak proof seal. In the embodiment in FIG. 2, the male components 104 when they come together with the female components 103 will be encased by the female receptors 103 in this specific embodiment of the seal. (This means that 103 is not a hole that 104 goes through, but that embodiment could also be used here as well if desired.) The embodiment shown is silicone for illustrative purposes, but can be any material used for bakeware. Although 103/104 is depicted as a waffle iron pattern, there are many embodiments that can be used including, but not limited to: circles, octagons, a random pattern such as that of a honeycomb, etc. The pattern for the seals can be just one single column or you could have multiple columns next to each other to create a tighter seal. To see what an alternative embodiment of the seals at 103 and 104 might look like, one can look at FIG. 3. In FIG. 3, one can see that the same type of waffle iron pattern seal is used with a female receptor on one mold piece and a male protruding section on the other mold piece, but this time the two columns create rows that are not aligned as seen at 501 and 502. The columns and rows that are created could be aligned like they are in FIG. 2. However, as seen in FIG. 3 at 501 and 502, they are offset. For this example of 501/502 in FIG. 3, two columns with offset rows are used. This embodiment of the seal will work best when constructed of malleable bakeware materials of the likes of silicone or similar. It also works well because the seals along the side of the embodiment depicted in FIG. 1 will be running vertically on both sides of the statue mold and will need to be tight to prevent egression. FIG. 4 also shows yet another embodiment of the waffle iron pattern seal up close at 503 and 504 where the female receptors and male protruding sections are on the same mold pieces. The opposite, alternating pattern appears on the second mold piece so that the two can seal together.]

Figure 36:
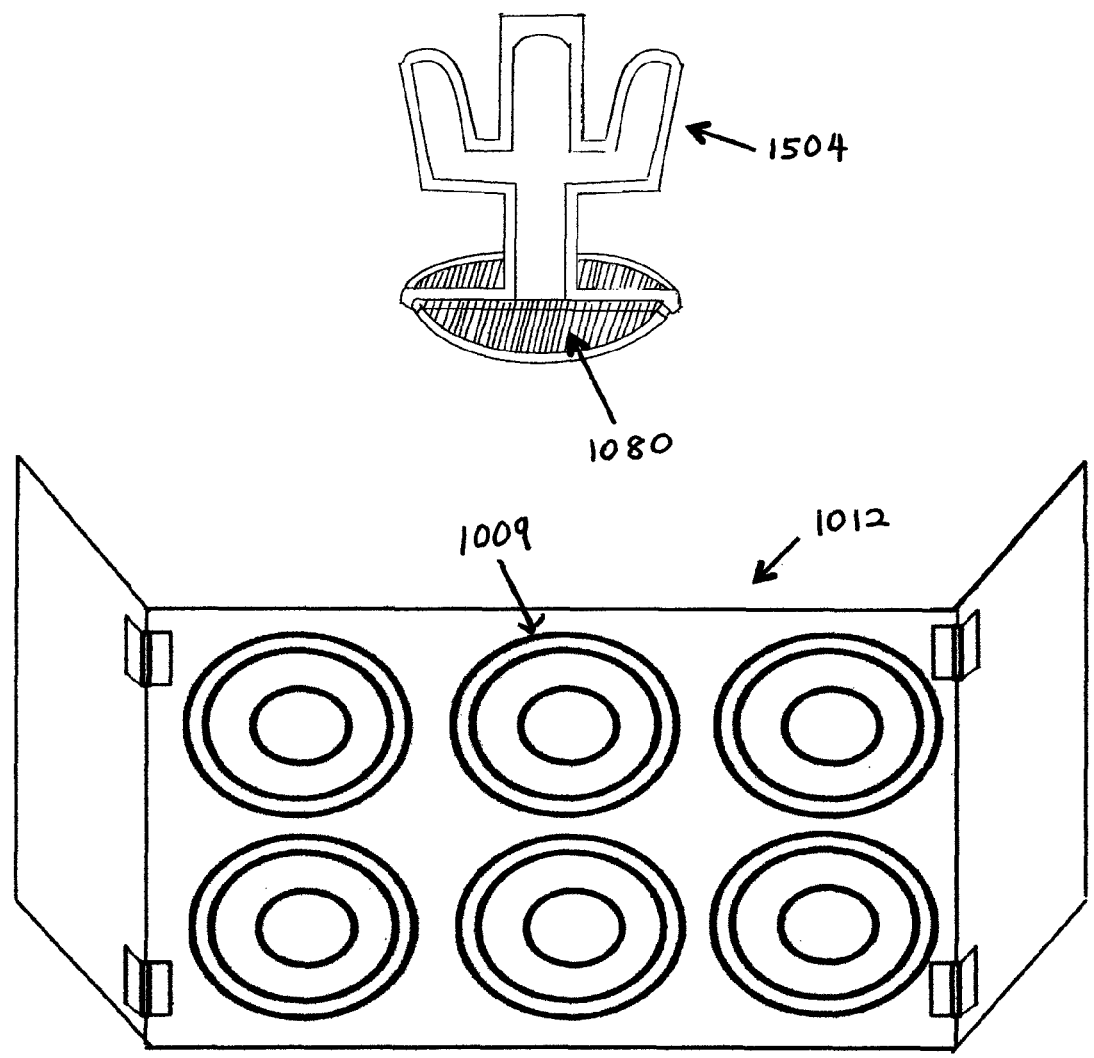
FIG. 36 is a perspective diagram illustrating the various components and details of an embodiment of a system for producing a comestible baked product in complex shapes using cast molding.
Figure 37:
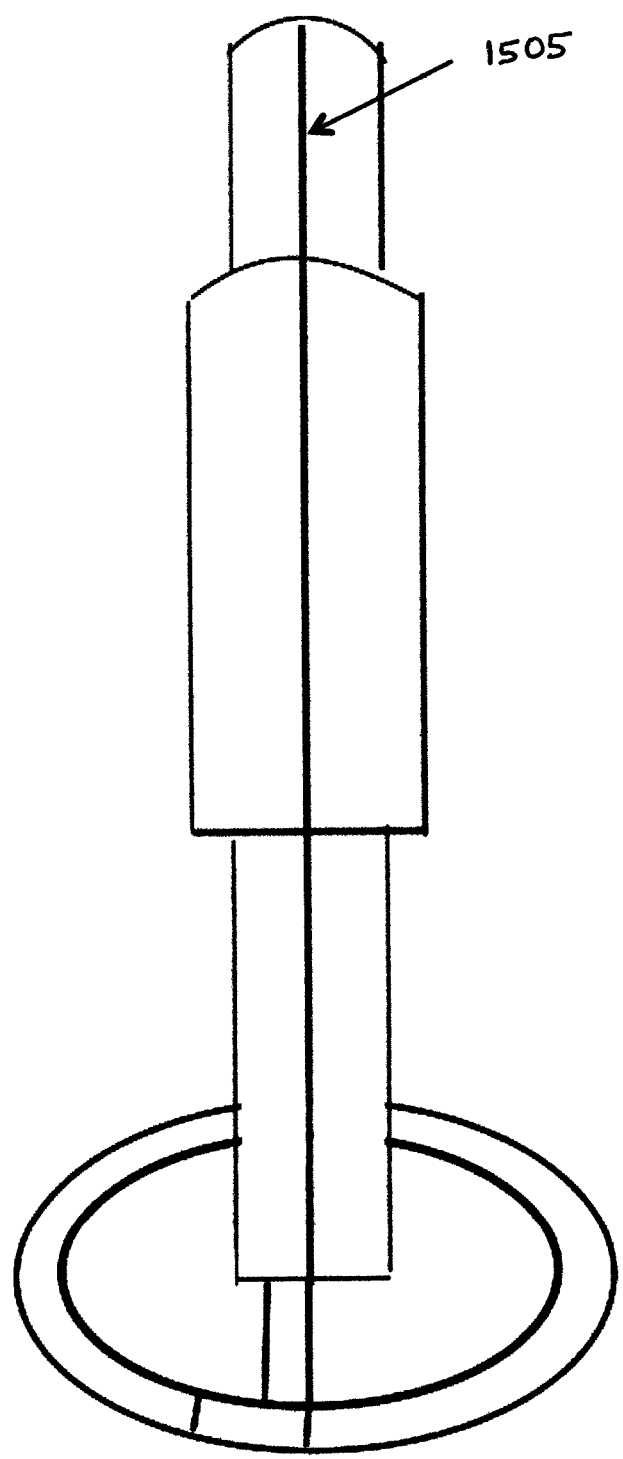
FIG. 37 is a perspective diagram illustrating the details of an embodiment of a component of a system for producing a comestible baked product in complex shapes using cast molding.

Please note, in FIG. 35, the seal at 1003 and 1004 can take on many different embodiments. Some examples of the types of seals include, but are not limited to the following: a seal using multiple snaps, a seal using a silicone zipper, a seal comprised of a tongue on one piece and a groove on the connecting piece, a seal designed in the way a plastic lid connects to a plastic container, a seal that functions like a zipping plastic sandwich bag, and a seal designed like nubs on one portion protruding through holes on the other portion to connect. Furthermore, some embodiments might mix and match many different types of seals. The two pieces identified in FIG. 35 at 1001 and 1002 will seal together to create a statue mold. Note, the material used in 1001 and 1002 can be sealed together for baking purposes and it can also be unsealed so as to provide access to the baked comestible without destroying it. Furthermore, in this embodiment, the seals run entirely around the perimeter of the statue pieces. FIG. 36 shows the two statue mold pieces of 35 (1001 and 1002) combined 1504 prior to being attached to one of the baking cups 1009 which is part of the baking cup pan 1012. See 37 to see a side view of just the two mold pieces connected together at 1505.

Figure 38:
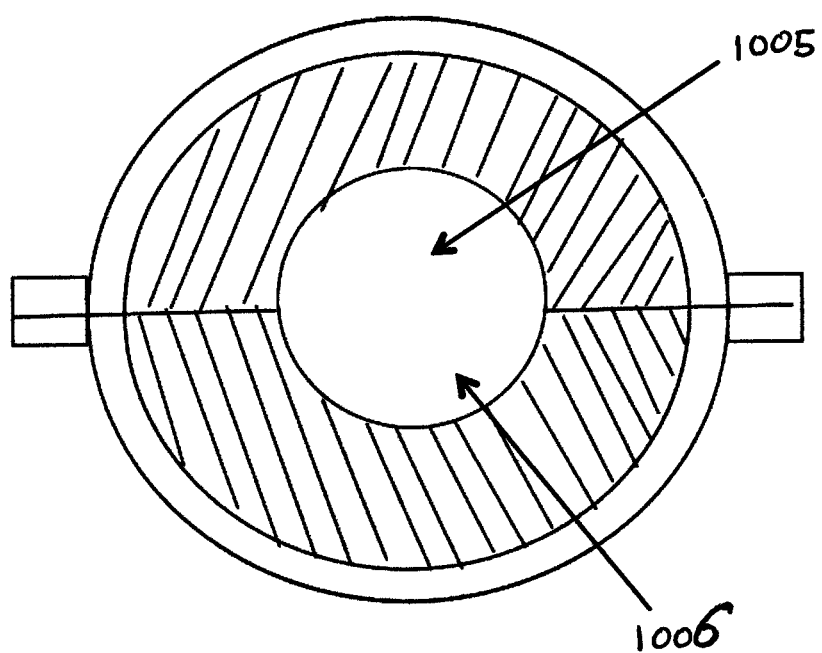
FIG. 38 is a perspective diagram illustrating the details of an embodiment of a component of a system for producing a comestible baked product in complex shapes using cast molding.

As you will note in FIG. 35 at 1005 and 1006, you have an opening in the bottom so as to allow the baking mixture to transition from the baking cup to the statue so as to enable the comestible to be one single piece. To see what this bottom opening might look like when 1001 and 1002 of FIG. 35 are connected together, please refer to FIG. 38 and look at how 1005 and 1006 create an opening. This is the means by which the comestible sculpture connects to the baking cup and will vary in size and shape depending on the statue design. Also, keep in mind, depending on design, there could be two or more separate such connections. For example, maybe you show an army man walking as your statue design. You could have a separate connection for each leg of the statute as a means to connect to the baking cup.

In FIG. 35, at 1007 and 1008 generally, you have a means by which to connect the statue mold comprised of 1001 and 1002 to a baking cup 1009 as part of the baking cup pan generally at 1012. Each baking cup (1009) in the baking cup pan (1012) in FIG. 35 has a raised rim with a lip 1010. (Depending on the specific embodiment of 1012, this rim with a lip 1010 can be various sizes in circumference, height, diameter, shape, and thickness, etc. It can also just be a rim.) Furthermore, one will note that at 1999 at the bottom of the baking cup there is a hole. This hole can be of various sizes and shapes. It can also be of various circumferences and depths. (Also, as previously mentioned, this hole in other embodiments might be multiple holes dependent upon the way in which the statue needs to connect to the baking cup.) The reason the hole 1999 is in the bottom of the baking cup 1009 which is part of the baking cup pan 1012 is to allow one to fill the attached mold pieces and the baking cup with baking ingredients after the mold has been attached to the baking cup. Obviously, to use this hole as a means by which to fill the system when all sealed together, one will need to turn the system upside down.

Before one can turn the system upside down, they will need to seal together mold pieces 1001 and 1002 in FIG. 35 to create the sealed together mold 1504 seen in 36. Then, 1007 and 1008 and 1070 and 1075 (as seen in FIG. 35) come together to form a lid as seen in FIG. 36 at 1080 generally. Please note, when talking about 1001 in FIG. 35, the means by which to connect the statue mold 1007 to the rim 1010 is a bit longer than its counterpart 1008 in order to create an overlap when 1001 and 1002 come together. Furthermore, in FIG. 35, the top portion of the lid on 1001 at 1070 generally is also a little bit longer than its counterpart at 1075 so as to create an overlap when 1001 and 1002 come together. Please note, in this embodiment, the overlap takes place without the overlapping part 1070 sealing to its counterpart 1075. However, in alternate embodiments, it could seal using such things as, but not limited to a snap(s), zipper, etc. Furthermore, in yet other embodiments of this system, the two pieces coming together can form a lid seal without the need for overlap at 1070 and 1075 altogether. Simply stated, 1007 and 1008 and 1070 and 1075 could meet up flush. When they meet up flush they could have a seal connecting them in that location or they could just sit flush without the use of a seal. Furthermore, you may even have an embodiment where 1070 and 1075 are flush, but the overlap at 1007 and 1008 remains.

Figure 39:
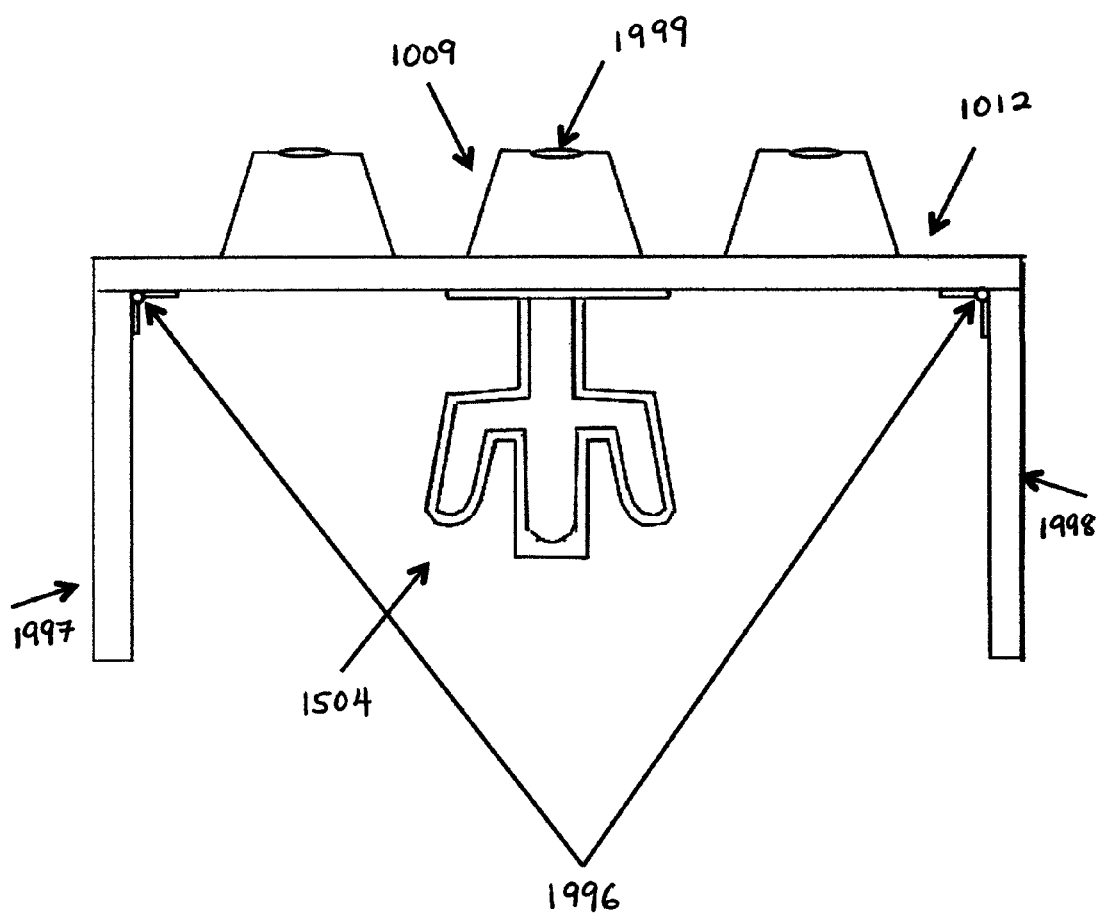
FIG. 39 is an elevation diagram illustrating the various components and details of an embodiment of a system for producing a comestible baked product in complex shapes using cast molding.

To see what 1001 sealed to 1002 (the sealed together mold 1504) looks like when attached to the baking cup 1009 (via 1007 and 1008 to the baking cup rim 1010) and turned upside down, ready to be filled, see FIG. 39. (It is important to note that because this two piece mold sealed together and then attached to the baking cup which is part of the baking cup pan will bake upside down when filled with ingredients, one may also use this hole as a heat exchange and an expansion overflow area for the baking ingredients as they rise. Also, one could potentially add a stopper seal into the opening of the device once filled with baking ingredients to seal it up if desired. To see what such a stopper seal might look like, one could look at 111 in FIG. 1 for an example. Of course, in this present embodiment if someone wanted to add a stopper seal, the stopper seal would plug the bottom of the baking cup hole 1999 in the baking cup pan 1012 of FIG. 35.)

Figure 40:
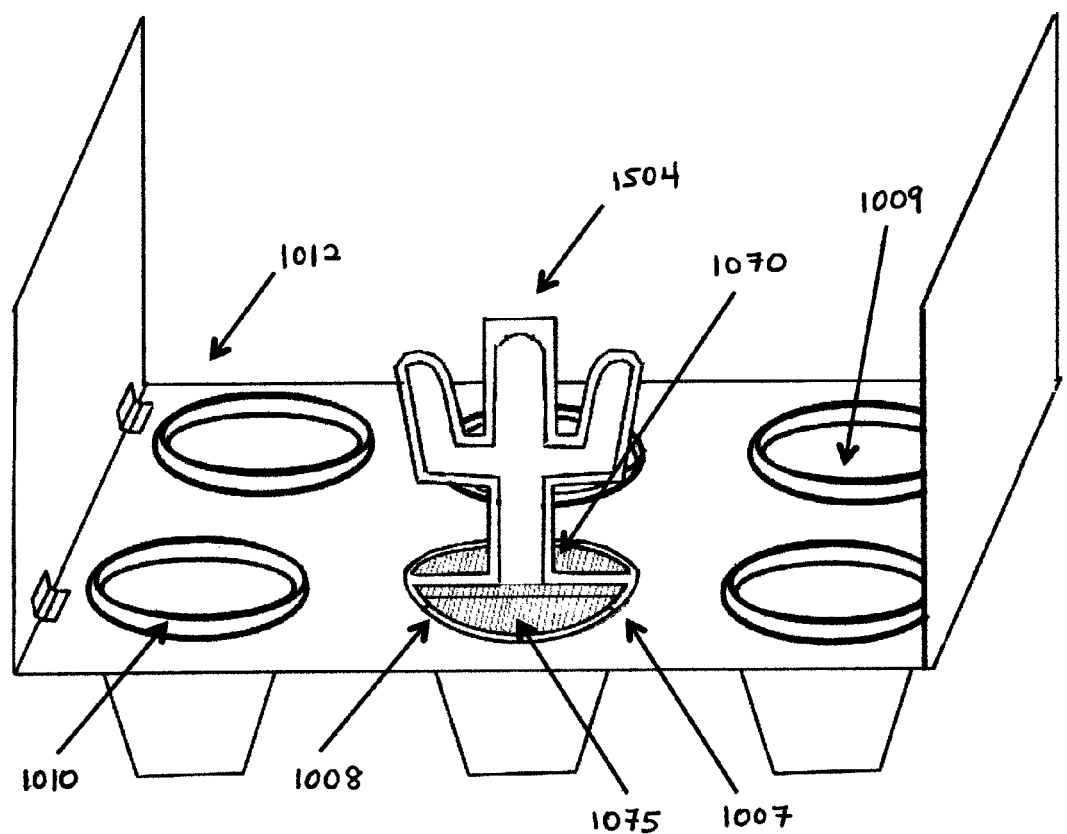
FIG. 40 is a perspective diagram illustrating the various components and details of an embodiment of a system for producing a comestible baked product in complex shapes using cast molding.

It should be appreciated that there are different techniques that can be used to attach the statue mold portion (1001 and 1002 sealed together to create 1504) to the baking cup rim 1010 of the baking cup pan 1012. As seen in FIG. 40, the sealed together statue mold 1504 uses 1007 and 1008 to snap on or seal on to 1010 like a lid. (In addition to snapping on like a lid in FIG. 40, other means by which to conceivably connect 1001 and 1002 to the rim 1010 include, but are not limited to: connecting it with snaps, sealing it with a seal that uses a waffle iron pattern type of seal described earlier, locks, snaps and locks, a tongue and groove seal, buttons, nubs that protrude from the rim to insert into a female receptor on the mold or female receptors around the top rim that receive male protruding sections from the mold, zippers, plastic sandwich bag seals, etc.) In some embodiments, the baking cup pan does not include a rim that a lid to which the other end of the mold can be attached. These embodiments utilize a different design or technique for connecting the statue to the baking cup in the baking cup pan. (As a non-limiting example, see FIG. 13.) The other techniques of sealing the statue mold to a baking cup, which is part of a baking cup pan mentioned previously, could be employed with other baking cup pan designs. For instance, in FIG. 40, the portions 1007 and 1008 (which form the lid in conjunction with 1070 and 1075) seal on to the rim 1010 of the baking cup 1009 which is part of the baking cup pan 1012.

Also, because the baking cup rim 1010 and the piece of the mold at 1007 and 1008 that connect to the pan can be standardized, many different statues can be utilize and actually baked in the same pan 1012, at the same time. For example, a pan may be utilized to create statues of different zoo animals on top of each baking cup. The baking cup pans can come in many sizes and permutations. Further, baking cup pans of different sizes that have baking cups of different sizes may be incorporated into the various embodiments. The number of baking cups per baking cup pan could also vary. In fact, a baking cup pan with just one, really large baking cup may be utilized. The baking cups could also come in different shapes.

FIG. 35 depicts a top-plan view of the baking cup pan 1012 for an exemplary embodiment. FIG. 39 is a side elevation view of the same baking cup pan 1012. In FIG. 35 the illustrated embodiment includes legs at 1997 and 1998 respectively. Furthermore, at 1996 generally, the legs are shown to include hinges that allow the pan legs to fold over on to the top of the baking cups to store flat. There are four hinges used in this embodiment. Other embodiments could potentially use more or less. When fully extended, as seen in FIG. 39, the hinges 1996 keep the legs 1997 and 1998 in place and the legs and hinges provide support when the pan is turned upside down. When the mold piece 1001 and 1002 are sealed together (1504) and when 1504 is sealed to the baking cup rim of the baking cup which is part of the baking cup pan, the baking cup pan is turned over and sits on its legs as seen in FIG. 39.

Again, in the embodiment seen in FIG. 39, the legs are attached to the baking cup by hinges 1996, allowing them to open to bear the weight of the baking cup pan when flipped upside down or to be closed and folded on top of the baking cups for storage. In FIG. 39, the legs 1997 and 1998 are clearly extended open and the baking cup pan is turned upside down; the baking cup pan rests on those two legs. One purpose for the legs is that the sealed together mold pieces 1504, when connected to the baking cup 1009, will need to be flipped upside down to fill the statue mold and the baking cup through the hole (1999) in the bottom of the baking cups which are part of the baking cup pan 1012. Furthermore, the mold pieces, when sealed together and attached to the baking cup and filled with baking ingredients, will need a way to bake upside down in the oven. The legs on the baking cup pan make that possible. The legs (1997, 1998) allow the pan to rest upside down and allows the baking molds to hang upside down from the baking cups which are part of the baking cup pan much like a bat might hang from a cave ceiling. Also, the device can be taken out of the oven in this same way and allowed to cool in that position. Once cooled, the excess ingredients can be sliced off. For instance, baking medium that rose above the baking cup and overflowed. After trimming the baked product, the baking cup pan can be turned upright and the mold pieces (1001 and 1002) can be unsealed from each other and the mold pieces (1007 and 1008) from the baking cup.

Figure 67:
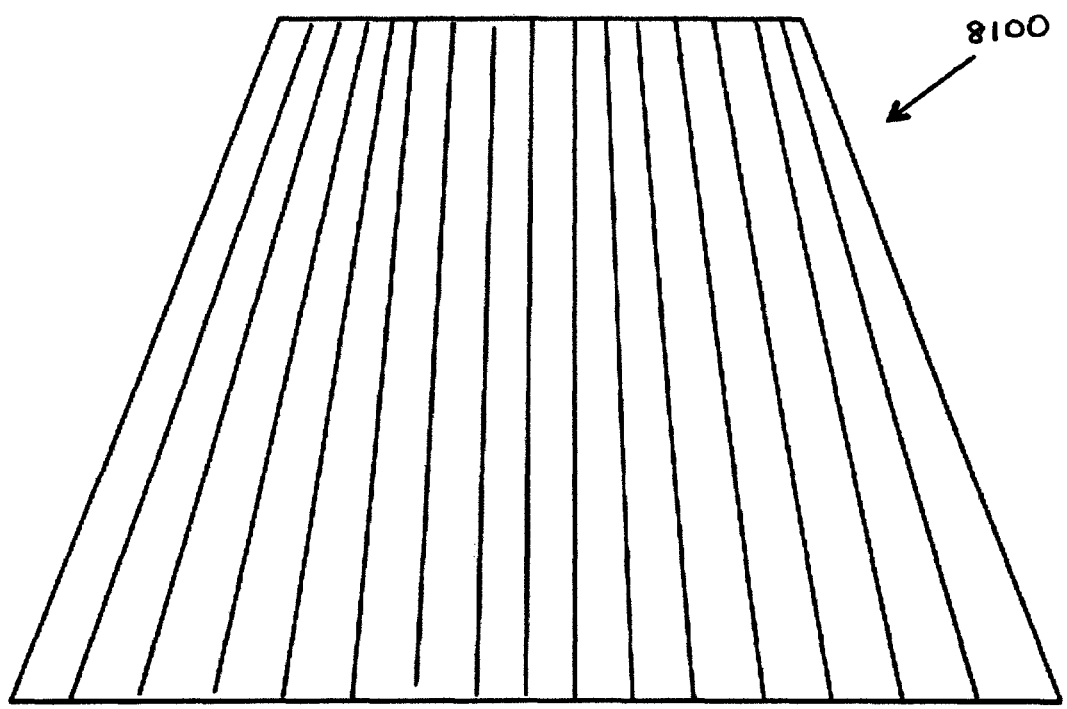
FIG. 67 is a perspective diagram illustrating details of an embodiment of a liner of a system for producing a comestible baked product in complex shapes using cast molding.
Figure 68:
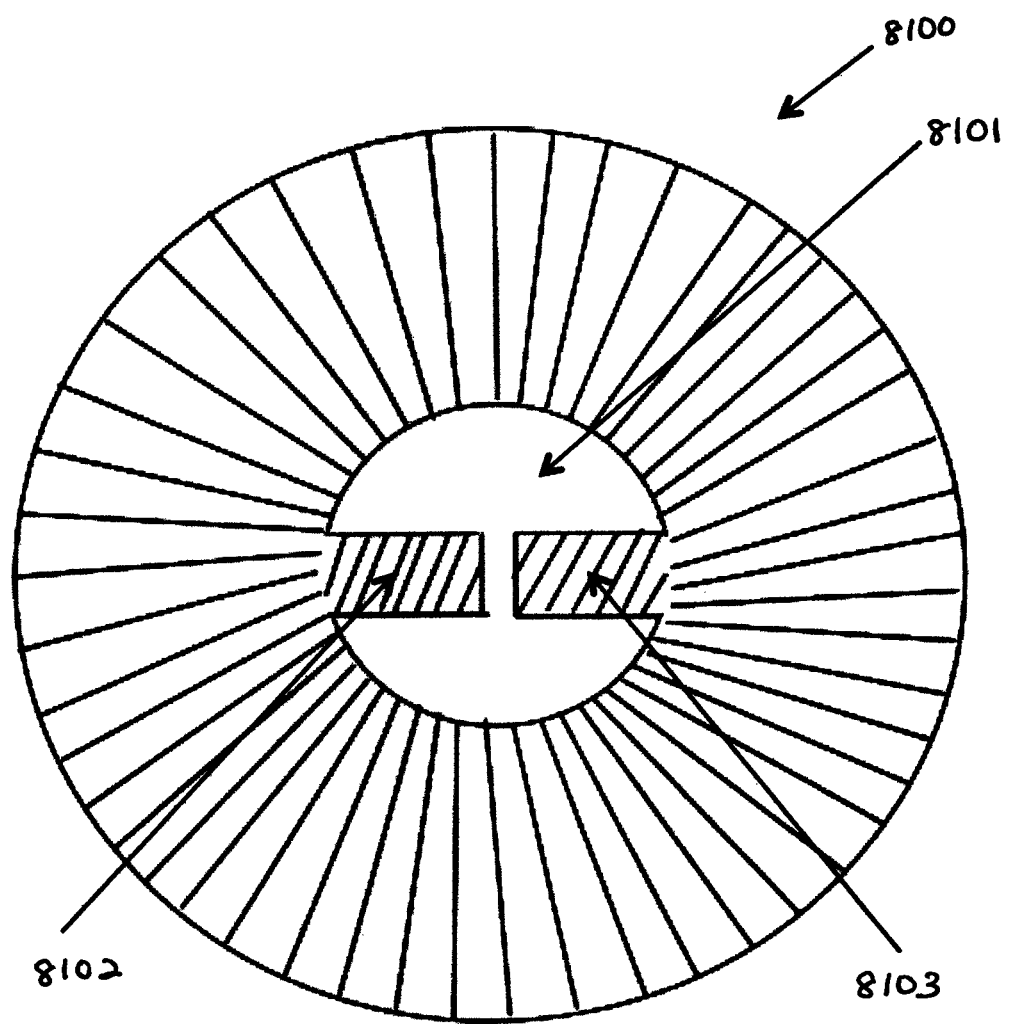
FIG. 68 is a perspective diagram illustrating details of an embodiment of a liner of a system for producing a comestible baked product in complex shapes using cast molding.
Figure 69:
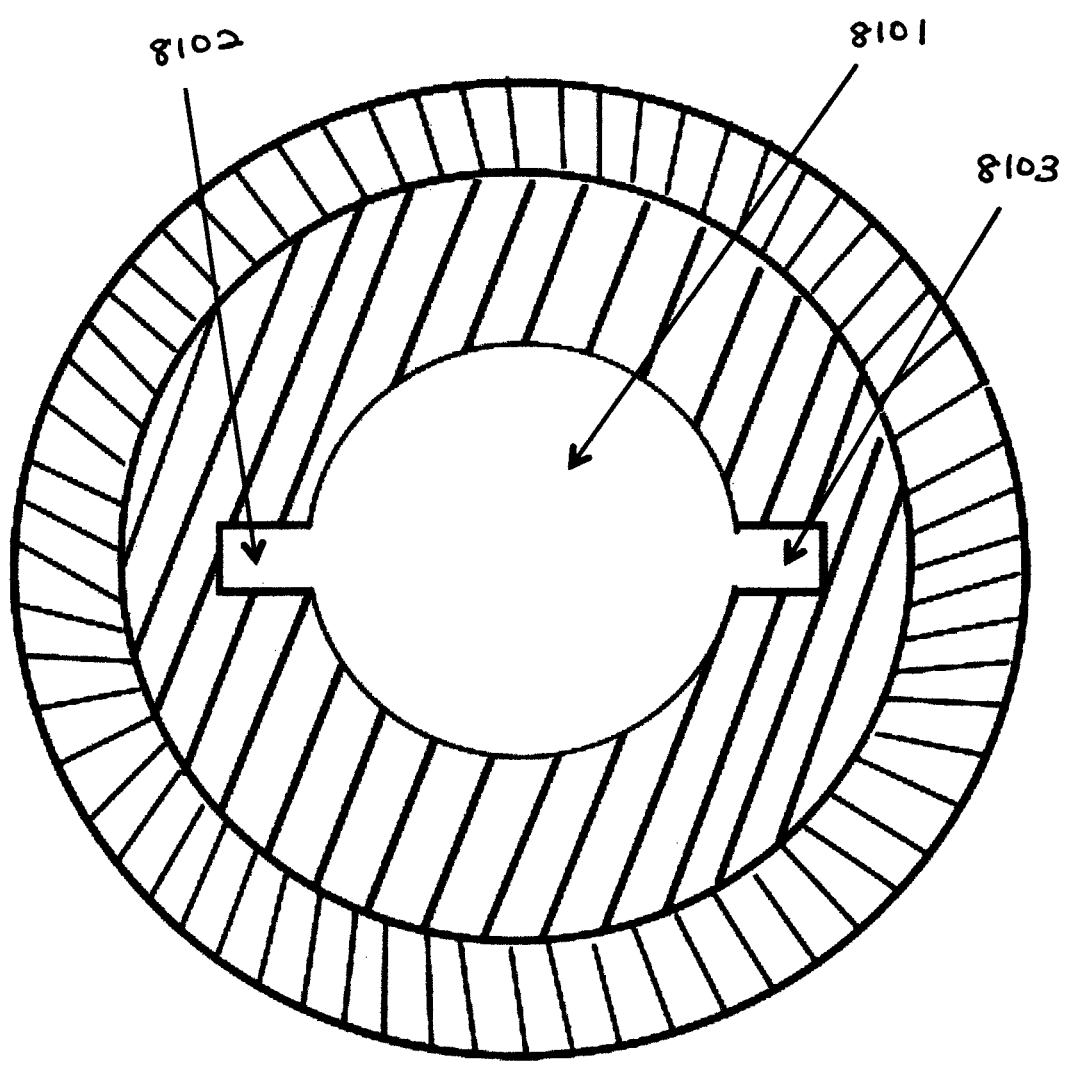
FIG. 69 is a perspective diagram illustrating the various components and details of an embodiment of a system for producing a comestible baked product in complex shapes using cast molding.

In general, utilizing some of the illustrated and described embodiments; intricate baking goods can be created by sealing 1001 to 1002 (see FIG. 35 as a reference for the pieces). In addition, the once parts 1001 and 1002 are sealed together, the mold 1504 as seen in FIG. 36, is attached to the baking cup pan 1012. Specifically, the mold 1504 referenced in FIG. 36 is attached to the baking cup rim 1010 seen in FIG. 35. As seen in FIG. 35, the baking cup rim 1010 is part of the baking cup 1009 which is part of the baking cup pan 1012. Furthermore, the mold attaches to the baking cup rim 1010 via 1007 and 1008. When 1001 and 1002 is sealed together and attached to the baking cup, the device is turned upside down to rest on the legs which are attached to the baking cup pan 1012 with hinges generally at 1996. Next, when upside down (see FIG. 39), the baking cup and mold piece attached is filled with baking ingredients. It is then placed in the oven for the comestible bake. Once baked, it is removed and cooled. Then after it cools, the system is placed right side up and then 1001 and 1002 are unsealed at its seals 1003 and 1004 as seen generally in FIG. 35. Next, the mold is unsealed form the baking cup at 1007 and 1008 generally. Finally, the comestible is removed from the pan for consumption. (Please note, one may seal the mold pieces 1001 and 1002 to the baking cup pan before sealing the mold pieces to each other. Furthermore, one could also unseal the mold pieces from the baking cup at 1007 and 1008 after baking first before unsealing 1001 and 1002 from each other. In addition, a seal stopper could theoretically be used in this embodiment if someone wanted to. In the event one uses a stopper seal, they would add the stopper seal in the bottom hole of the baking cup 1999 prior to baking and remove after baking One can also use a specially designed baking cup liner in this embodiment. The specially designed baking cup liner will be discussed in an upcoming section and is featured in FIGS. 67, 68, and 69.)

Figure 41:
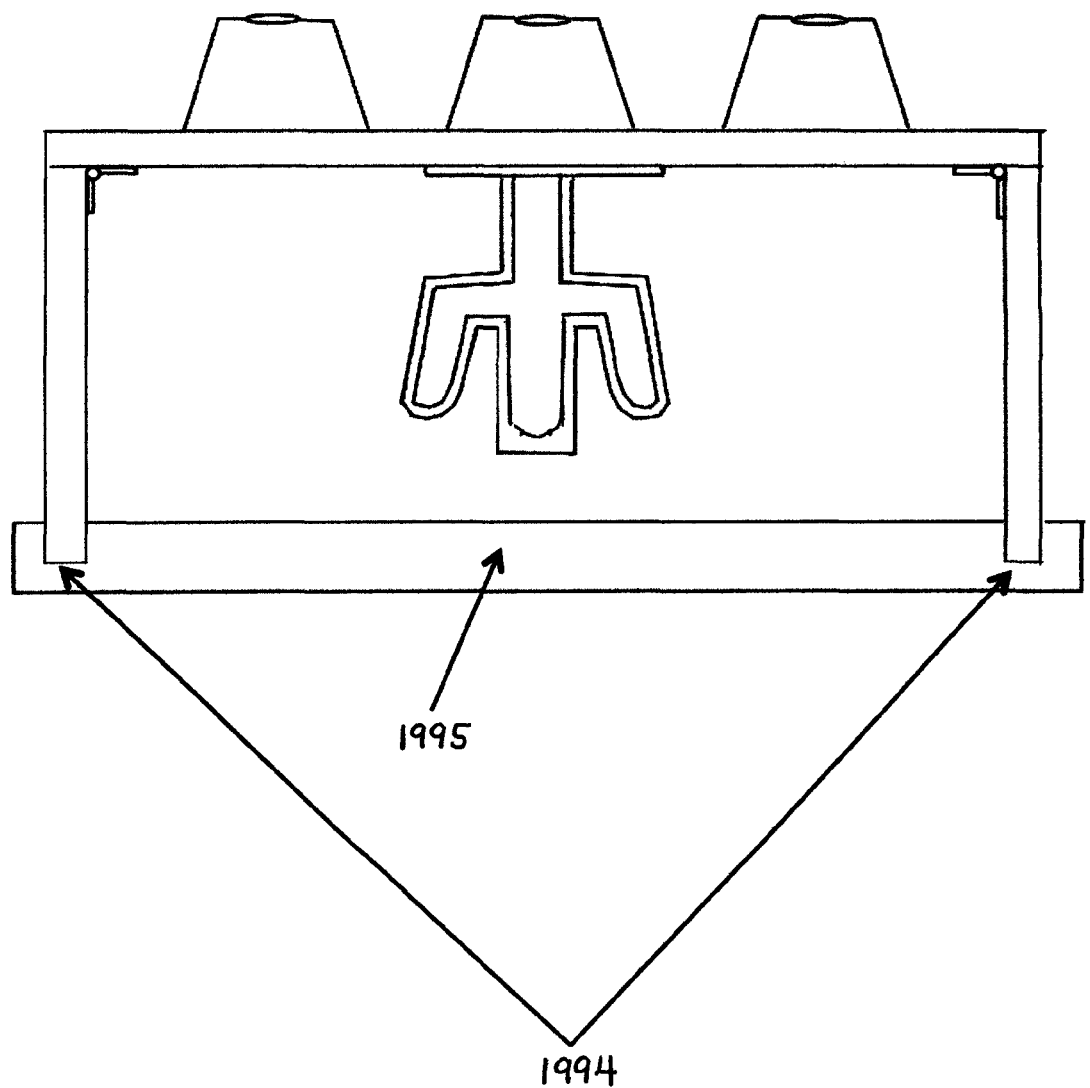
FIG. 41 is an elevation diagram illustrating the various components and details of an embodiment of a system for producing a comestible baked product in complex shapes using cast molding.

There are many ways by which to achieve similar versions of this embodiment. For example, see FIG. 41. In a variation of the embodiment seen in FIG. 39, one will see in FIG. 41 that a pan has been added. The pan 1995 has notches at 1994 generally to receive the legs of the system in FIG. 39 and stabilize it while cooking. Also the pan would catch any drips in the event the system malfunctioned and it leaked a little. Again, there are many different possibilities by which to secure the baking cup pan noted in FIG. 39 to allow it to turn upside down and support the mold pieces that have been attached to it while cooking.

Figure 42:
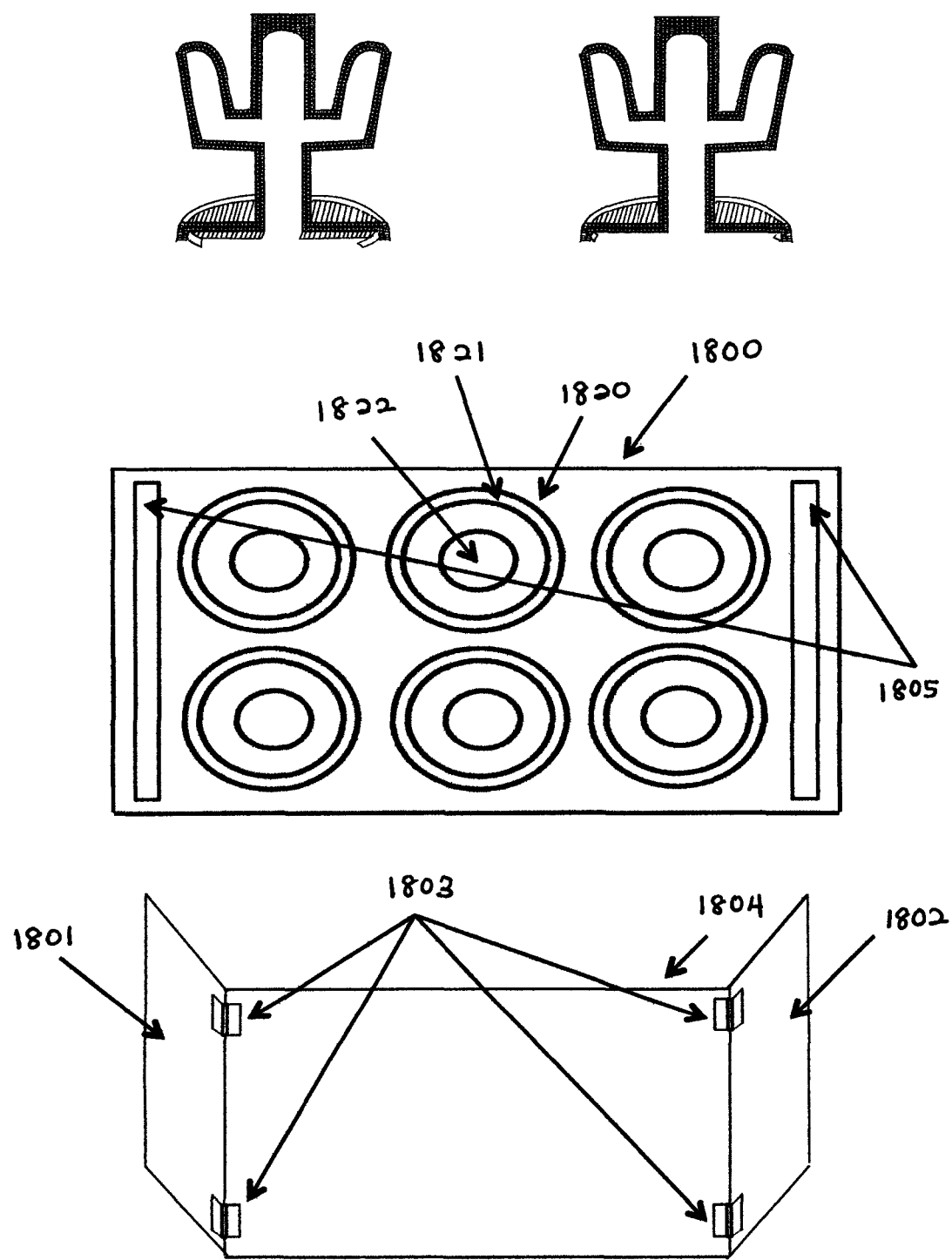
FIG. 42 is a perspective and cross section diagram illustrating the various components and details of an embodiment of a system for producing a comestible baked product in complex shapes using cast molding.
Figure 43:
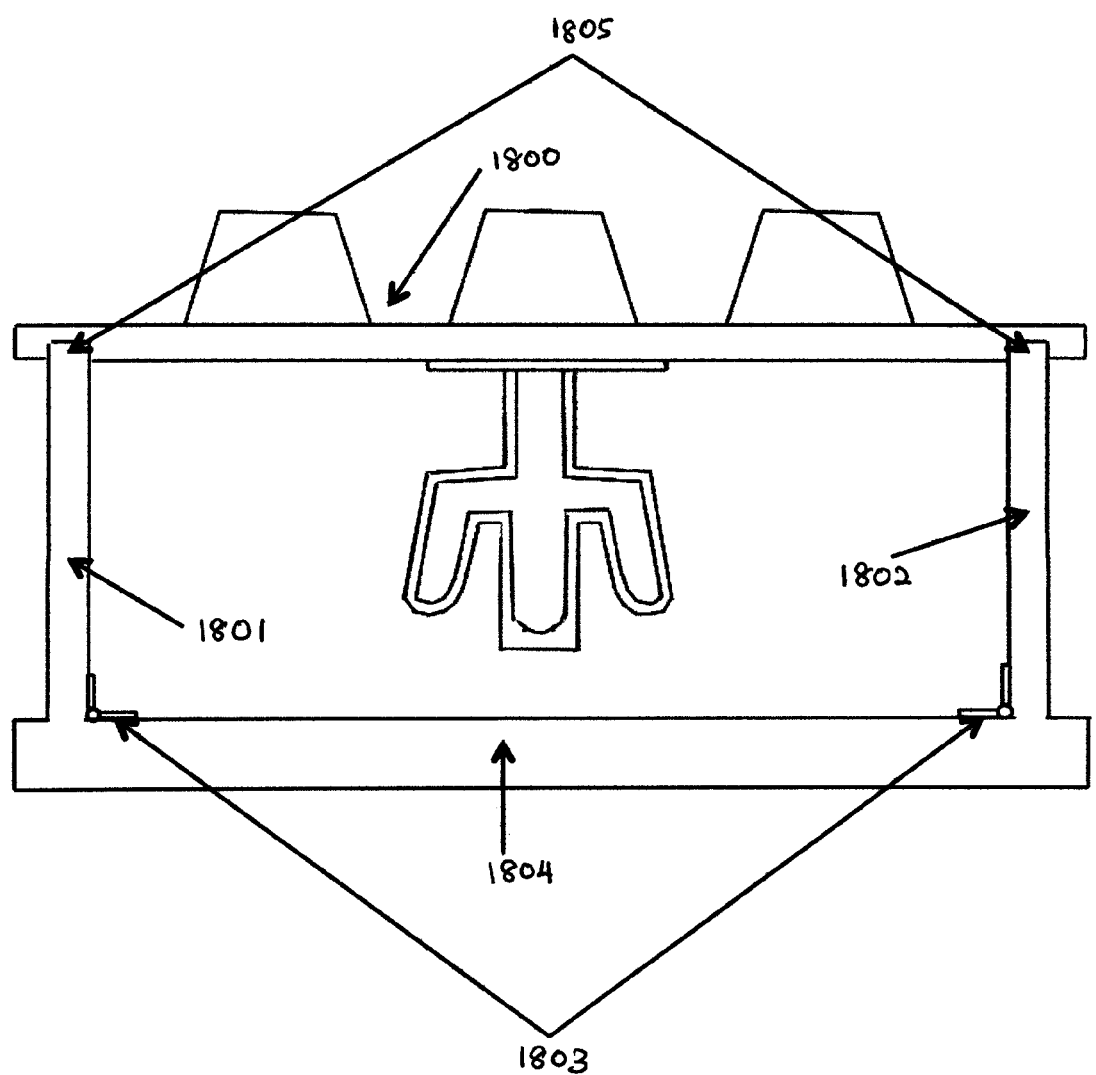
FIG. 43 is an elevation diagram illustrating the various components and details of an embodiment of a system for producing a comestible baked product in complex shapes using cast molding.

Another embodiment as seen in FIG. 42 would be to have the baking cup pan 1800 be a baking cup pan without legs and hinges; this embodiment would have a separate pan stand. (The mold pieces remain the same as FIG. 35 and the design of the baking cups in the baking cup pan are the same as FIG. 35 for this embodiment.) The elements of this pan are almost identical to FIG. 35 with the one major difference noted above. This baking cup pan embodiment in FIG. 42 does not have legs. The pan still has the other elements seen in FIG. 35. Looking at FIG. 42, you can see the baking cup 1820, the baking cup rim 1821, and the hole in the bottom of each baking cup 1822. In the embodiment seen in FIG. 42, the legs are a part of a separate pan stand. The legs 1801 and 1802 are hinged 1803 to the pan stand 1804. The pan stand legs 1801 and 1802 can fold open to support the weight of the baking cup pan and the molds, or, when not in use, they can fold flat on top of the pan stand. The legs 1801 and 1802 fit into the notched grooves 1805 on the baking cup pan. See FIG. 43 to see what it looks like all assembled.

Figure 45:
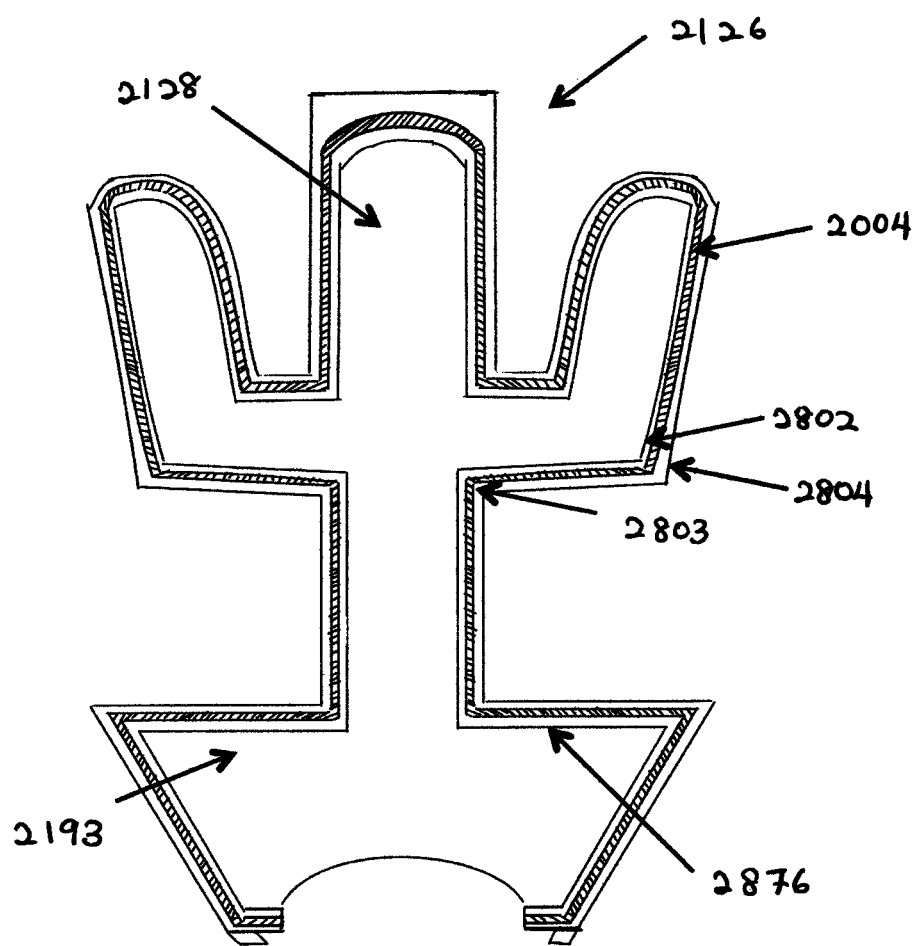
FIG. 45 is a perspective and cross section diagram illustrating the various components and details of an embodiment of a system for producing a comestible baked product in complex shapes using cast molding.
Figure 46:
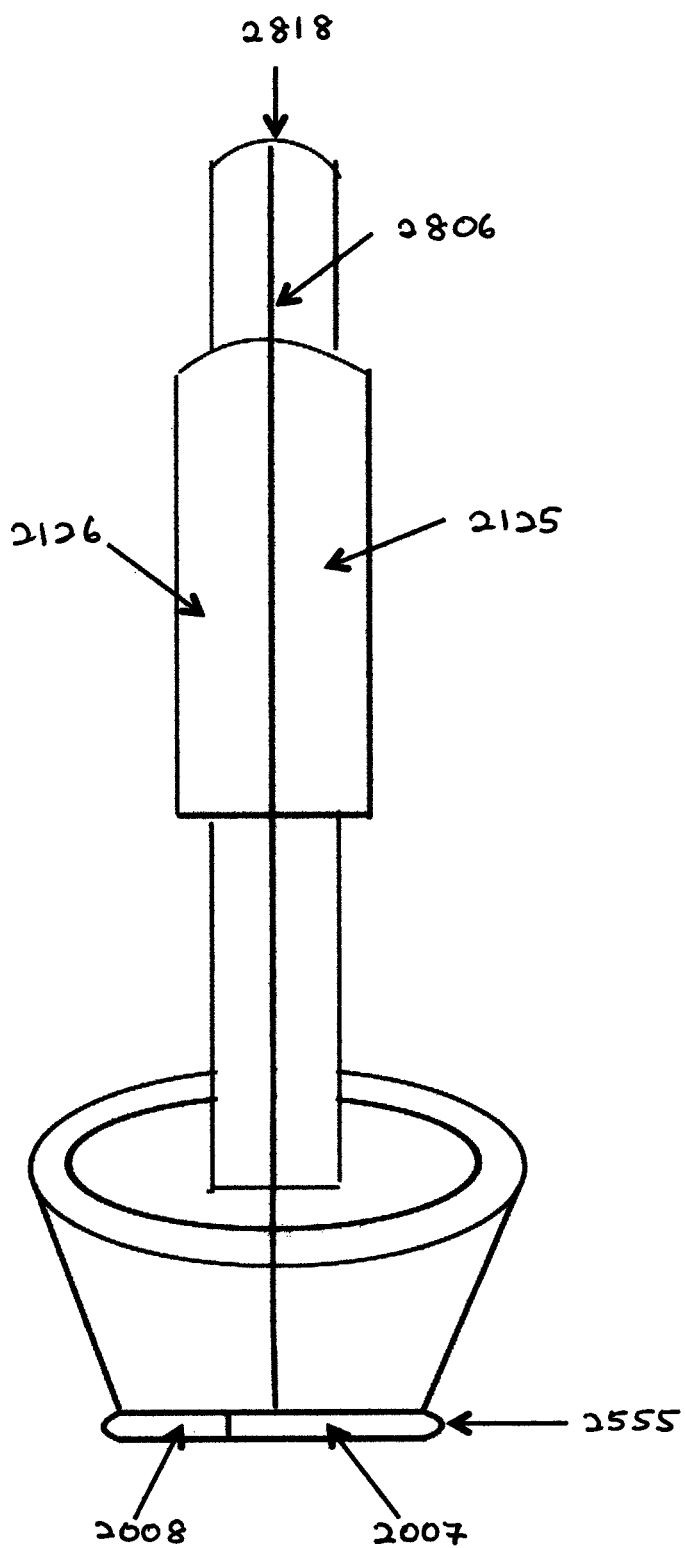
FIG. 46 is a perspective diagram illustrating the details of an embodiment of a component of a system for producing a comestible baked product in complex shapes using cast molding.
Figure 47:
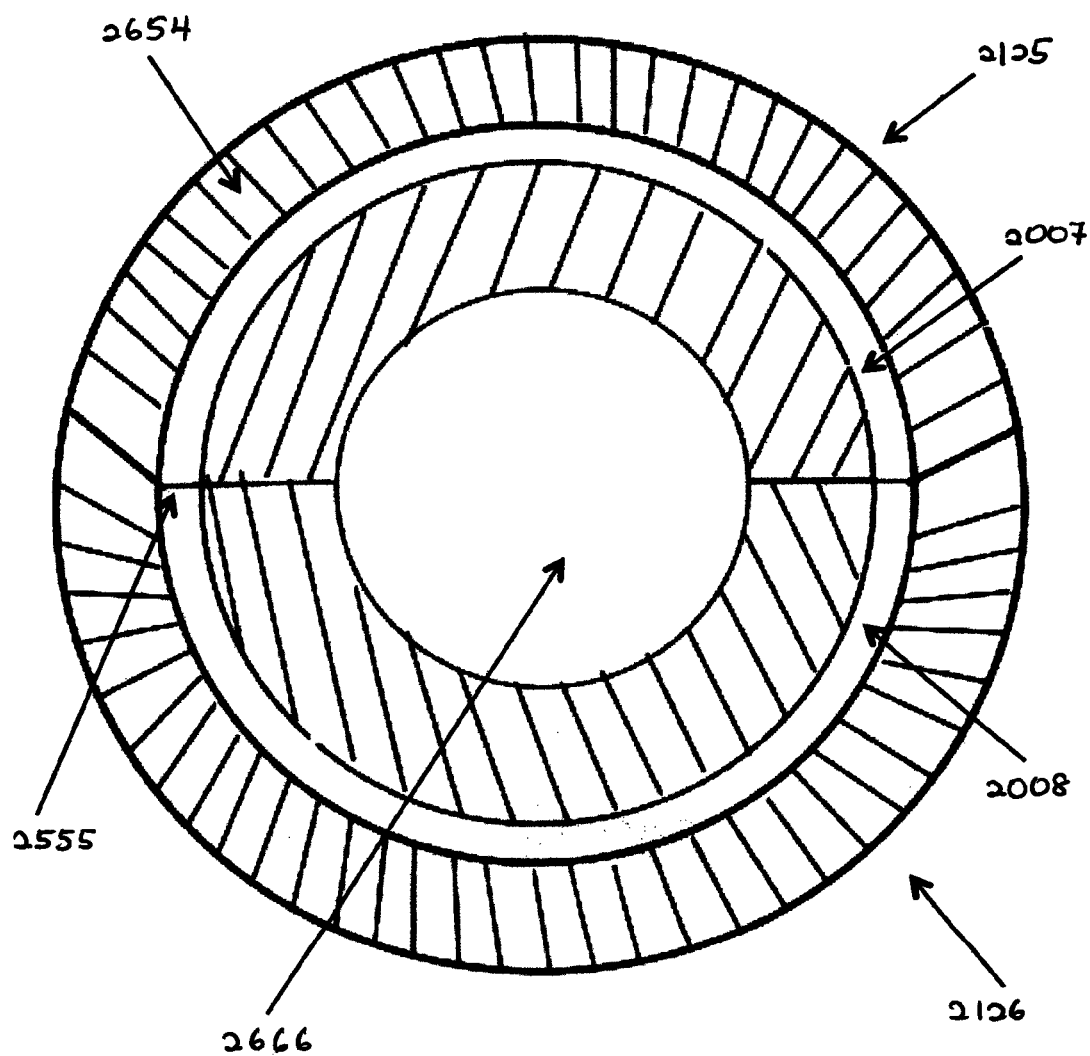
FIG. 47 is a perspective diagram illustrating the details of an embodiment of a component of a system for producing a comestible baked product in complex shapes using cast molding.
Figure 48:
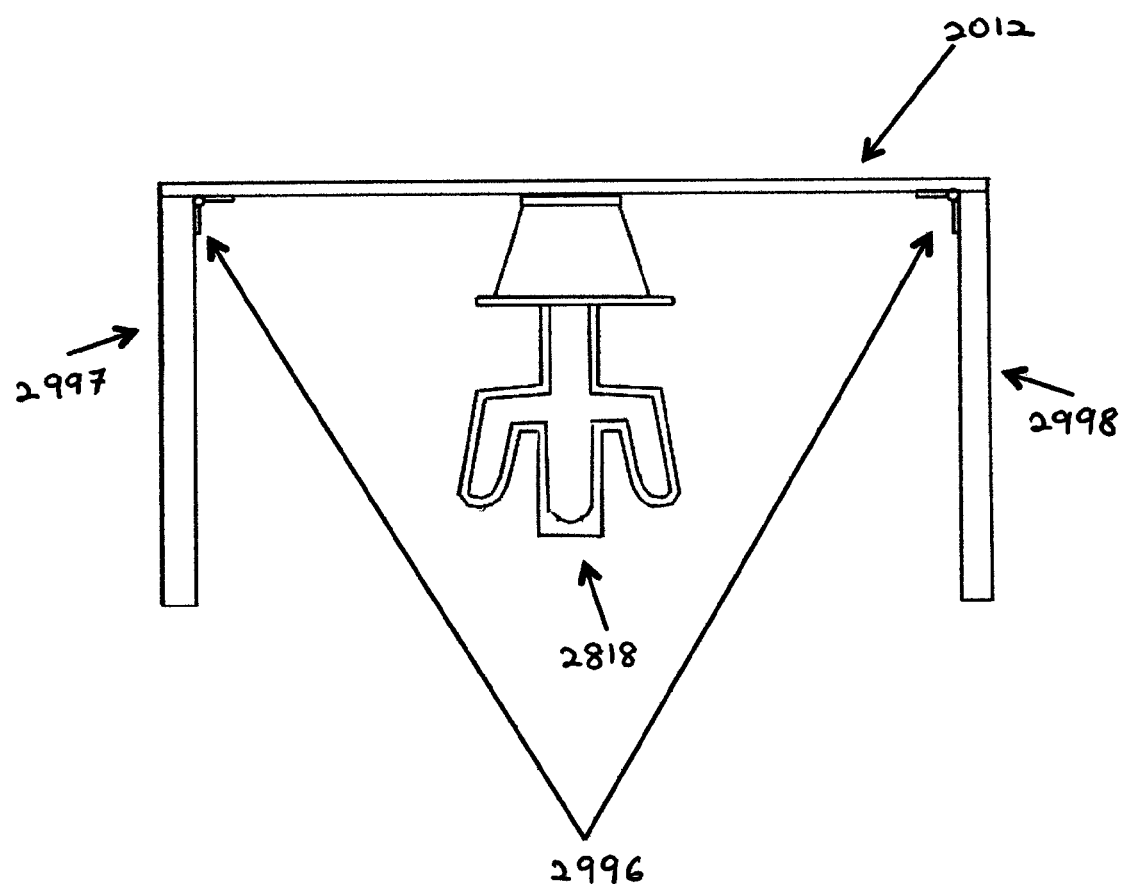
FIG. 48 is an elevation diagram illustrating the various components and details of an embodiment of a system for producing a comestible baked product in complex shapes using cast molding.
Figure 49:
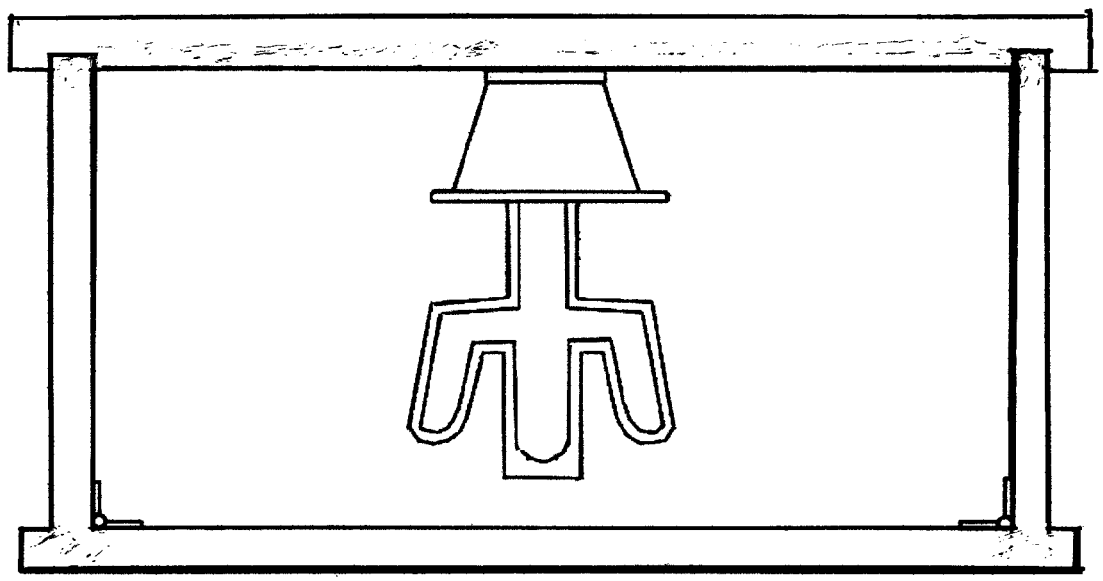
FIG. 49 is an elevation diagram illustrating the various components and details of an embodiment of a system for producing a comestible baked product in complex shapes using cast molding.

Another embodiment that fills from the bottom of the baking cup is seen in FIG. 44. Simply put, FIG. 44 shows two connecting pieces 2125 and 2126 and a baking cup pan 2012. The two connecting pieces 2125 and 2126 create the individual baking cup generally at 2192 and 2193 when sealed together and they also create the statute mold generally at 2127 and 2128 that is connected to the baking cup generally at 2009. The two connecting pieces in FIG. 44, comprised of 2125 and 2126, has a seal 2003 and 2004 respectively that goes around the perimeter of each piece for the statute mold and for the baking cup. In this embodiment, the seal that is used to seal these two pieces together does not create an edge or overhanging seam. The reason the two pieces come together without having any overhang is because seals on both 2125 and 2126 at 2003 and 2004 respectively are housed inside the connecting pieces 2125 and 2126 themselves. There are many possible ways to achieve this as one with ordinary skill in the art would acknowledge, but to see one way up-close, examine connecting piece 2126 in FIG. 45. FIG. 45 shows the one connecting piece generally at 2126. One will also see half the interior statue mold generally at 2128 and half the baking cup at 2193. Then, one will see the internal wall 2802 that forms the statue mold design and separates the statue mold from the chamber 2803 housing the seal. (Note, at 2876, an internal wall is also seen, but this is generally the internal wall that forms the baking cup and separates the baking cup from the chamber 2803 housing the seal.) Next, one will see at 2804 the outside wall of the connecting piece 2126. The chamber 2803 created between the internal wall 2802 and the outside wall 2804 houses the seal 2004. In the chamber 2803, any type of seal can be used. (Some embodiments might not even have a chamber per se, but just have the seal embedded in the connecting pieces outer wall.) 2004 in FIG. 45 features a tongue seal that will connect into the groove seal 2003 on the opposite connecting piece 2125 seen in FIG. 44. In FIG. 46, one can see a side view of 2125 and 2126 coming together to create one sealed device generally at 2818 that is sealed flush at 2806 generally. As one will see in 46, the bottom of the baking cup turns into a lid seal 2555 that will connect to the baking cup rim. (The baking cup rim can be seen in FIG. 44 at 2010.) In FIG. 46, the two pieces 2007 and 2008 that come together to form that lid seal generally at 2555 are better seen individually in FIG. 44 at 2007 and 2008 generally. FIG. 47 shows a bottom view of the mold when 2125 and 2126 are sealed together. (For reference purposes, 2654 is the side of the baking cup.) As one can see in FIG. 47, the lid seal 2555 is created and runs around the circumference of the bottom of the baking cup. Also in FIG. 47 at 2666, one can see the hole that is created. That lid seen in FIG. 47 at 2555 generally will eventually be connected to the baking cup pan rim of the baking cup pan which is part of this embodiment. Looking at FIG. 44, one can see what this baking cup pan rim 2010 looks like. Another view of the baking cup pan 2012 in FIG. 48 shows why this baking cup pan is a little different. Simply put, as seen in FIG. 48, the baking cup pan 2012 has a very shallow baking cup per se and does not have a baking cup that extends beyond the bottom of the pan as seen in the side view presented. As seen in FIG. 44, the baking cups 2009 are just the rim with a lip 2010. Then, it is the baking cup lid generally seen at 2555 in FIG. 47 that seals to the rim of the baking cup in the baking cup pan. Furthermore, as seen in FIG. 44, the baking cups have a hole 2999 in the middle that matches up with the hole in the bottom of the connecting pieces. The hole in the bottom of the connecting pieces is formed when 2125 and 2126 seal together. The separate half moon opening generally at 2651 and 2652 that create that hole in the assembled connecting pieces can be seen in FIG. 44. Refer again to FIG. 44 to see this baking cup rim with the lip 2010 and the hole 2999 in the middle of the baking cup look like. You will also note in FIG. 44, this system also uses legs 2997 and 2998 respectively and hinges 2996 (previously seen in FIG. 35) to support the system as it bakes upside down in the oven. Another view of the system assembled together and upside down can be seen in FIG. 48. (Of course this embodiment, can use the same designed pan stand noted in FIG. 43 to create an entirely different embodiment as seen in FIG. 49.)

The method for the embodiment in FIG. 44 is simple. One connects the connecting pieces seen in FIG. 44 (2125 connects to 2126). Once sealed, an individual would attach the sealed together device to the baking cup rim 2010 via 2007 and 2008. Then, with the device connected to the baking cup pan 2012, one would turn the baking cup pan 2012 upside down and rest it on its legs 2997 and 2998. Next, through the baking cup pan hole 2999 (and technically also through the hole created at 2651 and 2652 when 2125 and 2126 are sealed together) one adds baking ingredients. The system is then placed into the oven for baking in this upside down position. After baking, the system is removed for cooling. After cooling, the system is turned right side up (legs in the air) and the statue and baking cup device that is formed when connecting pieces 2125 and 2126 are sealed together is removed from the rim of the baking cup pan 2010 by unsealing 2007 and 2008. Finally, 2125 and 2126 are unsealed to reveal the comestible within.

Figure 50:
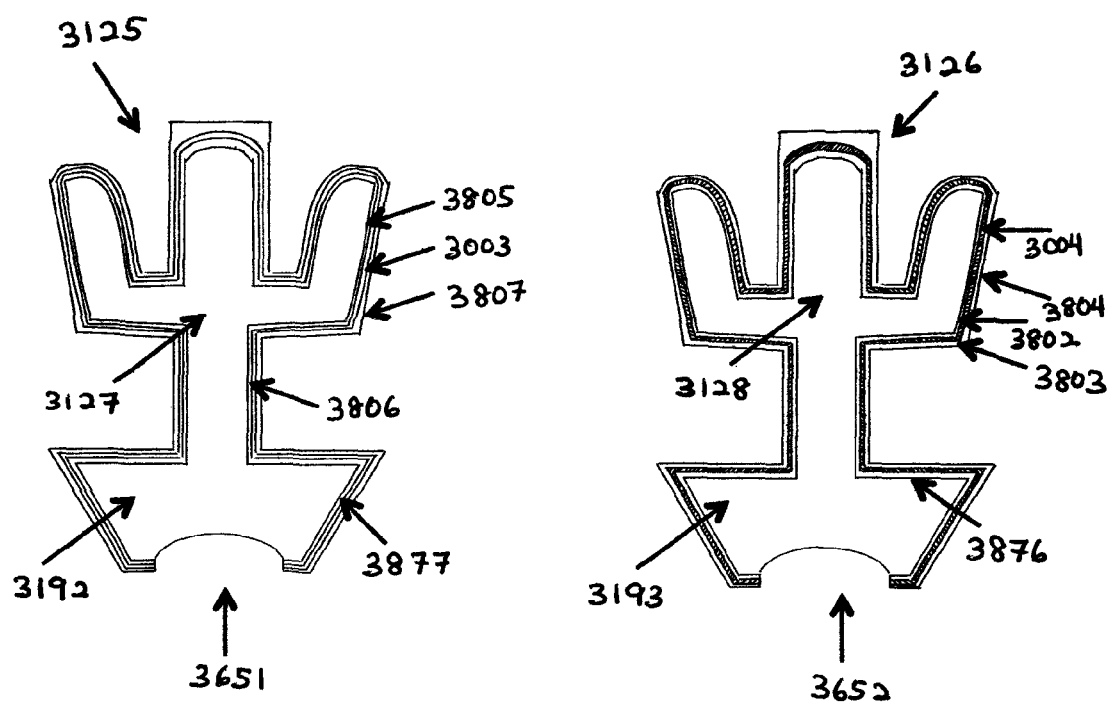
FIG. 50 is a perspective and cross section diagram illustrating the various components and details of an embodiment of a system for producing a comestible baked product in complex shapes using cast molding.
Figure 70:
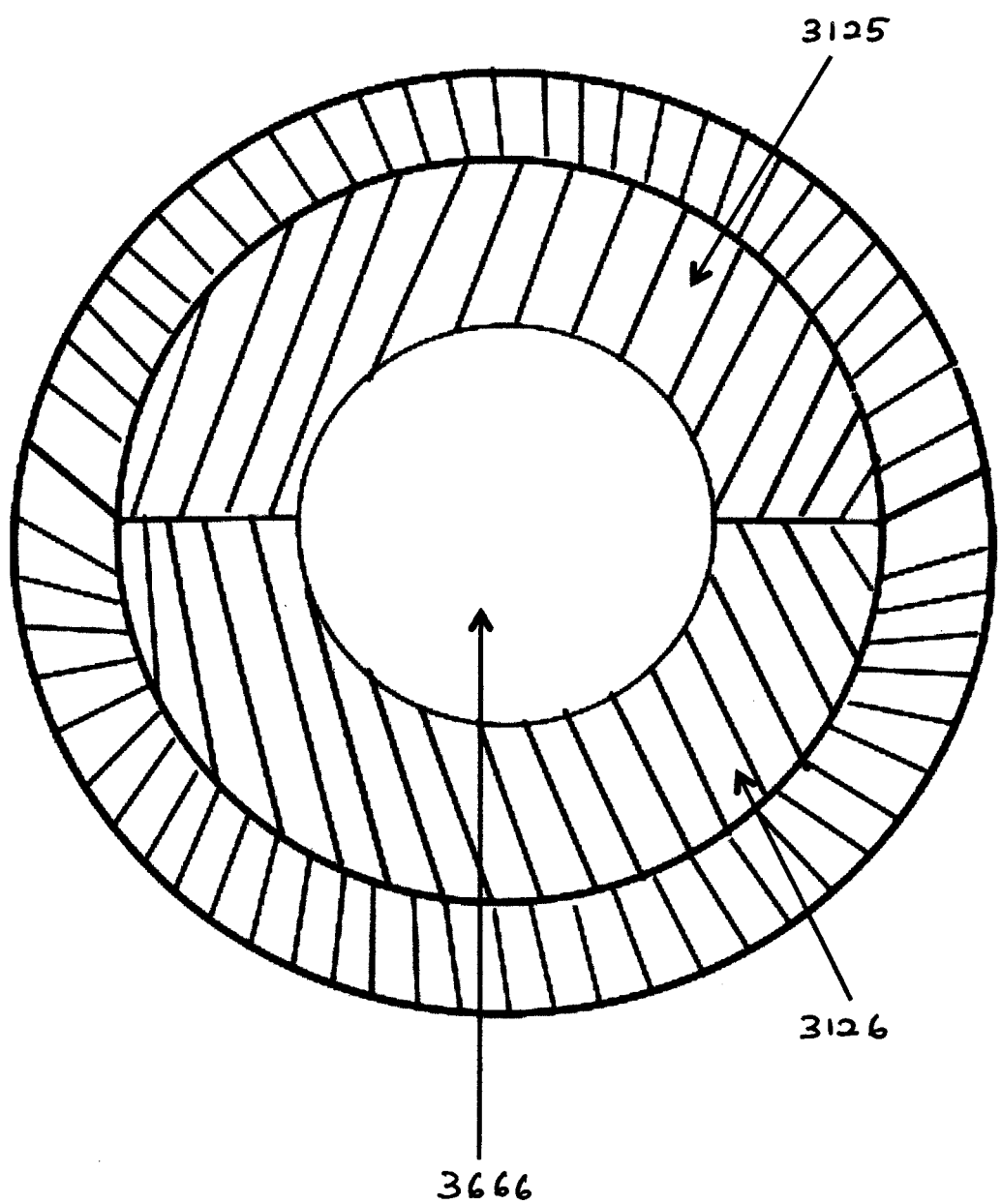
FIG. 70 is a perspective diagram illustrating the various components and details of an embodiment of a system for producing a comestible baked product in complex shapes using cast molding.

Yet another embodiment uses only 2125 and 2126 of FIG. 44. The only modification made is that lid seals 2007 and 2008 are removed from this new embodiment. To see what this new embodiment looks like, see FIG. 50. In FIGS. 50, 3125 and 3126 represent the connecting pieces. In this embodiment, 3125 seals together with 3126 at 3003 and 3004 generally. (The seal is the tongue 3004 and groove 3003 seal previously discussed, but many different types of seals can be used. Also, it is important to note that 3802 and 3805 generally in those portions of the system form the internal wall of the seal chamber and that also creates the external wall of the statue mold. Then, 3803 and 3806 constitute the seal chamber where 3004 and 3003 respectively reside. In addition, 3804 and 3807 form the external wall of the seal chamber. It is also important to note that the internal walls of the seal chamber at 3876 and 3877 generally in these portions of the system create the baking cup.) In FIG. 50, 3127 generally and 3128 generally when sealed together form a statue mold connected to 3192 generally and 3193 generally that creates a baking cup when sealed together. Once sealed, the system is turned upside down and filled with baking ingredients through the bottom hole that is created when 3651 meets up with 3652. The connecting pieces sealed together 3818 and turned upside down can be seen in FIG. 51. One would then add the ingredients into the system while upside down through the hole 3666 that is created when 3651 and 3652 come together when 3125 and 3126 are sealed together. To see what the fill/expansion hole 3666 looks like from a bottom perspective once 3651 and 3652 are sealed together, see FIG. 70. After the ingredients are added into the system, it is baked upside down. Once baked, the system would be removed from the oven and cooled. Once cooled, the system would be turned right side up and 3126 would be separated from 3125 to reveal the comestible within. (Please note, in this embodiment a seal chamber is noted where the seal that connects the two connecting pieces resides. In other embodiments, this doesn't have to be a chamber per se, it can be flush next to the internal wall of the connecting pieces that form the baking cup and flush next to the internal wall of the connecting pieces that form the statue mold which is connected to the baking cup. Furthermore, the seal itself on these connecting pieces can be on that wall of the connecting pieces that forms the statue mold and the baking cup. It doesn't necessarily have to have a separate compartment or chamber.)

Figure 51:
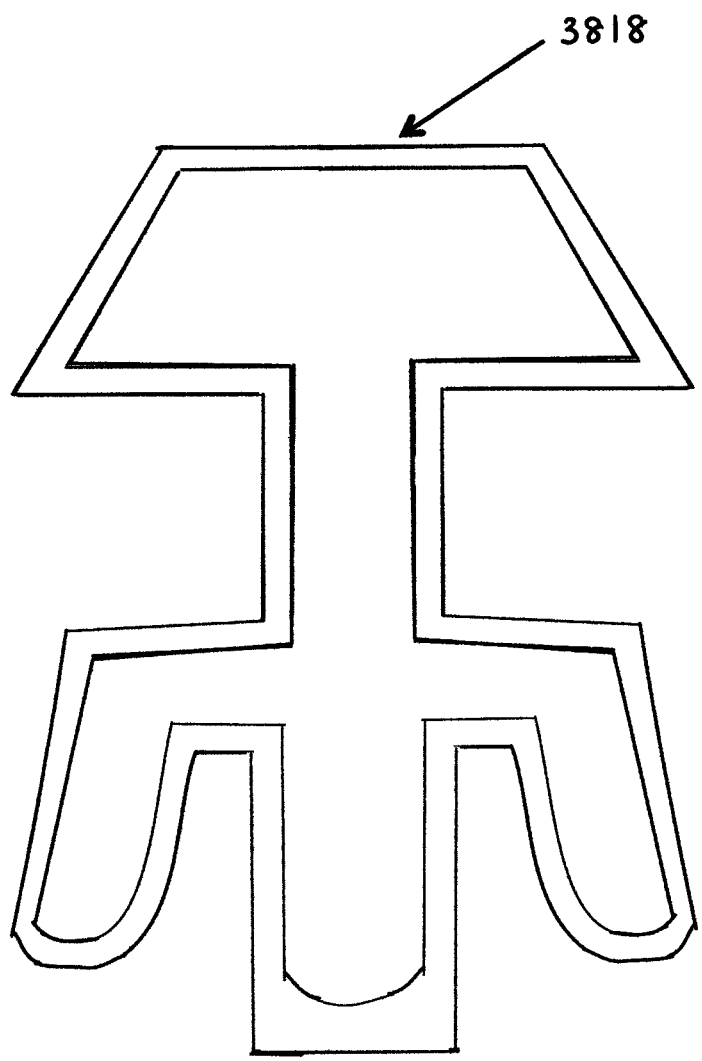
FIG. 51 is a plan diagram illustrating the various components and details of an embodiment of a system for producing a comestible baked product in complex shapes using cast molding.

Depending on the statue design, as in the case of the saguaro, there might not be much surface area for the system to rest upon when upside down. As seen in FIG. 51, it just rests on the top barrel portion of the cactus when upside down. One might wish to place these systems on a baking sheet for transport and for oven baking purposes. However, another solution would be to redesign the top portion of the system seen in FIG. 51 to give it a better means by which to stand on its head when baking upside down. As a result, a few different embodiments have been created to address the stability issue when the system bakes upside down while standing on its head.

Figure 52:
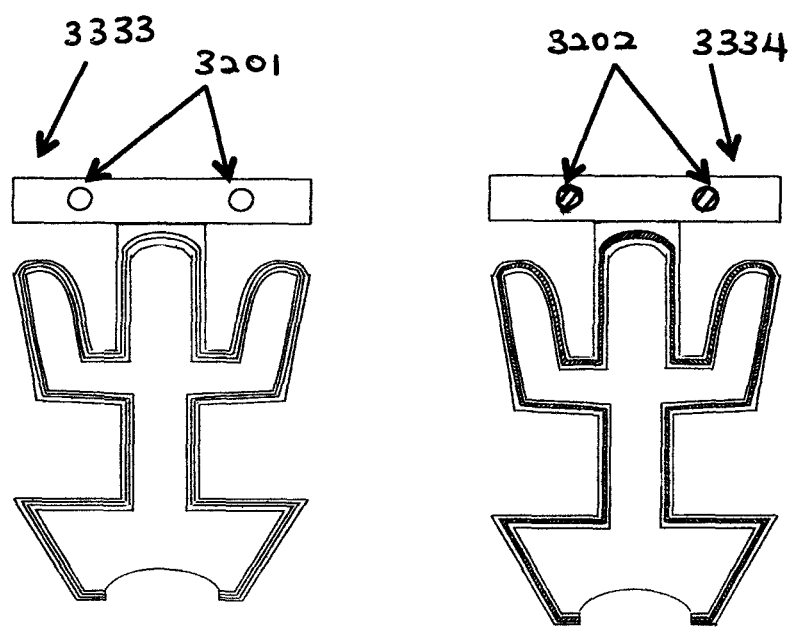
FIG. 52 is a perspective and cross section diagram illustrating the various components and details of an embodiment of a system for producing a comestible baked product in complex shapes using cast molding.
Figure 53:
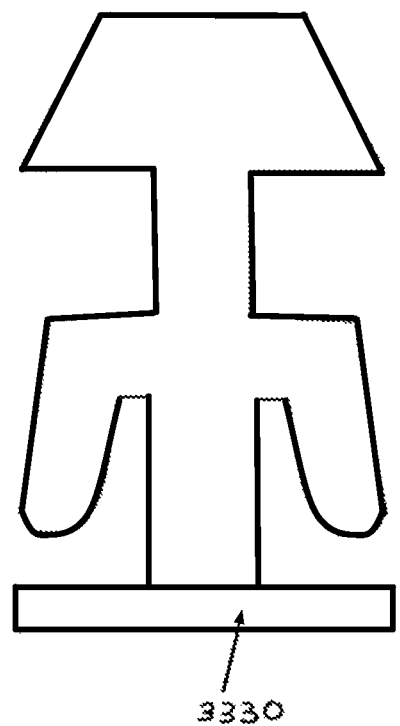
FIG. 53 is a perspective diagram illustrating the various components and details of an embodiment of a system for producing a comestible baked product in complex shapes using cast molding.
Figure 54:
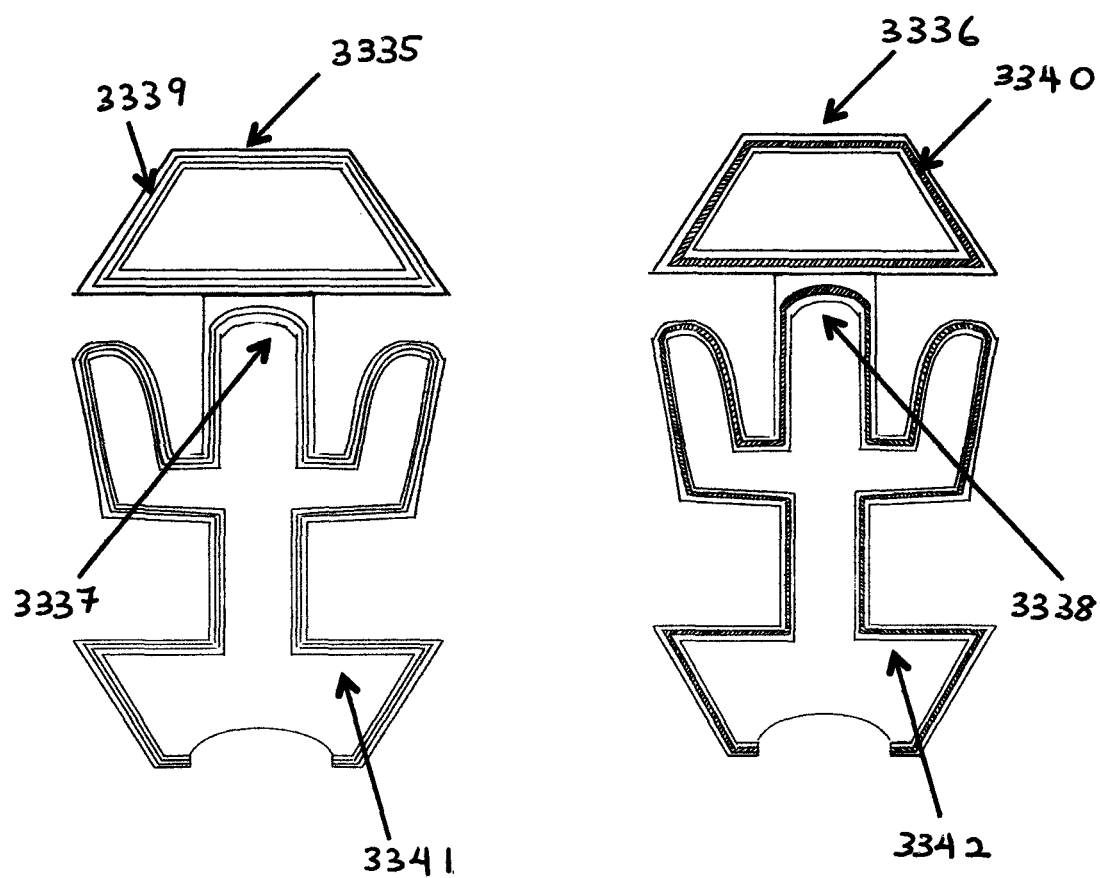
FIG. 54 is a perspective and cross section diagram illustrating the various components and details of an embodiment of a system for producing a comestible baked product in complex shapes using cast molding.
Figure 55:
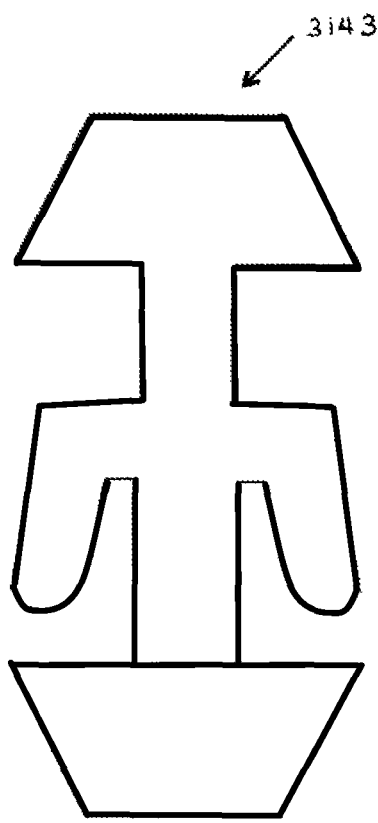
FIG. 55 is a perspective diagram illustrating the various components and details of an embodiment of a system for producing a comestible baked product in complex shapes using cast molding.

One design that helps make the system more stable when baking upside down while standing on its top portion is to create a flat base on the top portion of the two connecting pieces as seen in FIG. 52 at 3333 and 3334. On 3333 there are two female receiving holes at 3201 generally and on 3334 there are two, male protruding nubs at 3202 generally. These components (3201 and 3202) seal this portion of the system together. (Other types of seals/fasteners can be used here including, but not limited to: tongue and groove, snaps, etc.) As seen in FIG. 53, when sealed together and flipped upside down, the base 3330 provides a better support for the system. Another means by which to stabilize the system when baking upside down is to make the base 3330 seen in FIG. 53 into a base designed like a baking cup. See FIG. 54 to see how 3335 and 3336 create a base that forms a baking cup. As one will note, at 3339 and 3340, an additional groove and tongue seal has been added to the perimeter of the baking cup base to help keep the base securely sealed and stable during filling, baking, and cooling. Many different types of seals can be used in this base section including, but not limited to snaps, lid seals, tongue and groove, etc. Also, keep in mind, this baking cup base will not be filled with comestible as the internal wall of the statue mold 3337 and 3338 do not permit baking ingredients to enter those sections. The internal wall of the baking cup 3341 and 3342 will also not permit egression into that base section as well. See FIG. 55 to see what this system embodiment looks like when 3335 and 3336 comes together to form the system 3143 and is flipped upside down. The efficient thing about this design is that when flipped upside down, the baking cup on the top could fit into a baking cup which is part of a baking cup pan. When cooled you could also flip then upright and place them back into the baking cups of the baking cup pan prior to unsealing all them.

Figure 56:
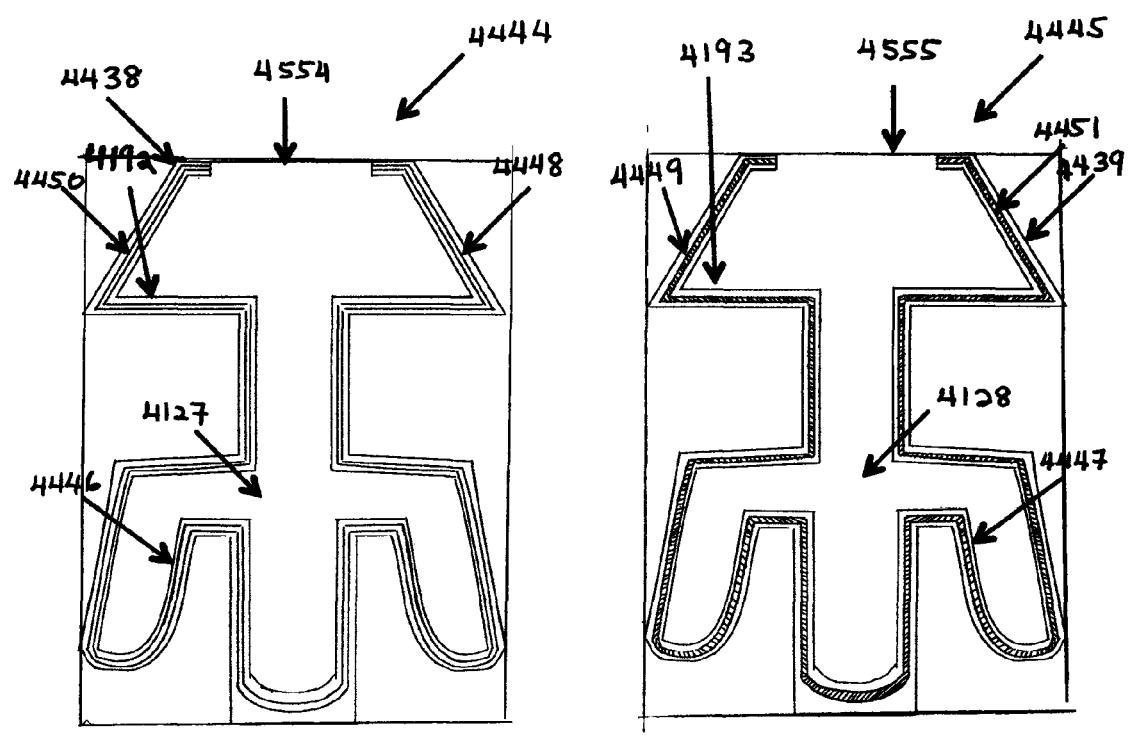
FIG. 56 is a perspective and cross section diagram illustrating the various components and details of an embodiment of a system for producing a comestible baked product in complex shapes using cast molding.
Figure 57:
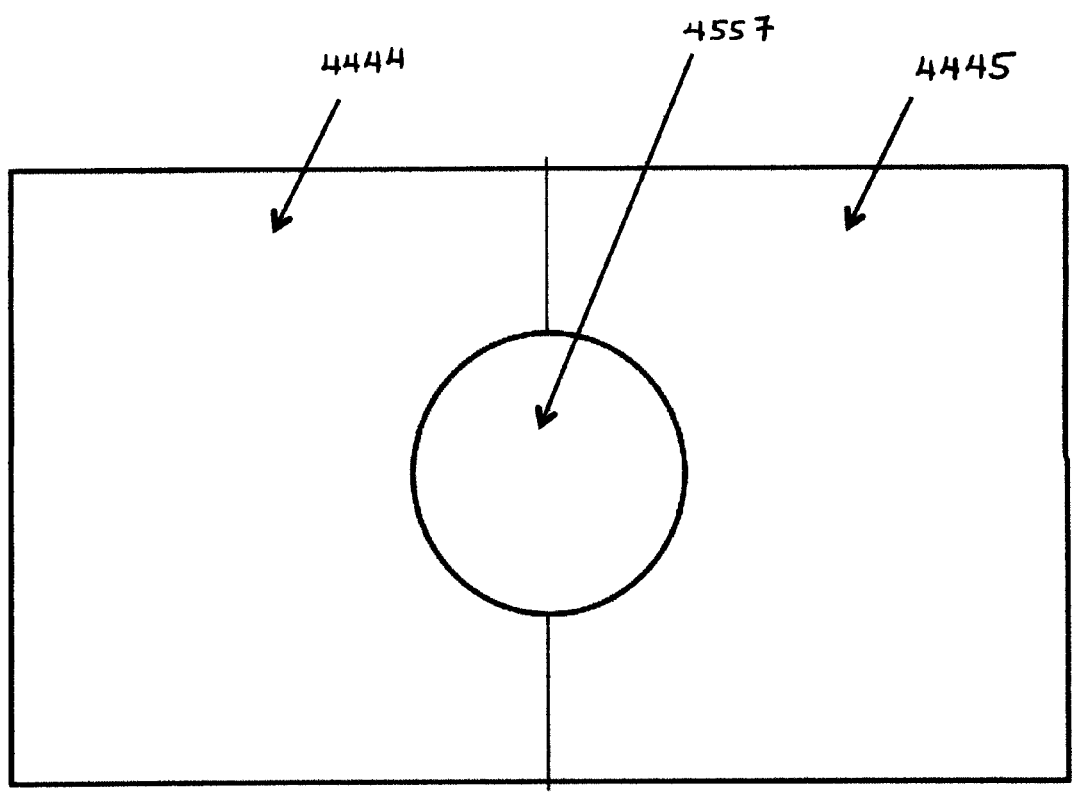
FIG. 57 is a perspective diagram illustrating the various components and details of an embodiment of a system for producing a comestible baked product in complex shapes using cast molding.
Figure 58:
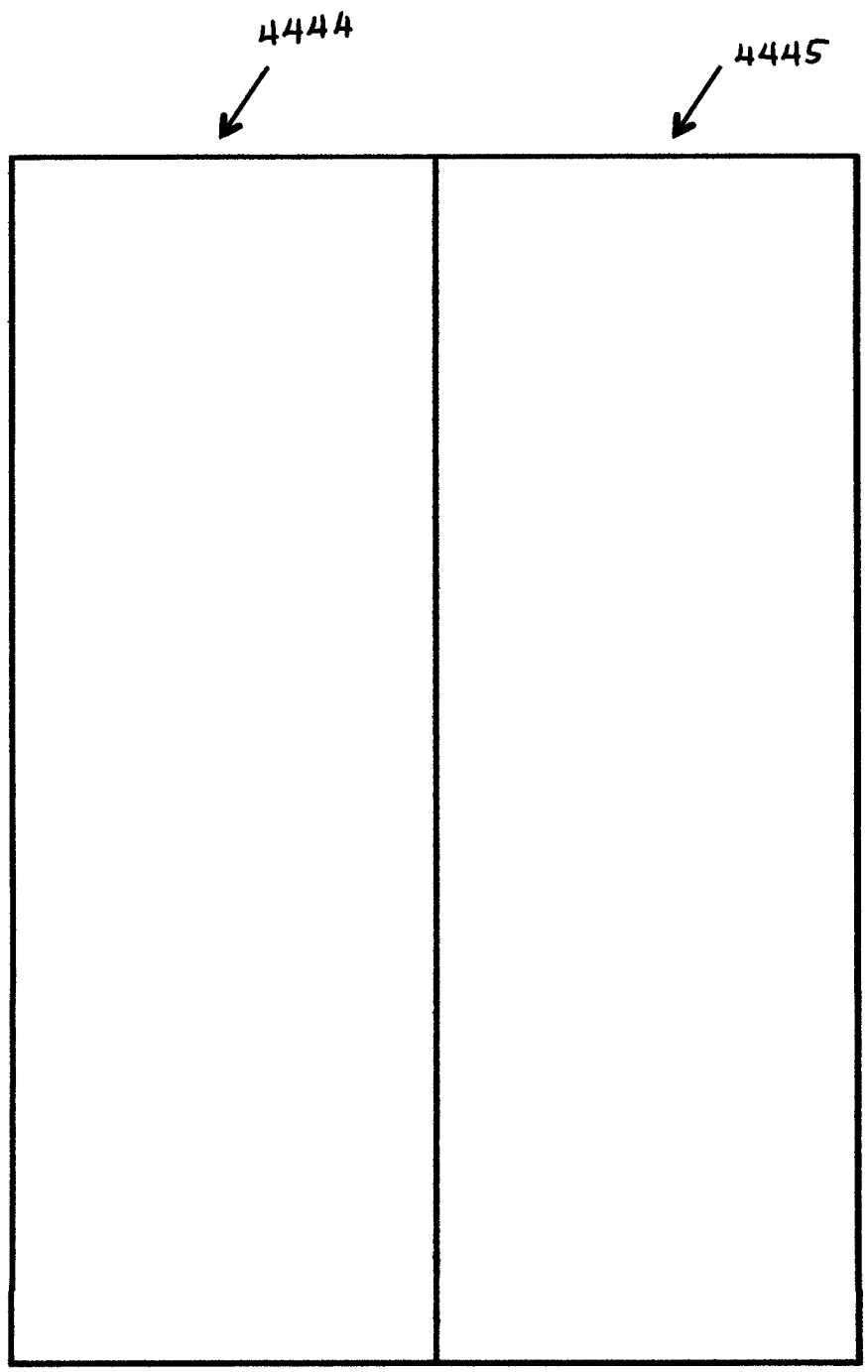
FIG. 58 is a perspective diagram illustrating the various components and details of an embodiment of a system for producing a comestible baked product in complex shapes using cast molding.

Another embodiment that modifies the embodiment seen in FIG. 50 is seen in FIG. 56. This embodiment, like the other ones, attempts to improve the stability of the system seen in FIG. 50 by having the two connecting pieces residing in separate blocks. As seen in FIG. 56, the connecting pieces are now seen as encased in separate blocks at 4444 and 4445 respectively. As one can see, connecting piece 4444 and 4445 create a statue mold in the shape of a half cactus in each of their respective blocks at 4127 and 4128. At 4446 and 4447 generally you have the inner wall that is responsible for forming the statue mold. It also separates the statue mold from the seal chamber generally at 4448 and 4449. You also have at 4438 and 4439 the exterior wall of the connecting pieces. The interior wall and the exterior wall create the aforementioned seal chamber at 4448 and 4449. (Other embodiments of this type may not need a seal chamber and just may utilize the seal in that location instead.) At 4192 and 4193 generally, you have the inner wall that is responsible for forming the baking cup. 4448 and 4449 is the chamber that houses the seal for the connecting pieces. Again, 4438 and 4439 form the exterior wall of the connecting pieces. Then, at 4450 you have a groove seal that receives the tongue seal of 4451. (This resides in the seal chamber 4448 and 4449 respectively.) When 4444 and 4445 seal together they form a baking cup and they form a statue mold attached to the baking cup. The seal prevents liquid egression when the system is upside down (cactus standing on its head). Also, one will note at 4554 and 4555 you have a fill/ expansion/heat exchange port that is created when the two come together. To see what this port (hole) 4557 looks like from a top view when this comes together, see FIG. 57. At 4557 you can see the fill/expansion/heat exchange port that is created when the two connecting pieces seal together. You can also see what this system looks like from a side view when connecting pieces 4444 and 4445 completely sealed together in FIG. 58 to form the system. (It is important to note in FIG. 56 that while the tongue 4451 and the groove 4450 seal is depicted, there are many seals that can be used instead. Furthermore, one could also add addition seals around the perimeter of each block of 4444 and 4445 to hold the two connecting pieces even tighter together. Or, as one of ordinary skill in the art knows, one could conceivably forgo the seal around the baking cup and the statute mold and use only the seal around the perimeter of the blocks to connect them together using a multitude of possible seals including, but not limited to the tongue and groove seal, snaps, etc. Another obvious embodiment that uses this block approach could forgo seals just around the statue mold and baking cup and/or just around the perimeter of the blocks. Instead, the seal could occupy the space from the edge of the statue mold and baking cup all the way to the perimeter of the block. This could take on the form of the waffle iron seal discussed previously, with one block interlocking with the other in the space discussed. The seal may use any or all of that space to ensure it seals tightly to prevent liquid egression. One could also add a seal stopper on top of this system if they wanted to prevent overflow or egression out of the top. This system like all the other previous ones can come in different sizes and shapes. In other words, the baking cup can be different sizes, shapes, dimensions, volumes, forms, etc. and so can the statue mold. In fact, the baking cup could be made very large and could resemble that of a traditional round cake. The statue mold attached to the comestible baking cup could be equally larger.

The methods of use for the afore-mentioned embodiments are relatively the same. One would seal the connecting pieces together to form the baking cup and to form the statue mold that is connected to the baking cup. Then, the system would be turned upside down and filled with baking ingredients through the filling port/expansion port/heat exchange port. Then, it would be baked and cooled upside down. Then, one could either turn it right-side up or place it on its side. By unsealing the connecting pieces, the baked comestible would be revealed and then removed for consumption. (One could even open it after it has cooled while it is still upside down if one desired.)

Figure 60:
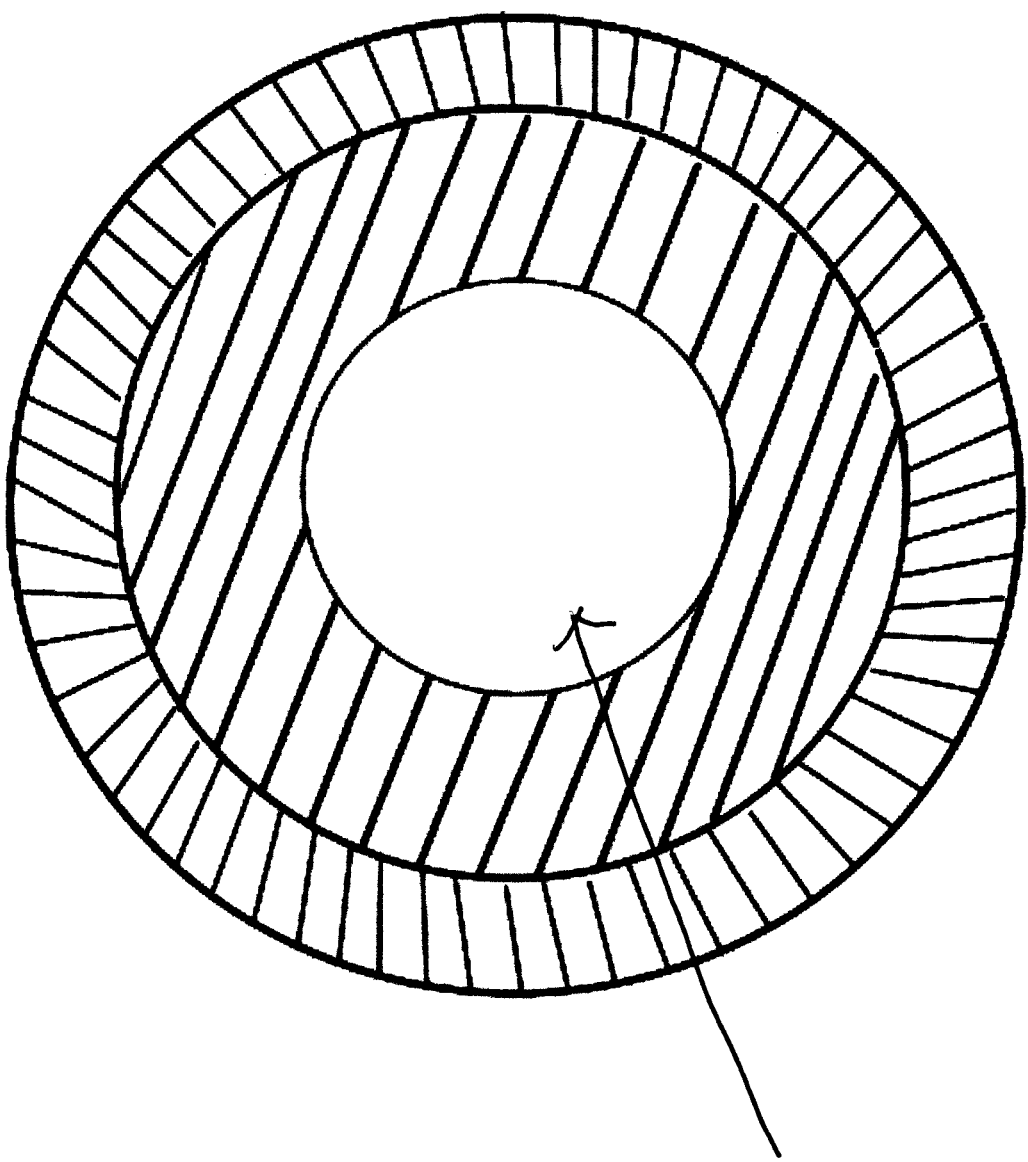
FIG. 60 is a perspective diagram illustrating the various components and details of an embodiment of a system for producing a comestible baked product in complex shapes using cast molding.
Figure 62:
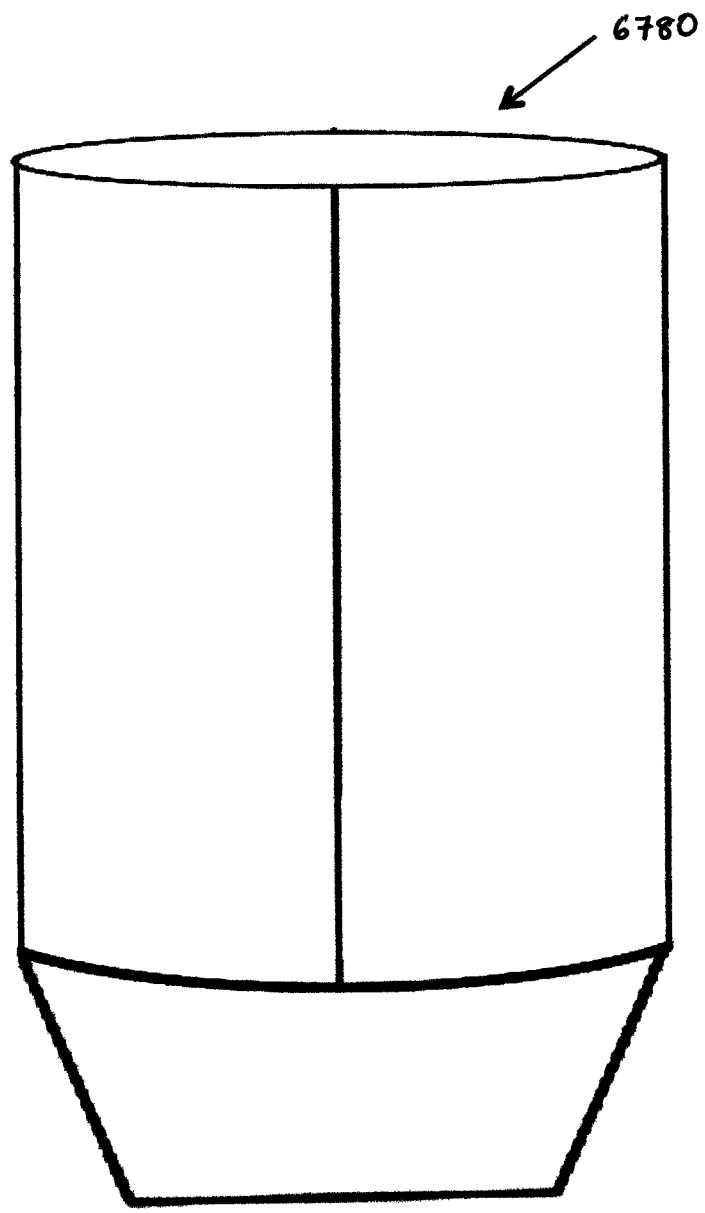
FIG. 62 is a perspective diagram illustrating the details of an embodiment of a component of a system for producing a comestible baked product in complex shapes using cast molding.
Figure 63:
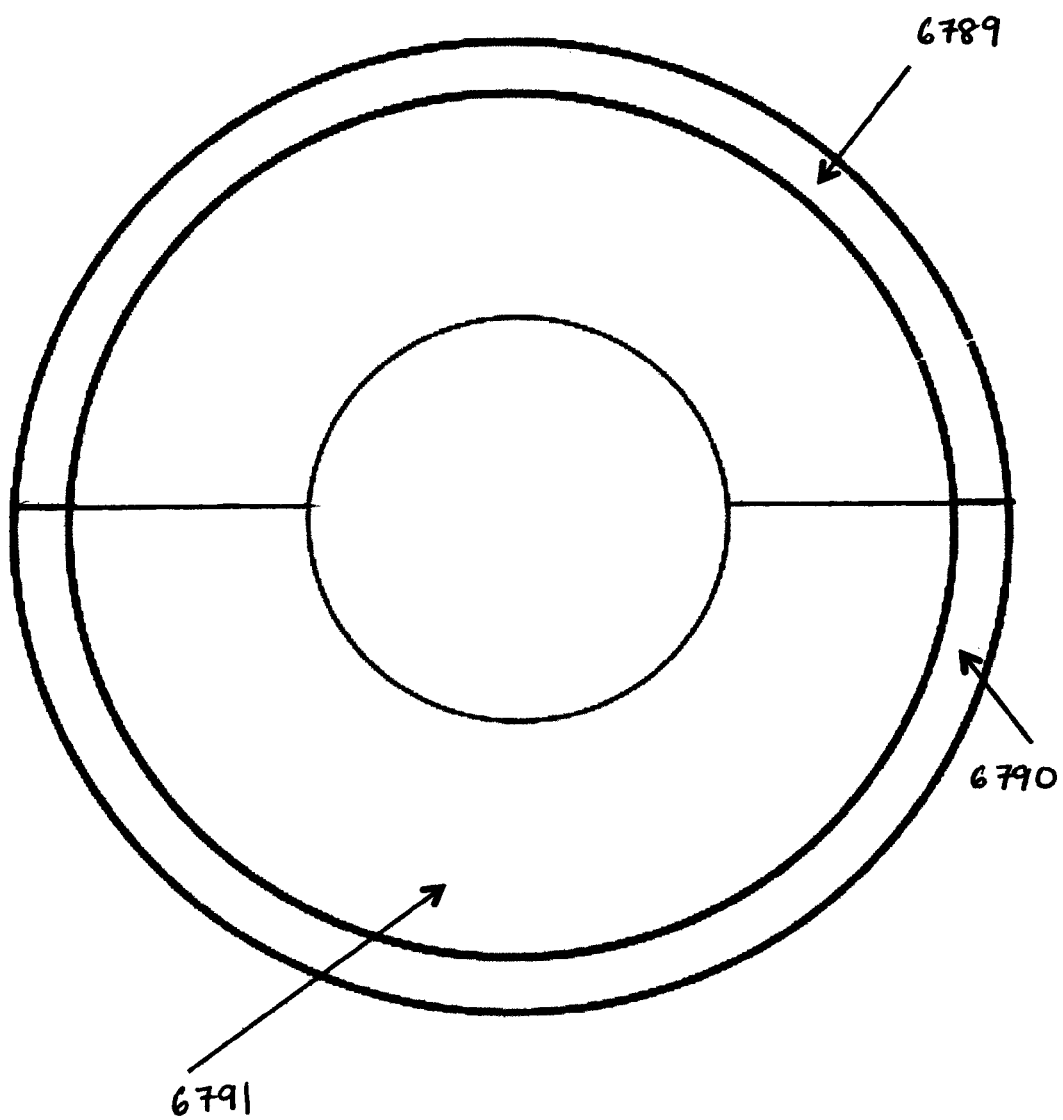
FIG. 63 is a perspective diagram illustrating the various components and details of an embodiment of a system for producing a comestible baked product in complex shapes using cast molding.

When creating embodiments of a design, whereby you fill it from the bottom, one could create such an embodiment with more than two device pieces. For example, an alternate embodiment could include a baking cup 6666 and two statue mold pieces 6667 and 6668 respectively as seen in FIG. 59. As seen in FIG. 59, at 6301 you have one half of a statue mold that forms half a saguaro cactus. At 6302, you have the other half of the statue mold that forms the other half of the saguaro cactus. At 6303 and 6304 generally, you have the walls of the saguaro cactus mold. On the other side of that wall at 6305 and 6306 you have the seals generally. Specifically, at 6305 you have a groove seal that accommodates the tongue seal at 6306 that enables the two pieces to connect to form a tight seal. (One of ordinary skill in the art would acknowledge a multitude of seals cold be used in lieu of the tongue and seal approach used here including, but not limited to snaps, locking latches, and even silicone zippers, etc.) In addition, at 6307 and 6308 generally one will see the lid ring that joins with 6309 and 6310 (the lid top components) to create a lid that, once assembled, can snap onto the rim with a lip 6311 of the individual baking cup 6666. The main difference, when compared to some of the other embodiments previously discussed, is that in this system, the fill/overflow/heat exchange is in the bottom of the baking cup. See FIG. 60 to see what the fill hole 6669 in the bottom of the baking cup looks like. Once the system is sealed together and flipped upside, the tight tongue and groove seal, along with the lid seal should prevent liquid egression of the baking ingredients while it bakes. When flipped upside down for filling, baking, and cooling, the system embodiment depicted just rests on the top portion of the sculpture. However, it is important to note, the embodiment might be improved if the statute mold pieces include a flat top base on top of the statue mold like was seen in FIG. 52. Another embodiment may employ a baking cup base instead of a flat top base of the likes seen in FIG. 54. However, an even better embodiment as shown in FIG. 61 is to have the statue molds encased in block pieces like the cylindrical block pieces at 6777 and 6778 so that the weight of the baking cup 6779 can be supported when the connected cylindrical blocks are sealed together and connected to the baking cup and then flipped upside down for filling, baking, and cooling. Too see what the system embodiment in FIG. 61 looks like all assembled prior to being flipped upside down, see FIG. 62 at 6780 generally. (Please note, the filling hole cannot be seen in FIG. 61 or 62 but looks identical to FIG. 60.) Please recall, all connecting pieces seal together to prevent liquid baking ingredient egression when flipped upside down and connected to the baking cup. As known by one of ordinary skill in the art, the seals used to connect the statue mold pieces together and the seals used to connect the assembled statue mold to the baking cup seal can be of many varieties. The seals illustrated in FIG. 61 are groove at 6781 generally and tongue at 6782 generally. In this embodiment, the statue mold pieces 6777 and 6778 are encased in cylindrical blocks at 6783 and 6784 generally. The perimeter of the statue molds have the afore-mentioned tongue and groove seals surrounding each piece respectively. In this embodiment, at 6785 and 6786 respectively, you have the external wall of the seal chamber. Then you have the seal as previously noted at 6781 and 6782. Finally, one will see the external wall of the statue mold generally at 6787 and 6788. At the bottom of the two statue mold pieces at generally 6789 and 6790, you will see another seal that is known as the lid seal. When 6777 and 6778 seal together, they not only create the statue mold, but they create what would be considered a lid with a lid seal to snap on to the baking cup rim 6800. To see what this lid generally at 6791 and lid seal generally at 6789 and 6790 look like from the bottom when 6777 and 6778 come together, please see FIG. 63.

Referring again to FIG. 61, once 6777 and 6778 are sealed together, it is connected to the baking cup rim with the lip 6800 of the individual baking cup. With the system sealed, it can be filled upside down and filled from the baking hole in the bottom of the baking cup for filling, overflow, and heat exchange. [It is important to note that this is just one embodiment. One of ordinary skill in the art would note that there are many different approaches by which to modify this system. For example, in FIG. 61, the external wall of the statue mold is represented at 6787 and 6788. After that wall, you could just have a seal surrounding the mold walls in the block that are just merely protruding, male nubs on one side that fit in to female hole openings on the other block that surround the other piece of the statue mold. In other words, there are many different types of seals and you can have seals surrounding the statue mold piece that are not embedded in a seal chamber as noted. Furthermore, the design and layout of the seals outside of the statue mold pieces can vary dramatically. For example, the entire block piece 6777, not including the statue mold, could have been protruding, raise waffle snaps. These protruding waffle snaps could have fit into receptacles that cover the entire block piece of 6778, not including the statue mold, to seal the two pieces of the system tightly together. Furthermore, one of ordinary skill in the art would acknowledge, that one could forego seals on the block surface or around the statue mold (or a combination of both) and just run them along the perimeter of the cylindrical pieces. The cylindrical block pieces in essence could seal together in many ways including, but not limited to that way in which a lid seals to a rim or container. Furthermore, other seals could be used in lieu of the lid seal at 6789 and 6790 respectively.]

Finally, when the statue mold pieces are sealed together and the assembled statue mold is sealed to the baking cup, the system is ready to be flipped upside down and filled with baking ingredients through the hole in the bottom of the baking cup. Please see FIG. 60 to see what the opening in the bottom of the baking cup that is used for filling/heat exchange/and/or overflow looks like. After filled with baking ingredients, the comestible is baked in the system in the upside position and then removed and cooled in that position. After cooling, the baking cup can be removed from the comestible. Next, the comestible can be turned rights side up and the two statue mold pieces can be separated. (Of course, if one preferred, one could turn the system right side up and unseal the two statue mold pieces from the baking cup and then from each other. Then, one could remove the comestible from the baking cup.) [Two important notes, if the baking ingredients rose out of the filling port, shave off the excess baking ingredients. Also, if you wish to remove the comestible portion of the baking cup first, one would want to first unseal the lid that is connected to the baking cup. (The lid as one will recall is formed when the statue mold pieces are sealed together.) Then, one could push up on the bottom of the baking cup comestible portion that can be accessed via the filling hole to help remove this portion from the baking cup. Or, because this embodiment is silicone (although any acceptable baking material can be used for this system), one can merely peal down the walls of the baking cup to gain access to the comestible to lift it out of the baking cup. Also, one could, if they wanted, place this in a baking cup pan for easy transport to and from the oven provided the cylindrical top portion fit in the baking cup. Or, if one desire, one could put it on a baking sheet for transport purposes as another option.]

Figure 65:
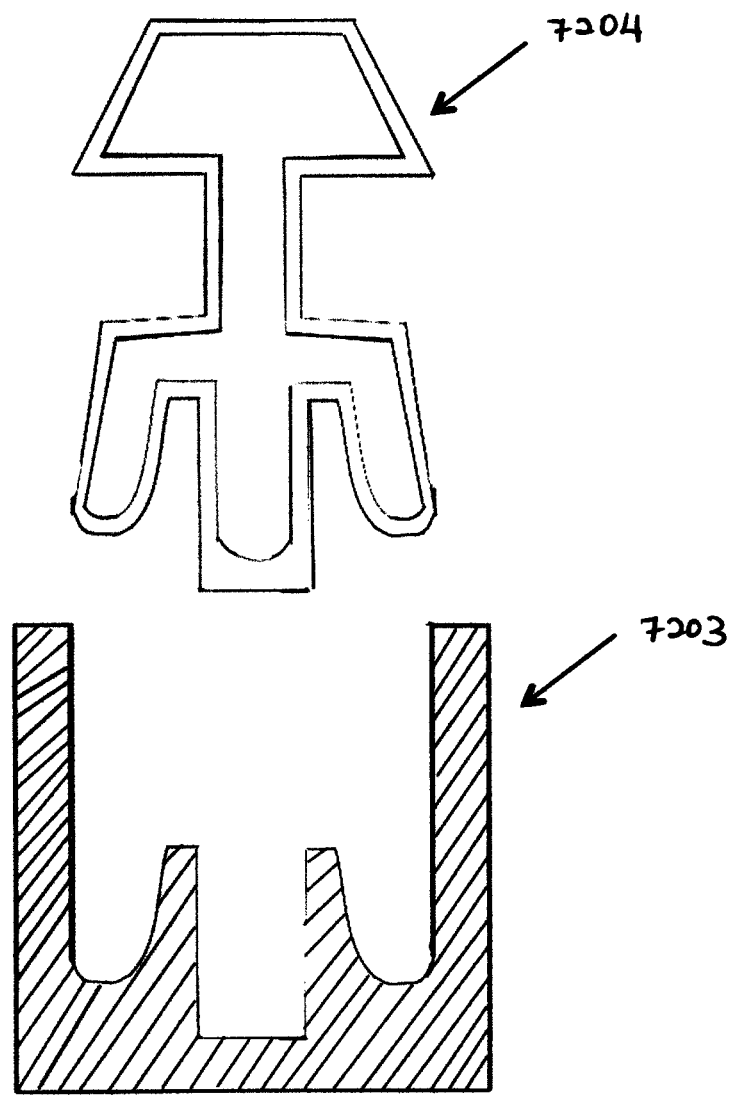
FIG. 65 is a perspective and cross section diagram illustrating the various components and details of an embodiment of a system for producing a comestible baked product in complex shapes using cast molding.
Figure 66:
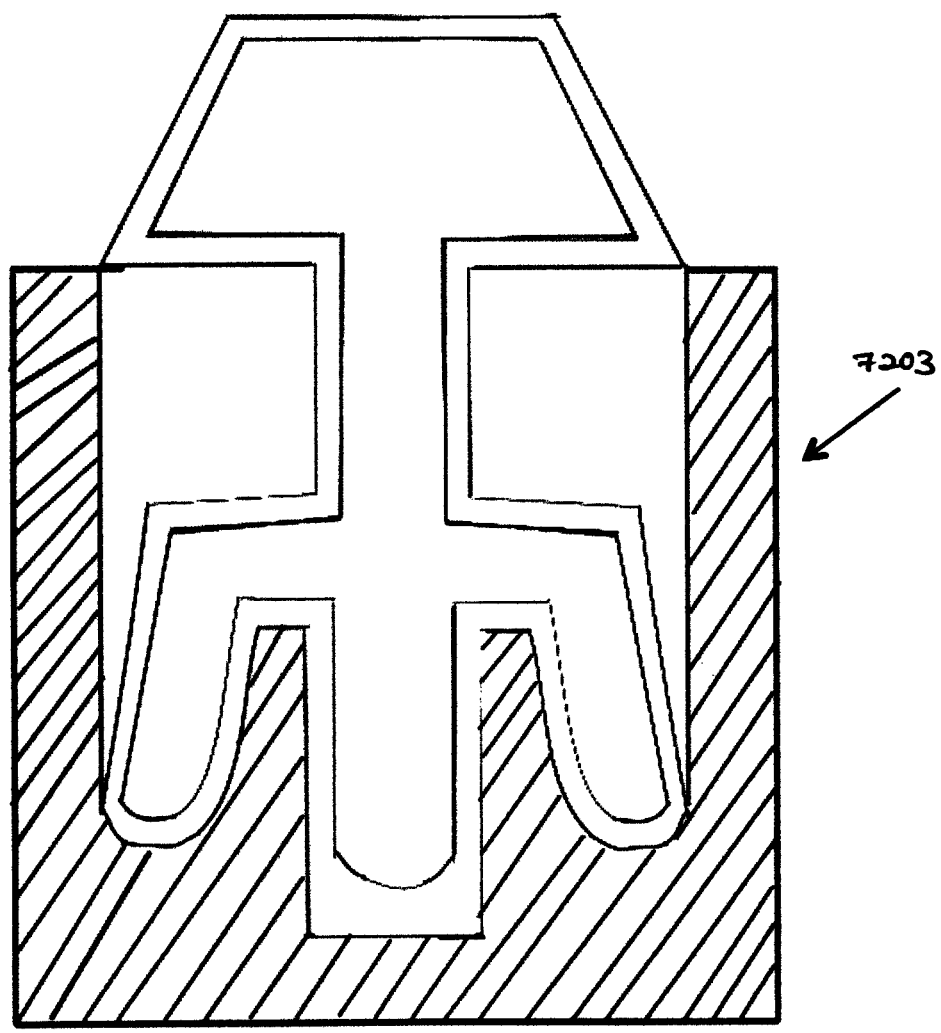
FIG. 66 is a perspective and cross section diagram illustrating the various components and details of an embodiment of a system for producing a comestible baked product in complex shapes using cast molding.

Another embodiment is in essence the system seen in FIG. 50, but this time it comes with a cradle to hold the system when upside down. In FIG. 64, connecting pieces 7200 and 7201 connect to form a baking cup and a statue mold connected to the baking cup which has a hole in the bottom of the baking cup. Instead of having it sit upside down on its top portion during filling, the connecting pieces when assembled sits upside down inside a cradle generally at 7203. To see what connecting pieces 7200 and 7201 look like when assembled together to form 7204 prior to being placed in cradle 7203, see FIG. 65. Then, as one can see in FIG. 66, the cradle receives the top portion of the assembled connecting pieces. (As one will recall, the top portion of the connecting pieces forms the statue mold and the bottom portion of the connecting pieces forms the baking cup it is connected to.) Sitting upside down in the cradle, the assembled connecting pieces are stabilized so as to allow for easier filling through the hole in the bottom of the baking cup, easier transport to and from the oven, and easier cooling. Furthermore, although not illustrated, these cradles may be designed as baking cups on the bottom of the cradle so that they may be placed in individual baking cups that are part of a baking cup pan. Simply put, you could put the baking cup cradle in a baking cup which is part of a baking cup pan and then put the device (the baking cup and the statue mold connected to the baking cup that is created when the connecting pieces are sealed together) into the cradle which has already been put in the baking cup which is part of a baking cup pan.

In some instances, those who wish to use the embodiments that fill from the bottom of the baking cup may wish to use a baking cup liner. A specially created baking cup liner 8100 has been created for this purpose. Please see FIG. 67 for a side view. For a view of the bottom of this baking cup, see FIG. 68. The view of the bottom of the specially created baking cup liner (for the bottom filling systems previously discussed) shows how this embodiment is different than a normal baking cup liner. Specifically, the baking cup liner at 8101 has a hole in the bottom of it that permits ingredients to pass through for filling. Second, you will note that baking cup liner has wings that extend into this hole on each side of the circular hole at 8102 and 8103 generally. (In this embodiment, it features two wings, but could theoretically include more.) The baking cup liner when placed in the baking cup will use the wings 8102 and 8102 respectively to go out the hole on the bottom of the baking cup and be folded back on to the bottom outside exterior of the baking cup to hold it securely in place when upside down. See FIG. 69 to see what it looks like to have the wings of the baking cup liner wrap outside the hole and around the outer exterior of the baking cup bottom to hold the liner in place when upside down. As noted, the wings are needed to hold the baking cup liner in place because the systems discussed will be filled from the bottom of the baking cup and the system will bake upside down. When removing the comestible from the baking cup, the wings will have to be bent back over the hole prior to removing. The wings can come in many shapes and sizes. For example, the wings could be semi circles that when folded back over the hole after being used to hold the baking cup liner in place could create the appearance of a complete baking cup liner bottom. The materials used for this baking cup liner could be any acceptable baking material used. However, materials more like tin foil might be the preferred route, as those will more easily allow the wings to clamp out of the hole and on to the outside, exterior wall of the bottom of the baking cup. These baking cup liners are used for those system embodiments that fill from the bottom ideally and can come in any shapes, sizes, dimensions, heights, volumes, circumferences, etc.

Another aspect or feature that may be incorporated into various embodiments includes the use of edible material for the mold or for reinforcement of the mold. For example, in an embodiment that utilizes an edible mold, the edible baking mold may be utilized to help shape the intricate three-dimensional designs. In such embodiments, any of the mold designs, embodiments, features, etc., that have been described within this specification may be constructed out of this edible material. The edible baking mold can be made from such edible materials including, but not limited to: cellulose base, sugar base, vegetable starch, grains, or any combination thereof.

As a non-limiting example, an entire mold can be constructed, such as the mold presented in assembled FIG. 51, completely from one solid comestible piece. An opening can then be formed in the bottom of the comestible mold, into which the baking ingredients can be added or injected. In operation, the mold is first flipped upside down and in such position, it can be filled with baking ingredients. The filled mold can then be placed into the oven and baked in this same orientation. By construction the mold from a thick piece of edible cellulose and sugar based composite, the mold would slowly start to melt and or dissolve into the baking ingredients as the comestible bakes. The end result would be a fine veneer of edible baking mold still surrounding the interior comestible made from the baking ingredient.

In other embodiments, an edible mold insert may be utilized within the interior of a regular, non-edible mold. For instance, to give support and prevent uneven heat distribution, which could result in the mold collapsing during the baking process, an edible mold designed in the form of FIG. 51 could have a non-edible version of the mold encasing it. For example, the two parts of a non-edible mold would seal around the edible form of the mold. This construction provides support and structure as the comestible bakes and the edible portion of the mold melts.

It will be appreciated that the edible mold can help in the formation and creation of items with intricate designs. The internal edible mold, encased by the non-edible mold, crystallizes around the baking goods, much like the exterior, torched crust on a crème brulee. As such, this crystallized substance thus giving shape, structure, and strength that a mere cake batter inside a mold might not have—especially once removed from the mold. The crystallized coating helps to hold and secure the intricate elements and reduce breakage. Absent the benefits of this aspect that can be incorporated in various embodiments, particular ingredients must be selected to ensure that they will hold their shape or design. Such decisions may come at the cost of giving up a preferred taste, texture or the like. For example, it may be desired to create a comestible from white cake as a preferred taste, but the user may be forced to use pound cake because the white cake is too light and crumbly. By baking the cake within an edible mold, the shape and structure is preserved during the baking process even is light and crumbly material is used for the interior. In addition, the utilization of the edible mold inserts makes it much easier to separate the finished goods from the non-edible mold encasing it. Once baking is completed, the comestible will have a crusted or crystalized exterior (that is the edible portion of the mold), that be readily decorated with a reduced concern about destroying the intricate design.

Thus, the edible material molds may be utilized to create a mold that stands and bakes on its own or, to create an insert that is encased within a no-edible mold of its same design and thus, operates to add extra support and structure while baking.

In addition to being one solid edible mold that one could fill and bake with or without a non-exterior mold encasing it, the edible mold could also be constructed as a multiple piece mold. For instance, the edible mold structure could be designed as edible mold inserts. One piece of the edible mold insert could be placed in the non edible mold area of the left portion of the mold illustrated in FIG. 50 (as a non-limiting example) and another edible mold insert could be placed in the right portion of the mold insert prior to being sealed. These mold inserts are representative of the non-edible molds that encase them. When sealed together and filled with baking ingredients from one end, the mold inserts will help maintain the intricate design and structure of the comestible design. Furthermore, the crisp exterior that is created as a result of this mold insert will also make removing the non-edible mold from the comestible easier and less likely to damage the original, intricate design.

In some embodiments, the edible mold elements can be constructed from edible paper like, but not limited to edible paper created from rice paper (or papers made from such ingredients as arrowroot, cellulose, corn, cassava, potato, sorghum, sugar, sweet potato, tapioca, wheat). Thus, such materials can be used to create mold inserts or to create stand alone edible molds used for creating intricate designs. The edible paper mold is filled up with baking ingredients and baked. The edible paper would maintain the structural integrity of the design as it cooks and would also be consumable once baking is completed. Again, various embodiments could be constructed as a one-piece unit with an opening by which to fill the vessel with baking ingredients prior to baking, or could be comprised of several pieces that seal together.

Another aspect or feature provided by the edible molds is that they can be used to infuse color into the comestible. For instance, if the edible baking mold contains coloring, that material as it bakes, melts, or dissolves can color all or portions of the comestible itself.

Finally, materials that might not be edible, but disposable like non edible paper or cardboard, might be utilized thereby creating disposable, one time molds or one time use mold inserts.

It is understood that any variations of the features of the system and method described in the description section falls within the scope of the invention. There can be many embodiments of this invention as witnessed in some of the figures and the discussions of them. Not all embodiments of the system and methods of use are represented here.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The various embodiments have been described using detailed descriptions of the embodiments, as well as features, aspects, etc., thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons with ordinary skill in the art.

It will be appreciated by persons with ordinary skill in the art that the present invention is not limited by what has been particularly shown and described herein above. Rather the scope of the invention is defined by the claims that follow.

What is claimed is:

1. An apparatus for casting a baked comestible product, the apparatus comprising:
   a mold assembly comprising at least two pieces that are configured to be joined together along a seam, and
   wherein the mold assembly defines an upper section and a lower section, and
   wherein the mold assembly defines an interior cavity for receiving a substance to be baked into a comestible product, the interior cavity defines a shape for the baked comestible product and comprising an upper cavity portion that coincides with the lower section of the mold assembly and a lower cavity portion that coincides with the upper section of the mold assembly, and wherein at least a portion of the lower cavity portion of the interior cavity forms an inverted oriented concave baking receptacle that is configured to optionally receive a concave baking liner in an inverted orientation.

2. The apparatus of claim 1, wherein the at least two pieces of the mold assembly comprise at least a first side piece and a second side piece that are joined together along a vertical seam.

3. The apparatus of claim 1, wherein the mold assembly defines one or more vent apertures configured to vent an overflow of the substance and heat during a baking process.

4. The apparatus of claim 1, wherein a portion of the seam can be separated or remain separated to create an opening for receiving a substance into the interior cavity of the mold assembly.

5. The apparatus of claim 1, wherein the mold assembly defines an opening configured for receiving a substance into the interior cavity of the mold assembly.

6. The apparatus of claim 1, wherein the mold assembly defines an opening configured for receiving a substance into the interior cavity of the mold assembly and further comprising a seal to close the opening.

7. The apparatus of claim 6, wherein the seal defines one or more vent apertures configured to vent overflow and heat during a baking process.

8. The apparatus of claim 1, wherein the at least two pieces of the mold assembly comprise at least an upper piece, a first side lower piece and a second side lower piece, the first side lower piece and the second side lower piece being configured to be joined together along a first seam to create a lower mold assembly, and the lower mold assembly and the upper piece configured to be joined together along a second seam.

9. The apparatus of claim 8, wherein the upper piece is substantially shaped like a frustum.

10. The apparatus of claim 8, wherein at least a portion of the lower mold assembly is configured to fit within a cup of a baking cup pan.

11. The apparatus of claim 8, wherein the lower mold assembly is configured to provide stability.

12. The apparatus of claim 8, wherein the mold assembly hangs from a surface.

13. The apparatus of claim 1, wherein at least a portion of the upper section is substantially shaped like a frustum.

14. The apparatus of claim 1, wherein at least a portion of the lower section fits within a cup of a baking cup pan.

15. The apparatus of claim 1, wherein at least a portion of the lower section is configured to provide stability.

16. The apparatus of claim 1, wherein at least a portion of the mold assembly hangs from a surface.

17. The apparatus of claim 1, wherein at least a portion of the lower section is shaped and sized to interface with a base.

18. The apparatus of claim 1, wherein the at least two pieces of the mold assembly comprise at least a first side upper piece and a second side upper piece, the first side upper piece and the second side upper piece being configured to be joined together along a first seam to create an upper mold assembly, a first side lower piece and a second side lower piece, the first side lower piece and the second side lower piece being configured to be joined together along a second seam to create a lower mold assembly, and the lower mold assembly and the upper mold assembly configured to be joined together along a third seam.

* * * * *